(12) United States Patent
Kwon et al.

(10) Patent No.: US 12,373,991 B2
(45) Date of Patent: Jul. 29, 2025

(54) METHOD, APPARATUS, SYSTEM AND COMPUTER-READABLE RECORDING MEDIUM FOR FEATURE INFORMATION

(71) Applicant: Electronics and Telecommunications Research Institute, Daejeon (KR)

(72) Inventors: Hyoung-Jin Kwon, Daejeon (KR); Ji-Hoon Do, Daejeon (KR); Dong-Hyun Kim, Daejeon (KR); Youn-Hee Kim, Daejeon (KR); Joo-Young Lee, Daejeon (KR); Se-Yoon Jeong, Daejeon (KR); Jin-Soo Choi, Daejeon (KR); Tae-Jin Lee, Daejeon (KR); Jee-Hoon Kim, Daejeon (KR); Dong-Gyu Sim, Seoul (KR); Seoung-Jun Oh, Seongnam-si (KR); Min-Hun Lee, Uijeongbu-si (KR); Yun-Gu Lee, Seongnam-si (KR); Han-Sol Choi, Dongducheon-si (KR); Kwang-Hwan Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 519 days.

(21) Appl. No.: 17/495,619

(22) Filed: Oct. 6, 2021

(65) Prior Publication Data

US 2022/0108490 A1    Apr. 7, 2022

(30) Foreign Application Priority Data

Oct. 7, 2020   (KR) .................. 10-2020-0129433
Nov. 26, 2020  (KR) .................. 10-2020-0161708
Oct. 6, 2021   (KR) .................. 10-2021-0132083

(51) Int. Cl.
*G06T 9/00*     (2006.01)
*G06N 3/04*     (2023.01)
(Continued)

(52) U.S. Cl.
CPC ............... *G06T 9/002* (2013.01); *G06N 3/04* (2013.01); *G06T 3/4046* (2013.01); *G06V 10/40* (2022.01)

(58) Field of Classification Search
CPC ......... G06T 9/002; G06T 3/4046; G06N 3/04; G06N 3/045; G06V 10/40; H04N 19/00; H04N 19/85
See application file for complete search history.

(56) References Cited

U.S. PATENT DOCUMENTS 9,743,106 B2     8/2017  Kim et al.
2002/0196964 A1* 12/2002 Stone .................. A61B 5/0059
                                                    382/128
(Continued)

FOREIGN PATENT DOCUMENTS

KR   1020160096460 A    8/2016
KR   1020190089777 A    7/2019
WO   WO-2020055279 A1 * 3/2020 ........... G06K 9/4628

OTHER PUBLICATIONS

Abdi, Hervé, and Lynne J. Williams. "Principal component analysis." Wiley interdisciplinary reviews: computational statistics 2.4 (2010): 433-459. (Year: 2010).*

(Continued)

*Primary Examiner* — Charles T Shedrick
(74) *Attorney, Agent, or Firm* — Sughrue Mion, PLLC

(57) ABSTRACT

There are provided a method, apparatus, system, and computer-readable recording medium for image compression. An encoding apparatus performs domain transformation and quantization on feature map information and image infor- (Continued)

mation. The encoding apparatus rearranges the result of domain transformation and quantization so as to have a form advantageous to the encoding procedure and encodes the result of rearrangement, thereby generating a bitstream. A decoding apparatus receives the bitstream, decodes the received bitstream, and performs inverse transformation, dequantization, and inverse rearrangement using information transmitted through the bitstream. The result of inverse transformation, dequantization, and inverse rearrangement is used for the machine-learning task of a neural network.

20 Claims, 50 Drawing Sheets

(51) Int. Cl.
*G06T 3/4046* (2024.01)
*G06V 10/40* (2022.01)

(56) References Cited

U.S. PATENT DOCUMENTS

| | | | |
|---|---|---|---|
| 2019/0231261 A1* | 8/2019 | Tzvieli | A61B 5/4848 |
| 2019/0313915 A1* | 10/2019 | Tzvieli | G01J 5/12 |
| 2020/0349673 A1 | 11/2020 | Yoo et al. | |
| 2020/0351509 A1 | 11/2020 | Lee et al. | |
| 2021/0203997 A1* | 7/2021 | Veselov | G06V 10/454 |
| 2022/0108490 A1* | 4/2022 | Kwon | G06T 3/4046 |
| 2022/0167000 A1* | 5/2022 | Kwon | H04N 19/50 |
| 2023/0342883 A1* | 10/2023 | Cao | G06T 5/00 |
| 2024/0051560 A1* | 2/2024 | Khamis | G06V 10/25 |

OTHER PUBLICATIONS

Pandey, Pramod Kumar, Yaduvir Singh, and Sweta Tripathi. "Image processing using principle component analysis." International Journal of Computer Applications 15.4 (2011): 37-40. (Year: 2011).*

* cited by examiner

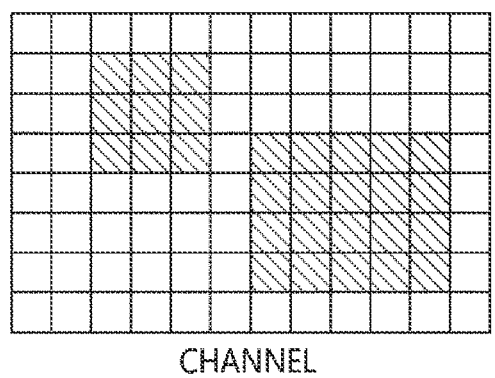
CHANNEL
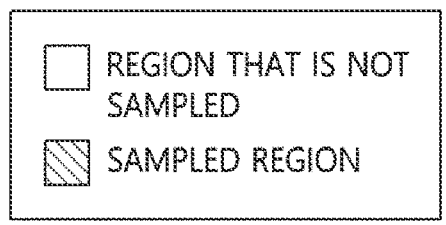
FIG. 12

| | |
|---|---|
| FPS_syntax() { | |
| FSPS_id | |
| packing_enabled_flag | u(1) |
| quantization_enabled_flag | u(1) |
| transform_enabled_flag | u(1) |
| } | |

FIG. 34

| FSPS_syntax() { | |
|---|---|
| num_FM_minus1 | ue(v) |
| FM_height[i] | u(v) |
| FM_width[i] | u(v) |
| FM_channel[i] | u(v) |
| FM_log_channel_minusX[i] | u(v) |
| split_method_merge | u(v) |
| FM_split_mode_flag | u(v) |
| base_TU_split_size_id | u(v) |
| scale_TU_flag | u(v) |
| scale_TU_rate | u(v) |
| log_TU_size_minusX | u(v) |
| int_TU_width_size_minusY | u(v) |
| int_TU_height_size_minusY | u(v) |
| int_TU_channel_size_minusY | u(v) |
| log_TU_channel_size_minusY | u(v) |
| num_exp_rows_minus1 | u(v) |
| TU_width_minus1[i] | u(v) |
| num_exp_columns_minus1 | u(v) |
| TU_height_minus1[i] | u(v) |
| num_exp_depths_minus1 | u(v) |
| TU_channel_minus1[i] | u(v) |
| } | |

FIG. 35

| | |
|---|---|
| FSPS_syntax() { | |
| num_FM_minus1 | u(v) |
| FM_height[i] | u(v) |
| FM_width[i] | u(v) |
| FM_channel[i] | u(v) |
| FM_log_channel_minusX[i] | u(v) |
| split_method_merge | u(v) |
| { | |
| log_QU_size_minusX | u(v) |
| int_QU_width_size_minusY | u(v) |
| int_QU_height_size_minusY | u(v) |
| int_QU_channel_size_minusY | u(v) |
| log_QU_channel_size_minusY | u(v) |
| QU_num_exp_rows_minus1 | u(v) |
| QU_width_minus1[i] | u(v) |
| QU_num_exp_columns_minus1 | u(v) |
| QU_height_minus1[i] | u(v) |
| QU_num_exp_depths_minus1 | u(v) |
| QU_channel_minus1[i] | u(v) |
| } | |
| TUQU_equal_unit_flag | u(v) |
| { | |
| TUQU_scale_flag | u(v) |
| base_TU_split_size_id | u(v) |
| scale_TU_flag | u(v) |
| scale_TU_rate | u(v) |
| log_TU_size_minusX | u(v) |
| int_TU_width_size_minusY | u(v) |
| int_TU_height_size_minusY | u(v) |
| int_TU_channel_size_minusY | u(v) |
| log_TU_channel_size_minusY | u(v) |
| TU_num_exp_rows_minus1 | u(v) |
| TU_width_minus1[i] | u(v) |
| TU_num_exp_columns_minus1 | u(v) |
| TU_height_minus1[i] | u(v) |
| TU_num_exp_depths_minus1 | u(v) |
| TU_channel_minus1[i] | u(v) |
| } | |
| FM_split_mode | u(v) |
| base_FM_split_size_id | u(v) |
| scale_TU_flag | u(v) |
| scale_TU_rate | u(v) |
| } | |

FIG. 36

| TU_syntax() { | |
|---|---|
| transform_type | u(v) |
| convert_axis | u(v) |
| num_rearrange | u(v) |
| TURPS_id | |
| } | |

FIG. 37

| Quantization_Unit_syntax() { | |
|---|---|
| clipping_flag | u(v) |
| quantization_type | u(v) |
| deadzone_flag | u(v) |
| } | |

FIG. 38

| TURPS_syntax() { | |
|---|---|
| TU_split_mode | u(v) |
| base_TU_split_size_id | u(v) |
| use_scale_on_base_TU_split_size_flag | u(1) |
| scale_on_base_TU_split_size | u(v) |
| rearrange_unit_width[ i ] | u(v) |
| rearrange_unit_height[ i ] | u(v) |
| rearrange_unit_channel[ i ] | u(v) |
| rearrange_unit_scan_order[ i ] | u(v) |
| rearrange_unit_attach_order[ i ] | u(v) |
| rearranged_TU_width[ i ] | u(v) |
| rearranged_TU_height[ i ] | u(v) |
| rearranged_TU_channel[ i ] | u(v) |
| } | |

FIG. 39

| Frame_Parameter_Set_rbsp() { | |
|---|---|
| FSPS_id | |
| packing_enabled_flag | u(1) |
| quantization_enabled_flag | u(1) |
| transform_enabled_flag | u(1) |
| } | |

FIG. 40

| | |
|---|---|
| Featuremap_Split_Parameter_Set_rbsp( ) { | |
|   num_FM_minus1 | ue(v) |
|   for( i = 0; i < num_FM_minus1; i++ ){ | |
|     FM_id[ i ] | u(v) |
|     FM_height[ i ] | u(v) |
|     FM_width[ i ] | u(v) |
|     log_TU_size_minusX | u(v) |
|     num_exp_columns_minus1 | u(v) |
|     num_exp_rows_minus1 | u(v) |
|     num_exp_channels_minus1 | u(v) |
|     for( i = 0; i <= num_exp_columns_minus1; i++ ) | |
|       TU_width_minus1[i] | ue(v) |
|     for( i = 0; i <= num_exp_rows_minus1; i++ ) | |
|       TU_height_minus1[i] | ue(v) |
|     for( i = 0; i <= num_exp_depths_minus1; i++ ) | |
|       TU_channel_minus1[i] | ue(v) |
|   } | |
| } | |

FIG. 41

```
Featuremap_Split_Parameter_Set (fspf) {
    num_FM_minus1                                              ue(v)
    for( i = 0; i < num_FM_minus1; i++ ){
        FM_id[i]                                               u(v)
        FM_height[i]                                           u(v)
        FM_width[i]                                            u(v)
        log_QU_size_minusX                                     u(v)
        QU_num_exp_columns_minus1                              u(v)
        QU_num_exp_rows_minus1                                 u(v)
        QU_num_exp_channels_minus1                             u(v)
        for( i = 0; i <= QU_num_exp_columns_minus1; i++ )
            QU_width_minus1[i]                                 ue(v)
        for( i = 0; i <= QU_num_exp_rows_minus1; i++ )
            QU_height_minus1[i]                                ue(v)
        for( i = 0; i <= QU_num_exp_depths_minus1; i++ )
            QU_channel_minus1[i]                               ue(v)
        TUQU_equal_flag                                        u(v)
        if(TUQU_equal_flag) {
            log_TU_size_minusX = log_QU_size_minusX
            TU_width_minus1 = QU_width_minus1
            TU_height_minus1 = QU_height_minus1
            TU_channel_minus1 = QU_channel_minus1
        } else {
            log_TU_size_minusX                                 u(v)
            TU_num_exp_columns_minus1                          u(v)
            TU_num_exp_rows_minus1                             u(v)
            TU_num_exp_channels_minus1                         u(v)
            TUQU_scale_flag                                    u(v)
            if(TUQU_scale_flag) {
                TUQU_rate                                      u(v)
                for( i = 0; i <= TU_num_exp_columns_minus1; i++ )
                    TU_width_minus1[i] = QU_width_minus1[i] * TUQU_rate    ue(v)
                for( i = 0; i <= TU_num_exp_rows_minus1; i++ )
                    TU_height_minus1[i] = QU_height_minus1[i] * TUQU_rate  ue(v)
                for( i = 0; i <= TU_num_exp_depths_minus1; i++ )
                    TU_channel_minus1[i] = QU_channel_minus1[i] * TUQU_rate ue(v)
            } else {
                for( i = 0; i <= TU_num_exp_columns_minus1; i++ )
                    TU_width_minus1[i]                         ue(v)
                for( i = 0; i <= TU_num_exp_rows_minus1; i++ )
                    TU_height_minus1[i]                        ue(v)
                for( i = 0; i <= TU_num_exp_depths_minus1; i++ )
                    TU_channel_minus1[i]                       ue(v)
            }
        }
        FM_split_mode                                          u(v)
        if(FM_split_mode == 0) {
            base_FM_split_size_id                              u(v)
            scale_TU_flag                                      u(v)
            scale_TU_rate                                      u(v)
        } else if(FM_Split_mode == 1) {
            base_FM_split_size_id                              u(v)
            scale_TU_flag                                      u(v)
            scale_TU_rate                                      u(v)
        }
    }
}
```

FIG. 42

| | |
|---|---|
| Transform_Unit_rbsp() { | |
|    transform_type | ue(v) |
|    convert_axis | u(v) |
|    if (transform_type == N) | |
|    { | |
|      num_rearrange | u(v) |
|      for(i = 0; i < num_rearrange; i++) | |
|      { | |
|        TURPS_id | u(v) |
|      } | |
|    } | |
|    ... | |
| } | |

FIG. 43

```
Transform_Unit_Rearrange_Parameter_Set_rbsp( ) {
  TU_split_mode
  if(TU_split_mode == 0)
  {
    base_TU_split_size_id
    use_scale_on_base_TU_split_size_flag
    if(use_scale_on_base_TU_split_size_flag)
      scale_on_base_TU_split_size
  }
  if(TU_split_mode == 1)
  {
    rearrange_unit_width[ i ]
    rearrange_unit_height[ i ]
    rearrange_unit_channel[ i ]
  } rearrange_unit_scan_order[ i ]
    rearrange_unit_attach_order[ i ]
    rearranged_TU_width[ i ]
    rearranged_TU_height[ i ]
    rearranged_TU_channel[ i ]
}
```

FIG. 44

| | |
|---|---|
| Quantization_Unit_rbsp() { | |
|   clipping_flag | u(v) |
|   if(clipping_flag) { | |
|     clipping_mode | u(v) |
|     if(clipping_mode) { | |
|       quant_max = clipping_max | u(v) |
|       quant_min = clipping_min | u(v) |
|     } else { | |
|       quant_max | u(v) |
|       quant_min | u(v) |
|     } | |
|   } | |
|   quantization_type | u(v) |
|   if(quantization_type == Linear) { | |
|     qu_log2_level_minus1 | u(v) |
|     deadzone_flag | u(v) |
|     if(deadzone_flag) { | |
|       deadzone_mode | u(v) |
|       if(deadzone_mode) { | |
|         deadzone_max | u(v) |
|         deadzone_min | u(v) |
|         deadzone_connect | u(v) |
|       } | |
|     escape_flag | u(v) |
|     if(escape_flag){ | |
|       unit_value | u(v) |
|     } else if (quantization_type == Non_Linear) | |
|     qu_log2_level_minus1 | u(v) |
|     deadzone_flag | u(v) |
|     if(deadzone_flag) { | |
|       deadzone_mode | u(v) |
|       if(deadzone_mode) { | |
|         deadzone_max | u(v) |
|         deadzone_min | u(v) |
|         deadzone_connect | u(v) |
|       } | |
|     split_quantization_flag | u(v) |
|     if(split_quantization_flag) { | |
|       quantization_range[0] = qu_log2_level_minus1_A | |
|       quantization_range[1] = qu_log2_level_minus1_B | |
|       quantization_range[2] = qu_log2_level_minus1_C | |
|       ... | |
|     } | |
|     escape_flag | u(v) |
|     if(escape_flag){ | |
|       unit_value | u(v) |
|     } | |
| } | |

FIG. 45

METHOD, APPARATUS, SYSTEM AND COMPUTER-READABLE RECORDING MEDIUM FOR FEATURE INFORMATION

CROSS REFERENCE TO RELATED APPLICATIONS

This application claims the benefit of Korean Patent Application No. 10-2020-0129433, filed Oct. 7, 2020, No. 10-2020-0161708, filed Nov. 26, 2020, and No. 10-2021-0132083, filed Oct. 6, 2021, which are hereby incorporated by reference in their entireties into this application.

BACKGROUND OF THE INVENTION

1. Technical Field

The following embodiments relate generally to a method, apparatus, system and computer-readable recording medium for image compression, and more particularly, a method, apparatus, system, and computer-readable recording medium for feature information are disclosed.

2. Description of the Related Art

A Video Coding for Machines (VCM) encoder encodes an input image or feature information extracted from the input image and transmits the encoded input image or the encoded feature information.

A VCM decoder receives a bitstream of an image or feature information as the input thereof and outputs an image that is reconstructed using the input bitstream. Also, the decoder performs one or multiple tasks according to an application using feature information that is reconstructed using the input bitstream.

SUMMARY OF THE INVENTION

An embodiment may provide an apparatus, method, system, and recording medium for performing domain transformation and quantization on feature map information and image information.

An embodiment may provide an apparatus, method, system, and recording medium for rearranging the results of domain transformation and quantization performed on feature map information and image information so as to have a form advantageous to an encoding procedure.

An embodiment may provide an apparatus, method, system, and recording medium for generating a bitstream by encoding the result of rearrangement and for storing and transmitting the bitstream.

An embodiment may provide an apparatus, method, system, and recording medium for receiving a bitstream, decoding the received bitstream, and performing inverse transformation, dequantization, and inverse rearrangement using the information transmitted through the bitstream.

An embodiment may provide an apparatus, method, system, and recording medium for using the results of inverse transformation, dequantization, and inverse rearrangement for a machine-learning task of a neural network.

According to one aspect, there is provided an encoding method including extracting feature information from an original image; generating preprocessed feature information by performing preprocessing on the feature information; and generating a feature map by performing encoding on the preprocessed feature information.

The encoding method may further include generating a preprocessed image by performing preprocessing on the original image.

The feature information may be extracted from the original image or the preprocessed image.

The original image or the preprocessed image may be input to a neural network.

The neural network may include a single layer or multiple layers.

The feature information may be the final result extracted from the neural network or a result from an intermediate layer of the neural network.

The preprocessing performed on the original image may include one or more of color format transformation and sub-sampling.

The preprocessing performed on the feature information may include one or more of sub-sampling, domain transformation, quantization, and domain rearrangement.

Fixed sampling or non-fixed sampling may be performed on the feature information.

The type of the domain transformation may be 3-dimensional (3D) Discrete Cosine Transform (DCT), 2D-DCT, orthogonal linear transform, or Principal Component Analysis (PCA).

The quantization may be fixed quantization or non-fixed quantization.

When information input for the domain rearrangement has a 3D form, the information may be rearranged in a 2D form.

According to another aspect, there is provided a computer-readable recording medium in which a program for performing the encoding method is recorded.

According to a further aspect, there is provided a decoding method including generating reconstructed feature information by performing decoding on information about a feature map in a feature map bitstream; and generating postprocessed reconstructed feature information by performing postprocessing on the reconstructed feature information.

The decoding method may further include deriving a processing result by performing a machine-learning task for the postprocessed reconstructed feature information using one or more neural networks.

The decoding method may further include generating a reconstructed image by performing decoding on encoded image information of an image bitstream.

The decoding method may further include generating a postprocessed reconstructed image by performing postprocessing on the reconstructed image.

The postprocessing performed on the reconstructed image may include one or more of inverse color format transformation and inverse sampling.

The postprocessing performed on the reconstructed feature information may include one or more of inverse rearrangement, dequantization, inverse domain transformation, and inverse sampling. Rearranged feature information having a 2D form may be reconfigured in a 3D form through the inverse rearrangement.

The dequantization may be fixed dequantization or non-fixed dequantization.

The type of the inverse domain transformation may be 3-dimensional (3D) Discrete Cosine Transform (DCT), 2D-DCT, orthogonal linear transform, or Principal Component Analysis (PCA).

Fixed sampling or non-fixed sampling may be performed on inversely transformed information generated by the domain inverse transformation.

According to yet another aspect, there is provided a computer-readable recording medium in which a program for performing the decoding method is recorded.

BRIEF DESCRIPTION OF THE DRAWINGS

The above and other objects, features, and advantages of the present disclosure will be more clearly understood from the following detailed description taken in conjunction with the accompanying drawings, in which:

FIG. 12 illustrates a sampling method using feedback according to an embodiment;

FIG. 34 illustrates syntax expressions for FPS according to an example;

FIG. 35 illustrates syntax expressions for FSPS according to an example;

FIG. 36 illustrates other syntax expressions for FSPS according to an example;

FIG. 37 illustrates syntax expressions for a transform unit according to an example;

FIG. 38 illustrates syntax expressions for a quantization unit according to an example;

FIG. 39 illustrates syntax expressions for TURPS according to an example;

FIG. 40 illustrates syntax expressions for a frame parameter set according to an example;

FIG. 41 illustrates other syntax expressions for FSPS according to an example;

FIG. 42 illustrates other syntax expressions for FSPS according to an example;

FIG. 43 illustrates syntax expressions for a transform unit according to an example;

FIG. 44 illustrates other syntax expressions for TURPS according to an example;

FIG. 45 illustrates syntax expressions for a quantization unit according to an example;

DESCRIPTION OF THE PREFERRED EMBODIMENTS

Figure 1:
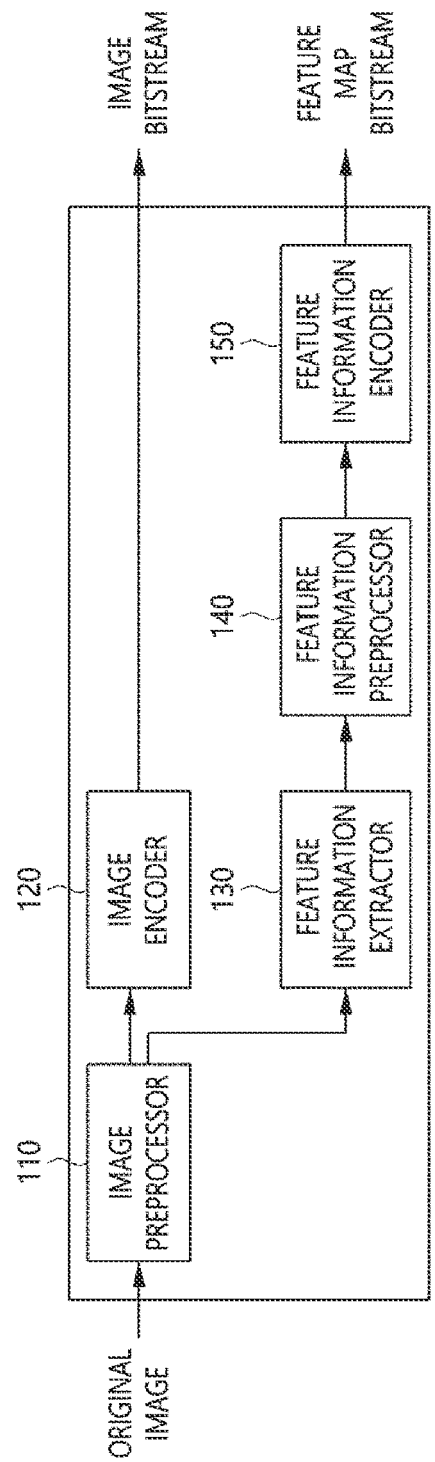
FIG. 1 is a structural diagram of an encoding apparatus according to an embodiment.

Hereinafter, embodiments will be described in detail with reference to the accompanying drawings. It should be understood that the embodiments differ from each other, but are not necessarily mutually exclusive.

The terms used in describing the embodiments are to be interpreted based on substantial meanings thereof and the whole context of the present specification, rather than simply based on the names of the terms.

In the embodiments, a connection between a specific part and another part may include not only a direct connection therebetween but also an indirect connection, through which the two parts are connected via an intervening part therebetween. The same reference numerals in the drawings designate corresponding portions.

Detailed descriptions of the following exemplary embodiments will be made with reference to the accompanying drawings illustrating specific embodiments. These embodiments are described in detail so that those having ordinary knowledge in the technical field to which the present disclosure pertains can practice the embodiments. It should be understood that the various embodiments differ from each other, but are not necessarily mutually exclusive. For example, specific shapes, structures, and characteristics described herein may be implemented as other embodiments without departing from the spirit and scope of the present disclosure in relation to an embodiment. Further, it should be understood that the locations or arrangement of individual components in each of the disclosed embodiments can be changed without departing from the spirit and scope of the present disclosure. Therefore, the following detailed description is not to be taken in a limiting sense, and the scope of the present disclosure is limited only by the accompanying claims along with equivalents thereof, as long as they are appropriately described.

In the drawings, similar reference numerals designate the same or similar functions in various aspects. The shapes, sizes, and the like of components in the drawings may be exaggerated to make the description clear.

The terms used in connection with the embodiments are for the purpose of describing the embodiments and are not intended to limit the present disclosure. In the embodiments, the singular forms are intended to include the plural forms as well, unless the context clearly indicates otherwise. The terms "comprises" and/or "comprising" used herein mean that additional components may be included in the practice or the technical spirit of exemplary embodiments, but do not preclude the presence or addition of components, steps, operations, and/or elements other than the stated components, steps, operations, and/or elements. It will be understood that, when a component is referred to as being "connected" or "coupled" to another component, the two components can be directly connected or coupled to each other, or an intervening component may be present therebetween.

Although the terms "first," "second," etc. may be used herein to describe various components, these components should not be limited by these terms. These terms are only used to distinguish one component from another component. For example, a first component could be termed a second component without departing from the teachings of the present disclosure. Similarly, the second component could also be termed the first component.

Also, components described in connection with the embodiments are illustrated as being separate in order to indicate the different characteristic functions thereof, but this does not mean that each of the components is formed of a separate piece of hardware or software. That is, the components are arranged as respective components for convenience of description. For example, at least two of the components may be combined into one component, or one component may be further divided into multiple components. An embodiment in which the components are integrated or an embodiment from which some components are removed is also included in the scope of the present disclosure as long as it does not depart from the essence of the present disclosure.

Also, some components are not essential components for performing essential functions, but may be optional components merely for improving performance. Embodiments may be implemented using only essential components for implementing the essence of the embodiments, and for example, a structure from which optional components, such as components used merely to improve performance, are excluded is also included in the scope of the present disclosure.

Hereinafter, embodiments will be described in detail with reference to the accompanying drawings so that those having ordinary knowledge in the technical field to which the present disclosure pertains can easily practice the embodiments. When the embodiments are described, descriptions of known functions and configurations which have been deemed to unnecessarily obscure the gist of the present disclosure will be omitted below.

In an embodiment, an image may indicate multiple images or video.

FIG. 1 is a structural diagram of an encoding apparatus according to an embodiment.

The encoding apparatus 100 may perform encoding on an image and feature information.

The encoding apparatus 100 may include an image preprocessor 110, an image encoder 120, a feature information extractor 130, a feature information preprocessor 140, and a feature information encoder 150.

An original image may be input to the encoding apparatus 100.

Also, feedback information may be input to the encoding apparatus 100.

The encoding apparatus 100 may output an image bitstream and a feature map bitstream.

In embodiments, the image bitstream may be referred to as a first bitstream. The feature map bitstream may be referred to as a second bitstream or a feature information bitstream.

The functions, operations, and the like of the image preprocessor 110, the image encoder 120, the feature information extractor 130, the feature information preprocessor 140, and the feature information encoder 150 will be described in more detail below.

Figure 2:
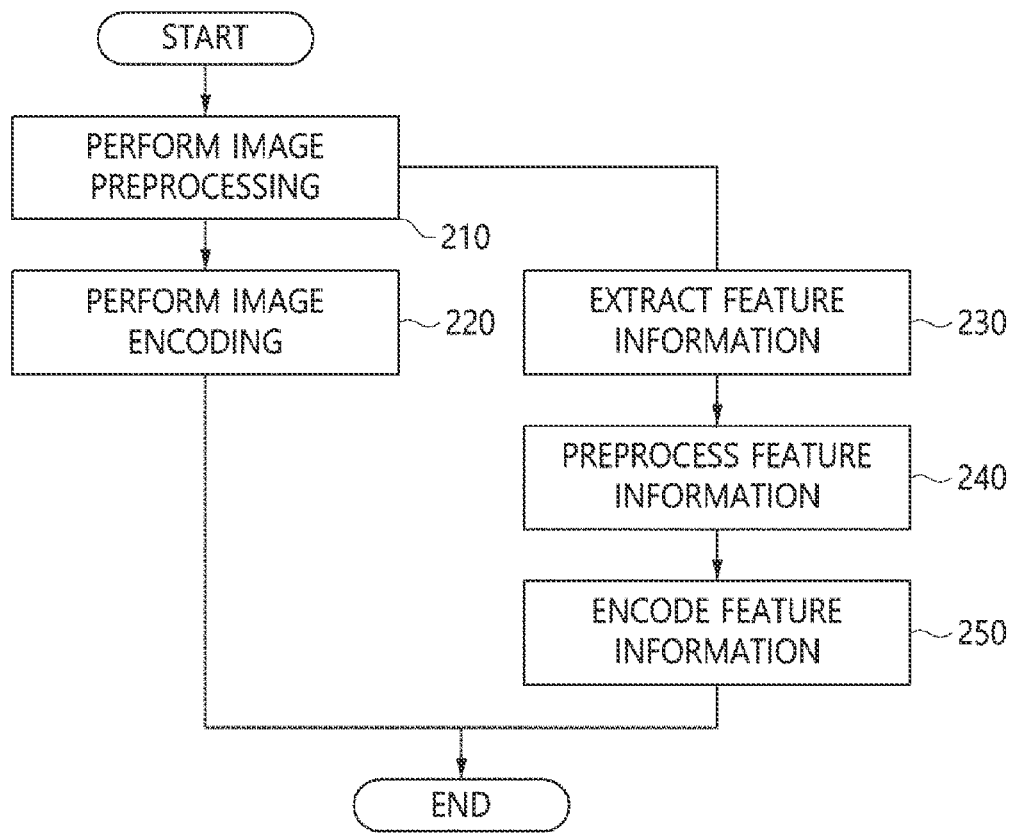
FIG. 2 is a flowchart of a method for encoding feature information and an image according to an embodiment.

FIG. 2 is a flowchart of a method for encoding feature information and an image according to an embodiment.

An original image may be input to the image preprocessor 110.

At step 210, the image preprocessor 110 performs preprocessing on the original image, thereby generating a preprocessed image.

In an embodiment, the preprocessing may include one or more of color format transformation and sub-sampling. The sub-sampling may include one or more of resolution sub-sampling, temporal sub-sampling, and spatial sub-sampling.

Feedback information may be information that is transmitted from a decoding apparatus 2200 to the encoding apparatus 100.

The preprocessed image may be input to the image encoder 120.

The preprocessing at step 210 may be optionally performed. When preprocessing is not performed, the preprocessed image in the embodiments may be considered the original image.

At step 220, the image encoder 120 performs encoding on the preprocessed image (or the original image), thereby generating encoded image information.

The image encoder 120 may output an image bitstream including the encoded image information.

The image bitstream may include information indicating the preprocessing performed by the image preprocessor 110. The information indicating the preprocessing may specify the types of preprocessing performed by the image preprocessor 110.

The image encoder 120 may generate a reconstructed image and an image bitstream.

In an embodiment, the image encoder 120 performs decoding on the encoded image information, thereby generating a reconstructed image. That is, the reconstructed image may be an image acquired by the decoding apparatus 2200 to be described later performing decoding on the encoded image information of the image bitstream.

The image encoder 120 may output the reconstructed image to the feature information extractor 130.

At step 230, the feature information extractor 130 may extract feature information from the original image or the preprocessed image output from the image preprocessor 110.

At step 240, the feature information preprocessor 140 performs preprocessing on the feature information, thereby generating preprocessed feature information.

The feature information may comprise multiple pieces of feature information.

In an embodiment, the preprocessing may include one or more of sub-sampling, domain transformation, quantization, and rearrangement.

The preprocessing at step 240 may be selectively and/or partially performed.

At step 250, the feature information encoder 150 performs encoding on the preprocessed feature information (or the feature information), thereby generating a feature map.

The feature information encoder 150 may generate a feature map bitstream including information about the feature map.

The feature map bitstream may be a bitstream including information about the feature information. The term "feature map bitstream" may be used interchangeably with "feature information bitstream".

The feature map may alternatively indicate other information about the feature information.

The preprocessing information may indicate the types of processing performed on the feature information, among sub-sampling, domain transformation, quantization, and rearrangement.

For example, the preprocessing information may include sub-sampling information. The sub-sampling information may indicate whether sub-sampling is applied to the feature information.

For example, the preprocessing information may include domain transformation information. The domain transformation information may indicate whether domain transformation is applied to the feature information.

For example, the preprocessing information may include quantization information. The quantization information may indicate whether quantization is applied to the feature information.

For example, the preprocessing information may include rearrangement information. The (domain) rearrangement information may indicate whether (domain) rearrangement is applied to the feature information.

The order in which sub-sampling, domain transformation, quantization, and rearrangement are performed may be changed.

The preprocessing information may indicate the order in which the processing tasks, among sub-sampling, domain transformation, quantization, and (domain) rearrangement, are performed on the feature information.

The feature information encoder 150 performs encoding on the preprocessing information, thereby generating encoded preprocessing information.

The information about the feature map may include the encoded preprocessing information.

The pieces of information generated and/or transmitted by the above-described feature information encoder 150 may be transmitted as information pertaining to High-Level Syntax (HLS). Here, the upper level of the HLS may be a sequence level or a picture level.

Figure 3:
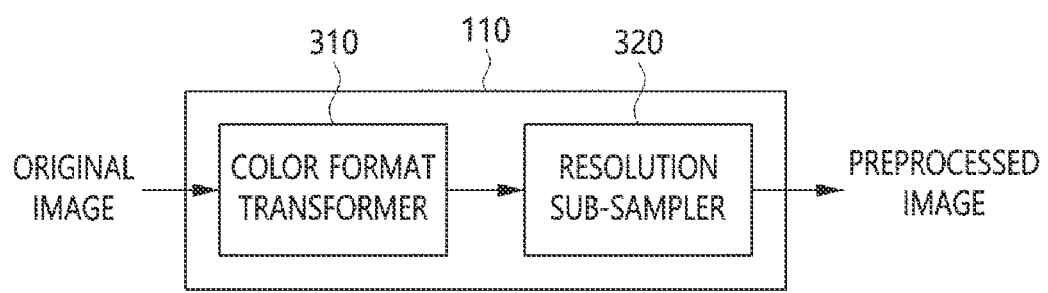
FIG. 3 illustrates the structure of an image preprocessor according to an embodiment.

FIG. 3 illustrates the structure of an image preprocessor according to an embodiment.

The image preprocessor 110 may include one or more of a color format transformer 310 and a resolution sub-sampler 320.

An original image may be input to the color format transformer 310.

The resolution sub-sampler 320 may generate a preprocessed image.

The functions, operations, and the like of the color format transformer 310 and the resolution sub-sampler 320 will be described in more detail below.

Figure 4:
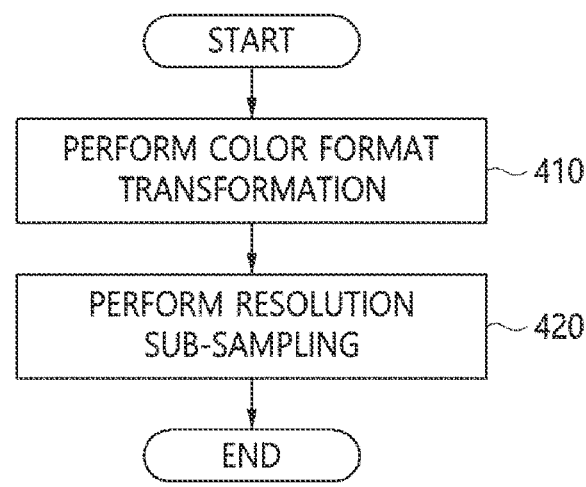
FIG. 4 is a flowchart of a method for preprocessing an image according to an embodiment.

FIG. 4 is a flowchart of a method for preprocessing an image according to an embodiment.

Step 210, described above with reference to FIG. 2, may include steps 410 and 420.

Through steps 410 and 420, one or more of preprocessing tasks, such as color format transformation, resolution sub-sampling, and the like, may be performed on the original image input to the image preprocessor 110. These preprocessing tasks may be performed using the feedback information input to the image preprocessor 110.

At step 410, the color format transformer 310 transforms the color format of the input original image, thereby generating an image, the color format of which is transformed.

Through transformation of the color format, the color format transformer 310 may transform the color format of the input original image to YCbCr, RGB, gray, or the like.

The color format transformation information may include 1) information (or a flag) indicating whether transformation of a color format is performed and/or 2) information representing color formats.

The color formats may include a color format before transformation and a color format after transformation.

1) The information indicating whether transformation of a color format is performed and/or 2) the information representing color formats may be encoded.

The encoded image information may include the encoded color format transformation information.

For example, when the color format of the original image is RGB and when the RGB color format is transformed to a YCbCr color format through color format transformation performed by the color format transformer 310, the color format transformation information may include 1) information indicating that transformation of the color format is performed and/or 2) information indicating that the color format before transformation is RGB and that the color format after transformation is YCbCr.

The color format transformation information may be transmitted to the image encoder 120. The image encoder 120 performs encoding on the color format transformation information, thereby generating encoded color format transformation information. The encoded image information may include the encoded color format transformation information. An image bitstream may include the encoded color format transformation information. The encoded color format transformation information may be transmitted to the decoding apparatus 2200 through the image bitstream.

At step 420, the resolution sub-sampler 320 performs resolution sub-sampling on the image, the color format of which is transformed, thereby generating a resolution-sub-sampled image.

Feedback information may be used for resolution sub-sampling at step 420.

The resolution sub-sampling information may include 1) information (or a flag) indicating whether resolution sub-sampling is performed and/or 2) unit information indicating the unit based on which resolution sub-sampling is performed.

For example, the unit information may indicate whether the unit based on which resolution sub-sampling is performed is the entire image or a frame of the image. The unit information may represent a sampling rate. For example, the sampling rate may be 50% of the resolution or 75% of the resolution.

The resolution sub-sampling information may be transmitted to the image encoder 120. The image encoder 120 performs encoding on the resolution sub-sampling information, thereby generating encoded resolution sub-sampling information. The encoded image information may include the encoded resolution sub-sampling information. The image bitstream may include the encoded resolution sub-sampling information. The encoded resolution sub-sampling information may be transmitted to the decoding apparatus 2200 through the image bitstream.

The pieces of information generated and/or transmitted by the above-described image preprocessor 110 may be transmitted as information pertaining to High-Level Syntax (HLS). Here, the upper level of the HLS may be a sequence level or a picture level.

All or some of the image preprocessing at step 210 may be omitted. That is, some of steps 410 and 420 of the image-preprocessing method may be omitted, and the order of steps 410 and 420 may be changed.

Depending on the omission or a change in the order, the original image, the image, the color format of which is transformed, the resolution-sub-sampled image, or the preprocessed image at steps 410 and 420 described above may be replaced with an original image, an image, the color format of which is transformed, a resolution-sub-sampled image, or a preprocessed image.

When the image preprocessing by the image preprocessor 110 is omitted, the original image may be transmitted to the image encoder 120 and the feature information extractor 130.

The image-preprocessing information may indicate whether each of color format transformation and resolution sub-sampling is applied. Also, the image-preprocessing information may indicate the order in which color format transformation and resolution sub-sampling are performed.

At step 220, the image encoder 120 performs encoding on the image-preprocessing information, thereby generating encoded image-preprocessing information. The image bitstream may include the encoded image-preprocessing information.

Reference is again to be made to FIG. 2.

At step 220, the image encoder 120 performs encoding using the preprocessed image (or the original image that is not preprocessed) and information generated in the preprocessing task, thereby generating encoded image information and a reconstructed image. The image encoder 120 may output an image bitstream, including the encoded image information, and the reconstructed image.

The information generated in the preprocessing task may include information such as the flag, the index, and the like described above with reference to FIG. 4.

The image encoder 120 performs decoding on the encoded image information, thereby generating a reconstructed image.

At step 230, the feature information extractor 130 may extract feature information from the preprocessed image.

The image preprocessor 110 may transmit feature extraction information, indicating whether to extract feature information, to the feature information extractor 130, and the feature information extractor 130 may extract feature information using the feature extraction information.

The preprocessed image (or the original image) may be input to a neural network. The neural network may include a single layer or multiple layers. The feature information may be the final result extracted from the neural network or the result from an intermediate layer of the neural network.

Omission information may indicate whether the processing procedure performed by the feature information extractor 130 is omitted. The omission information may be transmitted from the feature information extractor 130 or the feature information preprocessor 140 to the feature information encoder 150. The feature information encoder 150 performs encoding on the omission information, thereby generating encoded omission information. The information about the feature map may include the encoded omission information.

The feature extraction information may include 1) neural network information and 2) layer location information.

The neural network information may indicate the type of neural network that is used to extract the feature information. The neural network information may be an index indicating which neural network among multiple neural networks is used to extract feature information.

The layer location information may indicate the layer from which feature information is extracted, among multiple layers of the neural network. The layer location information may be an index indicating the layer from which the feature information is extracted, among the multiple layers.

The feature information extractor 130 may transmit the feature extraction information to the feature information preprocessor 140. The feature information preprocessor 140 may transmit the feature extraction information to the feature information encoder 150.

The feature information encoder 150 performs encoding on the feature extraction information, thereby generating encoded feature extraction information. The information about the feature map may include the encoded feature extraction information.

At step 240, the feature information preprocessor 140 performs preprocessing on the feature information, thereby generating preprocessed feature information. The feature information may comprise multiple pieces of feature information.

In an embodiment, the preprocessing may include one or more of sub-sampling, domain transformation, quantization, and (domain) rearrangement.

Figure 5:
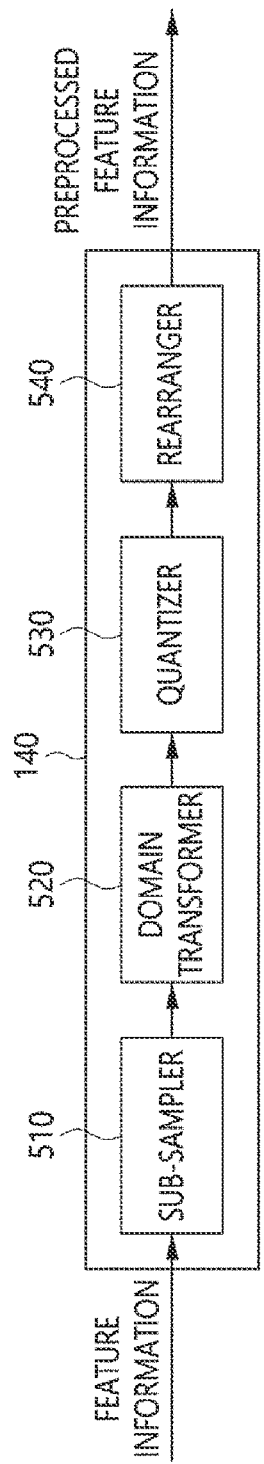
FIG. 5 illustrates the structure of a feature information preprocessor according to an embodiment.

FIG. 5 illustrates the structure of a feature information preprocessor according to an embodiment.

The feature information preprocessor 140 may include one or more of a sub-sampler 510, a domain transformer 520, a quantizer 530, and a rearranger 540.

Feature information may be input to the sub-sampler 510.

The rearranger 540 may generate preprocessed feature information.

The functions, operations, and the like of the sub-sampler 510, the domain transformer 520, the quantizer 530, and the rearranger 540 will be described in more detail below.

Figure 6:
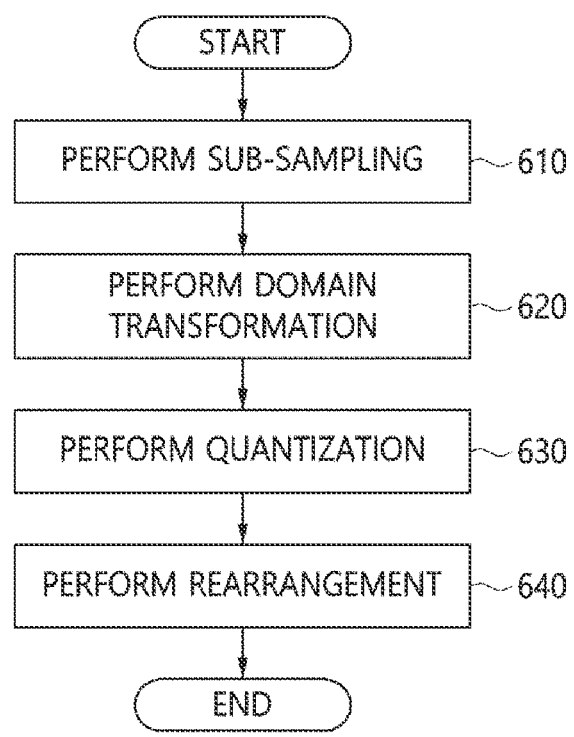
FIG. 6 is a flowchart of a method for preprocessing feature information according to an embodiment.

FIG. 6 is a flowchart of a method for preprocessing feature information according to an embodiment.

Step 240, described above with reference to FIG. 2, may include steps 610, 620, 630 and 640.

Through steps 610, 620, 630 and 640, one or more of preprocessing tasks, such as sub-sampling, domain transformation, quantization, rearrangement, and the like, may be performed on the feature information input to the feature information preprocessor 140.

At step 610, the sub-sampler 510 may perform sub-sampling on the feature information.

The sub-sampler 510 performs sub-sampling on the feature information, thereby generating a feature map. The feature map may comprise multiple feature maps.

For example, the sub-sampled feature information may be in the form of a feature map. Alternatively, the sub-sampler 510 may output the sub-sampled feature information in the form of a feature map.

The sub-sampler 510 may perform sub-sampling on the feature information in units of channels or in units of feature regions. Also, the sub-sampler 510 may perform fixed sampling or non-fixed sampling on the feature information.

When sub-sampling in units of channels is applied to the feature information, sub-sampling may be performed on one or more channels.

The sub-sampling method information may indicate the type of sub-sampling that is applied to the feature information. The sub-sampling method information may be an index indicating the sub-sampling method that is applied to the feature information, among multiple sub-sampling methods. The feature information encoder 150 performs encoding on the sub-sampling method information, thereby generating encoded sub-sampling method information. The information about the feature map may include the encoded sub-sampling method information.

The sub-sampling method information may include sampling rate information and sampling criterion information.

When fixed sampling is performed on the feature information, the sub-sampler 510 may perform sub-sampling on the feature information in units of channels at a specific sampling rate.

The sampling rate information may indicate the sampling rate at which sub-sampling is applied to the feature information. The feature information encoder 150 performs encoding on the sampling rate information, thereby generating encoded sampling rate information. The information about the feature map may include the encoded sampling rate information.

Also, the information about the feature map may include the index of the first sampled channel.

In an embodiment, when non-fixed sampling is performed on the feature information, the sub-sampler 510 may perform sampling on a single channel or multiple channels indicated by the feature information according to specific criteria.

Sampling criterion information may indicate the specific criteria for non-fixed sampling. The sampling criterion information may include the number of sampled channels, the range of the sampled channels, and/or the indices of the sampled channels. The feature information encoder 150 performs encoding on the sampling criterion information, thereby generating encoded sampling criterion information. The information about the feature map may include the encoded sampling criterion information.

Figure 7:
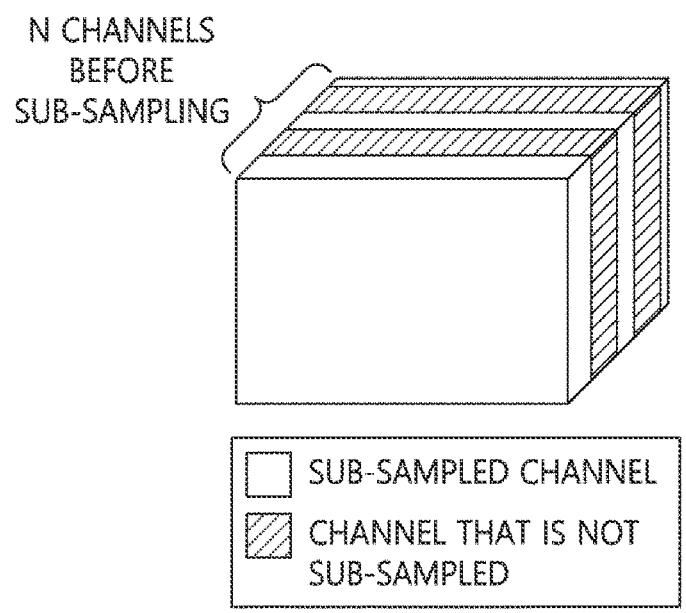
FIG. 7 illustrates the case in which a channel that is not sub-sampled is filled with a specific value according to an embodiment.
Figure 8:
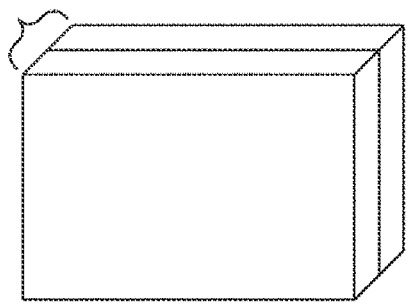
FIG. 8 illustrates the case in which, after sub-sampling is performed in units of channels, only sub-sampled channels are transmitted according to an embodiment.

FIG. 7 and FIG. 8 illustrate methods for performing sub-sampling in units of channels according to an embodiment.

FIG. 7 illustrates the case in which a channel that is not sub-sampled is filled with a specific value according to an embodiment.

FIG. 8 illustrates the case in which, after sub-sampling is performed in units of channels, only the sub-sampled channels are transmitted according to an embodiment.

In an embodiment, the sub-sampler 510 may fill the location of the channel removed by sampling with a specific value, as illustrated in FIG. 7.

For example, the specific value may be 0. Alternatively, the specific value may be the median of the values corresponding to one or more channels adjacent to the removed channel. In embodiments, the median value and the average value may be used interchangeably with each other.

In an embodiment, only information about the channels remaining after sub-sampling is performed may be transmitted as information about the feature map, as illustrated in FIG. 8.

Alternatively, the sub-sampler 510 may copy a channel adjacent to the channel removed by sampling to the removed channel, or may copy the weighted average channel of multiple channels adjacent to the channel removed by sampling to the removed channel.

The sub-sampler 510 may output the preprocessed feature information so as to have the same size as the feature information through the above-described filling or copying process. When output is performed in this way, the above-described sub-sampling method information may not be transmitted.

Figure 9:
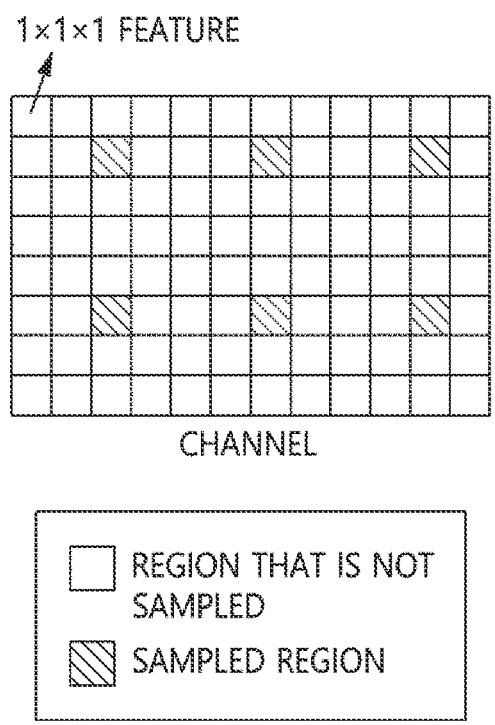
FIG. 9 illustrates a sampling method for a unit of a feature region within a channel according to an embodiment.

FIG. 9 illustrates a method for sampling in units of feature regions within a channel according to an embodiment.

At step 610, the sub-sampler 510 may perform sub-sampling on the feature information in units of feature regions within a channel.

The sub-sampler 510 may perform sub-sampling on one or more feature regions within a single channel according to specific criteria.

The minimum size of a feature region may be 1. The maximum size of the feature region may be the size of the entire channel.

The specific criteria may include a sampling rate and a sampling phase.

The unit of sampling may be a feature group.

For example, sampling may be performed as illustrated in FIG. 9.

The sampling phase may be feature coordinates or an index mapped to the feature coordinates. The feature coordinates may be assigned based on the upper-left corner of the channel.

Sampling may start from the sampling phase, and may be performed while maintaining an interval equal to the sampling rate in a horizontal direction and a vertical direction.

The sampling information may include the sampling rate and the sampling phase. The feature information encoder 150 performs encoding on the sampling information, thereby generating encoded sampling information. The information about the feature map may include the encoded sampling information.

The sampling information may be generated and transmitted in units of pictures or in units of picture groups.

Figure 10:
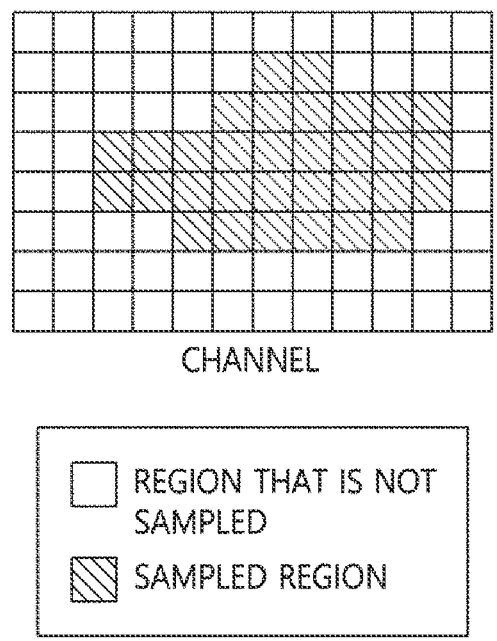
FIG. 10 illustrates another sampling method for a unit of a feature region within a channel according to an embodiment.

FIG. 10 illustrates another method for sampling in units of feature regions within a channel according to an embodiment.

Figure 11:
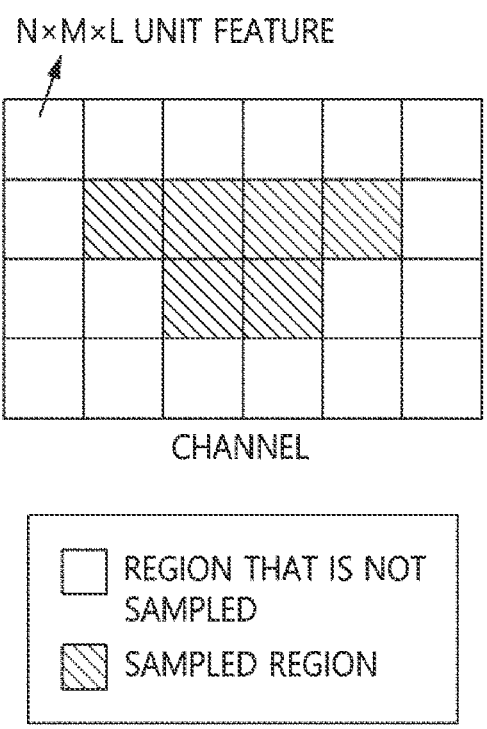
FIG. 11 illustrates a sampling method for a unit feature within a channel according to an embodiment.

FIG. 11 illustrates a method for sampling of a unit feature within a channel according to an embodiment.

The specific criteria described above with reference to FIG. 9 may be criteria using the representative value of a unit feature. Sampling based on the specific criteria may be performed as illustrated in FIG. 11.

The unit feature may be a group of features having a size equal to or greater than 1×1×1.

The representative value of the unit feature may be the median value, the average value, the maximum value, the minimum value, or the like of the values of the unit feature.

The sub-sampler 510 may (selectively) perform sub-sampling on a unit feature having a representative value equal to or greater than a specific threshold.

The unit feature information may indicate the sub-sampled unit feature. For example, the unit feature information may indicate the index of the sub-sampled unit feature. The feature information encoder 150 performs encoding on the unit feature information, thereby generating encoded unit feature information. The information about the feature map may include the encoded unit feature information.

FIG. 12 illustrates a sampling method using feedback according to an embodiment.

The specific criteria described above with reference to FIG. 9 may be derived using the feedback from the decoding apparatus 2200.

The specific criteria may be derived as shown in FIG. 12.

The feedback from the decoding apparatus 2200 may indicate the type of task to be performed in the encoding apparatus 100 that received the feature information.

When the type of the task is object detection, the sub-sampler 510 may select a region having high importance from the aspect of an object detection task in the respective channels of the feature information as the sub-sampled region.

Sub-sampling region information may include the number of sub-sampled regions in a channel, the coordinates of the upper-left corner of the sub-sampled region, the width of the sub-sampled region, the height of the sub-sampled region, and the like.

The feature information encoder 150 performs encoding on the sub-sampling region information, thereby generating encoded sub-sampling region information. The information about the feature map may include the encoded sub-sampling region information.

In an embodiment, information about only the sub-sampled region, among the entirety of the channel, may be transmitted. In other words, preprocessed feature information may include information pertaining to the sub-sampled region, among the entirety of the channel.

In an embodiment, the region remaining after excluding the sub-sampled region from the entirety of the channel may be packed with a specific value. For example, the specific value may be the median value of the channel, the value of an adjacent sampled feature, or the average value of multiple adjacent sampled features.

By applying such packing, channel size information indicating the size of the channel before sampling may be used. The feature information encoder 150 performs encoding on the channel size information, thereby generating encoded channel size information. The information about the feature map may include the encoded channel size information.

When the above-described channel size information is used, the sub-sampling method information and/or information related to sub-sampling according to the sub-sampling method may not be generated or transmitted. Here, the information related to sub-sampling may include the sub-sampling region information.

Reference is again to be made to FIG. 6.

At step 620, the domain transformer 520 performs domain transformation on one or more feature maps, thereby generating transformed feature information.

Domain transform type information may indicate the type of domain transform applied to the feature information, among available types of domain transform. For example, the type of domain transform may be 1) 3-dimensional (3D) Discrete Cosine Transform (DCT), 2) 2D-DCT, 3) orthogonal linear transform, or 4) Principal Component Analysis (PCA).

The feature information encoder 150 performs encoding on the domain transform type information, thereby generating encoded domain transform type information. The information about the feature map may include the encoded domain transform type information.

Depending on the type of domain transform, the feature information preprocessor 140 may output a transform coefficient or a transform basis vector as the result of domain transformation performed on information indicating a picture. The transformed feature information may include the transform coefficient or the transform basis vector.

Figure 13:
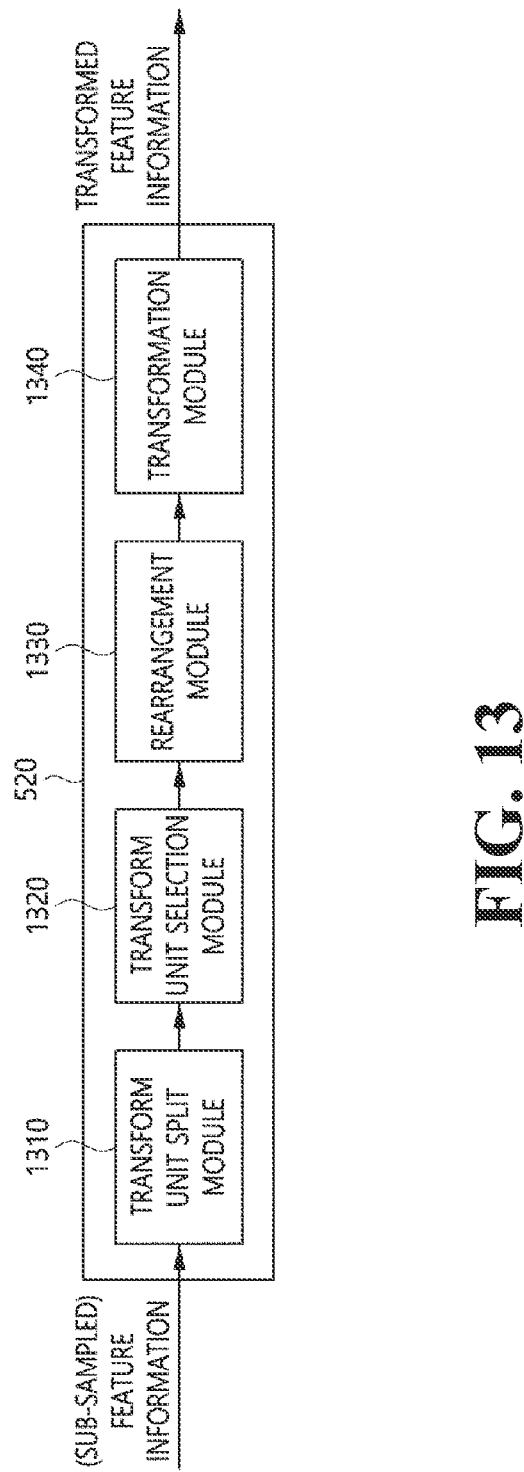
FIG. 13 illustrates the structure of a domain transformer according to an embodiment.

FIG. 13 illustrates the structure of a domain transformer according to an embodiment.

The domain transformer 520 may include one or more of a transform unit split module 1310, a transform type selection module 1320, a rearrangement module 1330, and a transformation module 1340.

The feature information (to which sub-sampling is applied) may be input to the transform unit split module 1310.

The transformation module 1340 may generate transformed feature information.

The functions, operations, and the like of the transform unit split module 1310, the transform type selection module 1320, the rearrangement module 1330, and the transformation module 1340 will be described in more detail below.

Figure 14:
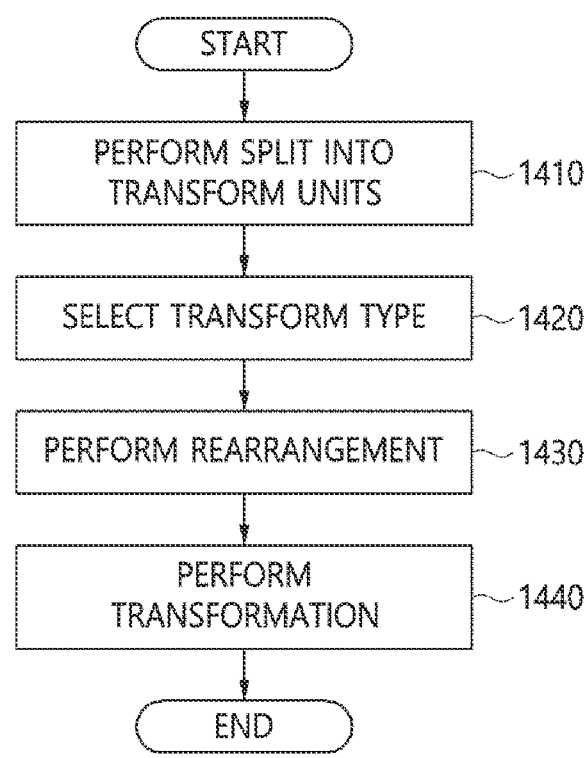
FIG. 14 is a flowchart of a domain transformation method according to an embodiment.

FIG. 14 is a flowchart of a domain transformation method according to an embodiment.

Step 620, described above with reference to FIG. 6, may include steps 1410, 1420, 1430 and 1440.

The order of steps 1410, 1420, 1430 and 1440 may be changed. Also, some of steps 1410, 1420, 1430 and 1440 may be skipped.

Through steps 1410, 1420, 1430 and 1440, one or more of a split into transform units, selection of a transform type, rearrangement, and transformation may be performed on the feature information input to the feature information preprocessor 140.

At step 1410, the transform unit split module 1310 may split the feature map into multiple transform units.

The feature map may comprise multiple feature maps.

The feature map input to the transform unit split module 1310 may be N-dimensional. The sizes and/or shapes of the feature maps may be different from each other.

In an embodiment, the transform unit may be each of the multiple feature maps that are input to the transform unit split module 1310.

In an embodiment, the transform unit may be a segment of a feature map generated by splitting each of the multiple feature maps.

Figure 15:
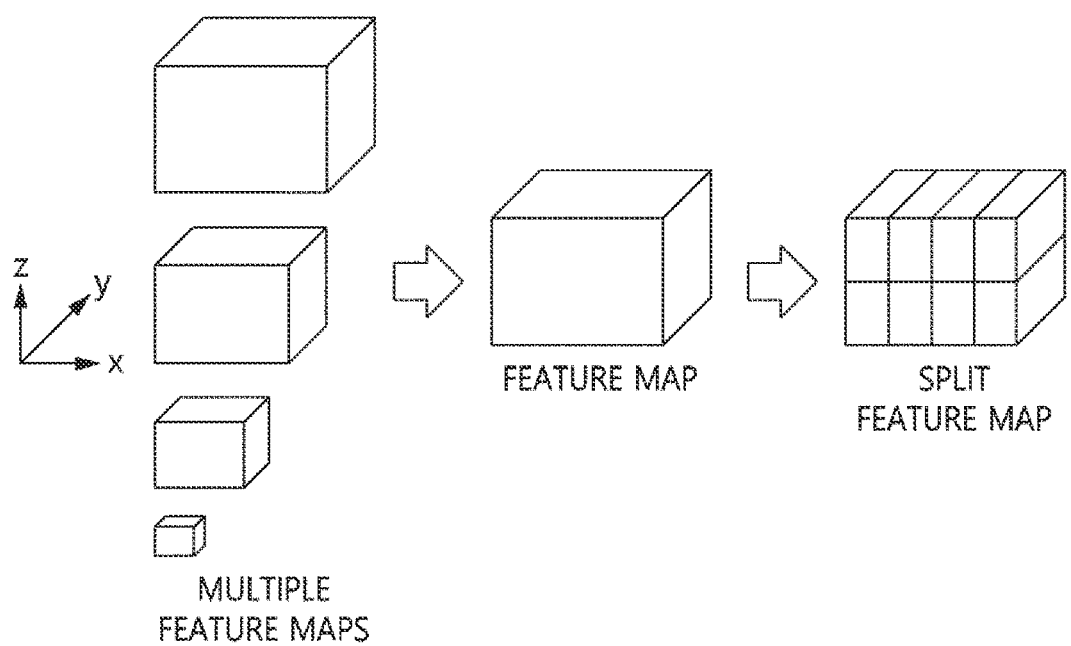
FIG. 15 illustrates a split of a feature map according to an embodiment.

FIG. 15 illustrates a split of a feature map according to an embodiment.

The following methods may be used for a split of a feature map.

1) The transform unit split module 1310 may evenly split a feature map along one or more axes of the feature map, or may unevenly split the same.

The split information may be information indicating a split along one or more axes of the feature map. The one or more axes may include an x-axis, a y-axis, and a z-axis.

The transform unit split module 1310 may generate split information. The feature information encoder 150 performs encoding on the split information, thereby generating encoded split information.

The information about the feature map may include the encoded split information.

The split information may include 1) the number of axes along which a split is applied and 2) information indicating the axis to which the split is applied. The information indicating the axis to which the split is applied may be the index of the axis.

When the feature map is evenly split along one or more axes thereof, the split information may include 1) a split ratio applied to each of the one or more axes, 2) the length(s) of segments into which the feature map is split along the respective axes, and 3) the numbers of segments into which the feature map is split along the respective axes. Alternatively, the length(s) of segments into which the feature map is split along the respective axes may be derived using the length(s) of segments into which a feature map smaller than the current feature map is split along the respective axes.

When the feature map is unevenly split along one or more axes thereof, the split information may include 1) the number of segments into which the feature map is split along each axis and 2) the lengths of the multiple segments along the axis.

The split information may include feature map shape information indicating the shape of the feature map. Also, the split information may include feature map split information indicating the method of splitting the feature map.

Also, the split information may include 1) a transform unit index for each transform unit and 2) coordinates of each transform unit in the feature map.

Reference is again to be made to FIG. 14.

At step 1420, the transform type selection module 1320 may select the transform type to be applied to each of the multiple transform units.

For example, the transform type selection module 1320 may select the transform type to be applied to the transform unit, among 3D-DCT, 2D-DCT, orthogonal linear transform, and PCA.

The transform type selection module 1320 may select the transform type to be applied to the transform unit using 1) a distribution of the transform unit, 2) a distribution pattern thereof, or the like.

The transform type information for a transform unit may indicate the transform type selected for the transform unit.

The transform type selection module 1320 may generate transform type information. The feature information encoder 150 performs encoding on the transform type information, thereby generating encoded transform type information.

The information about the feature map may include the encoded transform type information.

At step 1430, the rearrangement module 1330 rearranges the transform unit, thereby generating a rearranged transform unit. Through the rearrangement, the shape of the transform unit may be changed.

Rearrangement of the transform unit may be performed multiple times. The rearrangement module 1330 may perform different types of rearrangement on the transform unit.

The rearrangement module 1330 splits the transform unit along a single axis or multiple axes, thereby generating multiple segments of the transform unit.

The rearrangement module 1330 concatenates the multiple segments of the transform unit according to a specific sequence along a single direction or multiple directions, thereby generating a rearranged transform unit.

Figure 16:
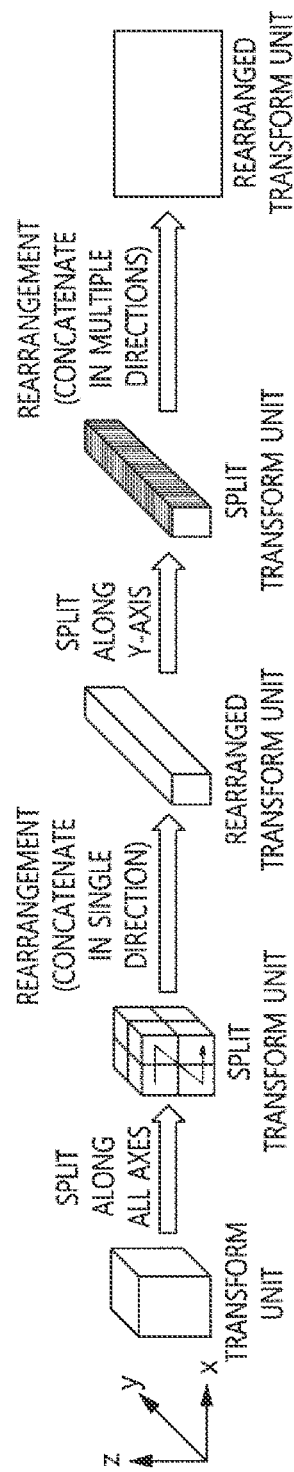
FIG. 16 illustrates that rearrangement is performed twice according to an example.

FIG. 16 illustrates that rearrangement is performed twice according to an example.

In FIG. 16, the rearrangement module 1330 may split a transform unit along all of the three axes, namely an x-axis, a y-axis, and a z-axis. The rearrangement module 1330 splits the transform unit along all of the axes, thereby generating multiple segments of the transform unit.

The rearrangement module 1330 may perform rearrangement by concatenating the multiple segments of the transform unit along the direction of the x-axis. The direction of the x-axis may be an example of a single direction.

The rearrangement module 1330 performs rearrangement so as to concatenate the multiple segments of the transform unit along the direction of the x-axis, thereby generating a rearranged transform unit.

The rearrangement module 1330 may again split the rearranged transform unit along the y-axis.

The rearrangement module 1330 splits the rearranged transform unit along the y-axis, thereby generating multiple segments of the transform unit. Here, the y-axis may be an example of a single axis.

The rearrangement module 1330 may perform rearrangement by concatenating the multiple segments of the transform unit in the directions of the x-axis and the z-axis. The x-axis and the z-axis may be an example of multiple axes.

When multiple types of rearrangement using different methods are performed, rearrangement information may be used. The rearrangement information may indicate the multiple types of rearrangement applied to the transform unit.

The rearrangement information may include information indicating the number of times rearrangement is performed.

When multiple types of rearrangement using different methods are performed, the rearrangement module 1330 may generate rearrangement information. The feature information encoder 150 performs encoding on the rearrangement information, thereby generating encoded rearrangement information.

The information about the feature map may include the encoded rearrangement information.

The rearrangement information may include 1) the number of times rearrangement is performed and 2) information about each type of rearrangement when multiple types of rearrangement are performed.

The information about rearrangement may include 1) the size and shape of a transform unit before a split, 2) the shape of the split transform unit, 3) the number of axes along which the transform unit is split, 4) the ratio of the split, 5) the number of directions along which the segments of the split transform unit are concatenated, 6) information indicating the direction along which the segments of the split transform unit are concatenated (e.g., the index of the direction), 7) information indicating the scan order in which the segments of the split transform unit are scanned, 8) information indicating the order of rearrangement, and the like.

The information indicating the scan order may be an index for a scan order table.

The information indicating the order of rearrangement may be an index for a rearrangement order table.

When a transform unit is evenly split, the length of an axis of an additional transform unit may be used. Alternatively, when the transform unit is evenly split, the length of the axis of the additional transform unit may be multiplied by a specific scale, and the length of the axis of the additional transform unit multiplied by the specific scale may be used.

The split information may include information indicating the additional transform unit used to split the transform unit. The information indicating the additional transform unit may be an index for the additional transform unit.

The split information may include the specific scale by which the length of the axis of the additional transform unit is multiplied.

Here, the additional transform unit may be a transform unit generated from the multiple feature maps input to the domain transformer 520.

When the transform unit is evenly split along a specific axis, the length of the axis thereof may not be a multiple of each of the segments of the split axis. When the length of the axis of the transform unit is not a multiple of the length of each segment, the rearrangement module 1330 may perform padding along the axis such that the length of the axis of the transform unit becomes a multiple of the length of each segment. When the length of the axis becomes a multiple of the length of each segment through padding, the rearrangement module 1330 may evenly split the transform unit along the specific axis.

Reference is again to be made to FIG. 14.

At step 1440, the transformation module 1340 performs transformation on the rearranged transform unit, thereby generating 1) a transform coefficient, 2) a transform matrix, or 3) a transform matrix index.

The transformation module 1340 may perform the selected type of transformation on each transform unit.

The transformation information may indicate the type of transformation applied to the transform unit.

The transformation unit 1340 may generate transformation information. The feature information encoder 150 performs encoding on the transformation information, thereby generating encoded transformation information.

The information about the feature map may include the encoded transformation information.

The transformation information may include the transform matrix used for transformation. Alternatively, the transformation information may include information indicating the transform matrix used for transformation. The information indicating the transform matrix used for transformation may be an index for the transform matrix.

The transformation information may include the transform coefficient of the transformation applied to the transform unit.

Alternatively, the transform matrix may be implicitly derived from the transform type.

For example, the transform matrix required for performing transformation may be derived using the current transform unit. All or part of the derived transform matrix may be included in the transformation information.

For example, a single matrix may be selected from a list comprising multiple matrices, and transformation may be performed on the transform unit using the selected matrix. The transformation information may indicate the matrix that is selected for transformation of the transform unit, among the multiple matrices in the list. Here, the transformation information may include the index of the matrix that is selected for transformation of the transform unit, among the multiple matrices in the list.

The matrices included in the list may be 1) matrices derived through optimization of multiple transform units in a single frame or multiple frames or 2) predefined matrices, such as Discrete Cosine Transform (DCT) and Discrete Sine Transform (DST).

When transformation of the transform unit is performed, the transformation module 1340 may transpose one or more specified axes.

The transformation information may include transposition information indicating the transposition applied to the one or more axes.

The order of steps 1410, 1420, 1430 and 1440 may be changed. Also, at least some of steps 1410, 1420, 1430 and 1440 may be skipped.

Reference is again to be made to FIG. 6.

At step 630, the quantizer 530 performs quantization on the transformed feature information, thereby generating quantized feature information. The transformed feature information may be replaced with the feature information or the sub-sampled feature information.

The quantization may be fixed quantization or non-fixed quantization.

The transformed feature information input to the quantizer 530 may have an N-directional form.

The quantization method information may indicate the quantization method that is applied to the transformed feature information, among available quantization methods. For example, the quantization method information may be an index or flag indicating the quantization method that is applied to the transformed feature information, among available quantization methods.

The quantization method information may include a quantization type, and may include information indicating the unit to which quantization is applied. Also, the quantization method information may include an index or flag indicating the quantization type, and may include an index or flag indicating the unit to which quantization is applied.

The feature information encoder 150 performs encoding on the quantization method information, thereby generating encoded quantization method information. The information about the feature map may include the encoded quantization method information.

After the procedure performed by the feature information preprocessor 140, encoding of the feature information may be performed. In the procedure of encoding the feature information, specific high-level information and/or specific low-level information may be generated. The (encoded) quantization method information may be encoded and signaled as additional high-level information and/or additional low-level information that is different from the specific high-level information and/or the specific low-level information. Alternatively, the (encoded) quantization method information may be signaled from the encoding apparatus 100 to the decoding apparatus 2200 in the same manner as the information about the feature map.

Other information described in the embodiments may also be encoded and signaled as the additional high-level information and/or the additional low-level information described above.

Figure 17:
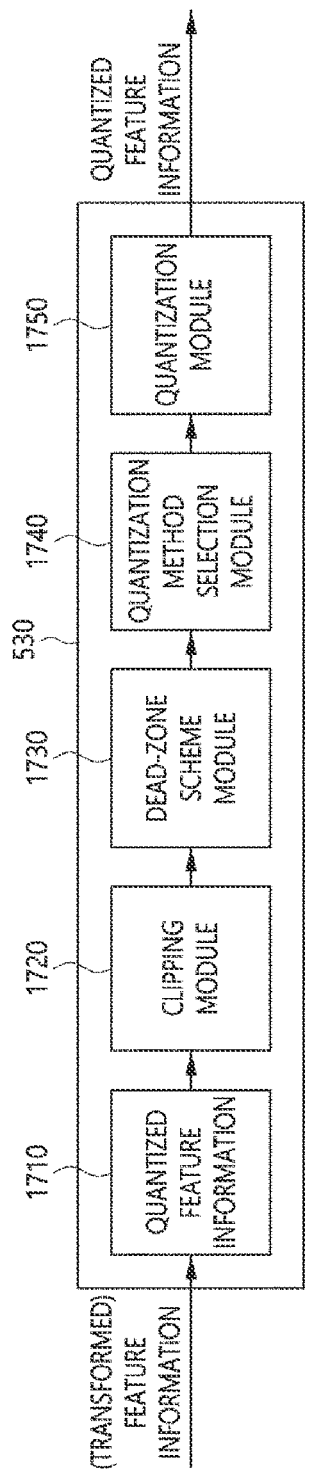
FIG. 17 illustrates the structure of a quantizer according to an embodiment.

FIG. 17 illustrates the structure of a quantizer according to an embodiment.

The quantizer 530 may include one or more of a quantization unit selection module 1710, a clipping module 1720, a dead-zone scheme module 1730, a quantization method selection module 1740, and a quantization module 1750.

The (transformed) feature information may be input to the quantization unit selection module 1710.

The quantization module 1750 may generate quantized feature information.

The functions, operations, and the like of the quantization unit selection module 1710, the clipping module 1720, the dead-zone scheme module 1730, the quantization method selection module 1740, and the quantization module 1750 will be described in more detail below.

Figure 18:
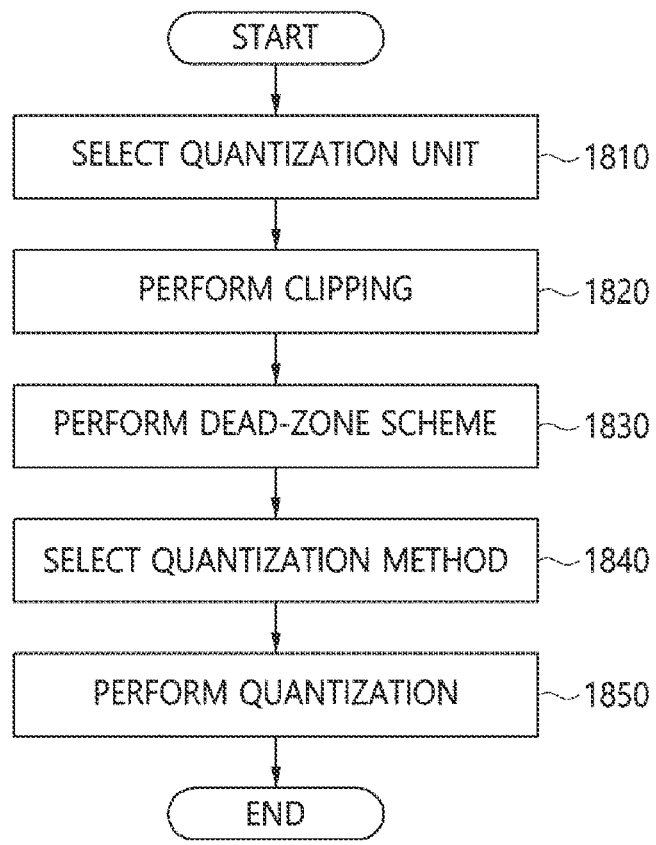
FIG. 18 is a flowchart of a quantization method according to an embodiment.

FIG. 18 is a flowchart of a quantization method according to an embodiment.

Step 630, described above with reference to FIG. 6, may include steps 1810, 1820, 1830, 1840 and 1850.

Through steps 1810, 1820, 1830, 1840 and 1850, one or more of selection of a quantization unit, clipping, a dead-zone scheme, selection of a quantization method, and quantization may be performed on the feature information input to the feature information preprocessor 140.

At step 1810, the quantization unit selection module 1710 may select the quantization unit based on which quantization is to be performed on the information input to the quantizer 530.

For example, when the information input to the quantizer 530 is the transformed feature information output from the domain transformer 520, the quantization unit may be the same as the transform unit used in the domain transformer 520.

When the information input to the quantizer 530 is the transformed feature information output from the domain transformer 520, quantization may be performed using the same unit as the transform unit used in the domain transformer 520.

In this case, quantization may be performed with reference to information about the transform unit used in the domain transformer 520 even though the quantization unit information indicating the unit for quantization is not signaled.

Depending on the selection by the quantization unit selection module 1710, one or more quantization units may be generated from the information input to the quantizer 530.

At step 1820, the clipping module 1720 may receive the one or more quantization units selected by the quantization unit selection module 1710 as the input thereof.

The clipping module 1720 may perform clipping on the one or more quantization units input thereto. Here, the quantization units to which clipping is applied may be some of the one or more quantization units input to the clipping module 1720.

Clipping may be applied based on a predefined maximum value and/or minimum value. Alternatively, the maximum value and/or minimum value to which clipping is applied may be set depending on the distribution of the values of the information input to the quantizer 530.

For example, when the distribution of the values of the information input to the quantizer 530 follows a normal distribution, the maximum value and/or minimum value to which clipping is applied may be set differently depending on the standard deviation of the values of the information input to the quantizer 530.

When clipping is not performed, quantization by the dead-zone scheme module 1730, the quantization method selection module 1740, and the quantization module 1750, which are performed after the operation of the clipping module 1720, may be performed on all of the distributions of the information received as input. Also, fixed quantization information or non-fixed quantization information may include information indicating the maximum value and minimum value of the quantization unit before quantization.

When clipping is performed, clipping information may be used. The clipping module 1720 may generate clipping information. The feature information encoder 150 performs encoding on the clipping information, thereby generating encoded clipping information.

The information about the feature map may include the encoded clipping information.

The clipping information may include information indicating whether clipping is performed. The information indicating whether clipping is performed may be an index or a flag.

The clipping information may include a clipping range (that is, the maximum value and/or minimum value of the clipping range).

Also, the clipping information may include information indicating the quantization method for the clipping range.

Also, when clipping using the maximum value and minimum value fixed for the one or more quantization units input to the clipping module 1720 (that is, the maximum and minimum values common to the one or more quantization units) is performed, the specific maximum value and the specific minimum value may indicate the fixed range for the quantization units on which clipping is performed.

The clipping information may include the specific maximum value and the specific minimum value as a single piece of information.

At step 1830, the dead-zone scheme module 1730 may receive the quantization unit to which clipping is applied and/or the quantization unit to which clipping is not applied as the input thereof.

The dead-zone scheme module 1730 may map all of values present within a specific region in a quantization unit to 0 before fixed quantization and/or non-fixed quantization is performed on the quantization unit.

1) In an embodiment, when the distribution of values in a quantization unit on which quantization is to be performed satisfies [n, m], a dead-zone scheme by which all values falling within the range [q, p] are mapped to 0 may be performed. Here, n may be a specific real number, and m may be a specific real number. q may be a specific real number equal to or greater than n. p may be a specific real number equal to or less than m.

Here, q and p may represent a predefined proportion of the range of the values within the quantization unit on which quantization is to be performed.

q and p may be set by a procedure that is repeated so as to minimize an error. This procedure may be repeated a specific number of times, and may be repeated until the error drops below a specific value.

The error may be a function including a bit rate and performance Here, the performance may indicate the final result output from a machine-learning processor 2250 using a neural network that operates using reconstructed feature information.

2) In an embodiment, the region to which the dead-zone scheme is applied may be determined depending on the characteristics of the distribution of values within the quantization unit on which quantization is to be performed. The characteristics of the distribution may include a variance, a standard deviation, and the like.

3) In an embodiment, when the distribution of values within a quantization unit on which quantization is to be performed satisfies [n, m], a dead-zone scheme by which all values falling within the range [q, p] are mapped to 0 may be performed. Here, n may be a specific real number, and m may be a specific real number. q may be a specific real number equal to or greater than n. p may be a specific real number equal to or less than m.

After such mapping is performed, a single new section for connecting a left section and a right section may be defined using the range [q, p] as a reference. The left section may be a section of values that are equal to or less than q. The right section may be a section of values that are equal to or greater than p.

For example, among values within a quantization unit, q may be added to the values falling within the range [n, q]. Also, among the values within the quantization unit, p may be subtracted from the values falling within the range [p, m]. Then, a fixed quantization method and/or a non-fixed quantization method may be performed on the region of the range [n+q, m−p].

The above-described dead-zone scheme may be performed separately on each of the one or more input quantization units. Alternatively, the dead-zone scheme may be performed in common for all of the one or more input quantization units.

When the dead-zone scheme is used, the dead-zone scheme information may be used. The dead-zone scheme module 1730 may generate dead-zone scheme information. The feature information encoder 150 performs encoding on the dead-zone scheme information, thereby generating encoded dead-zone scheme information.

The information about the feature map may include the encoded dead-zone scheme information.

The dead-zone scheme information may include information indicating whether the dead-zone scheme is performed. The information indicating whether the dead-zone scheme is performed may be an index or a flag.

The dead-zone scheme information may include information indicating the range for which the dead-zone scheme is performed.

At step 1840, the quantization method selection module 1740 may select a quantization method for the one or more quantization units input thereto.

The one or more input quantization units may be quantization units to which the above-described dead-zone scheme is applied. Alternatively, the one or more input quantization units may be quantization units to which the dead-zone scheme is not applied.

The quantization method selection module 1740 may select individual quantization methods for the one or more quantization units input thereto. The quantization method selection module 1740 may select a common quantization method to be performed on all of the one or more quantization units input thereto.

Figure 19:
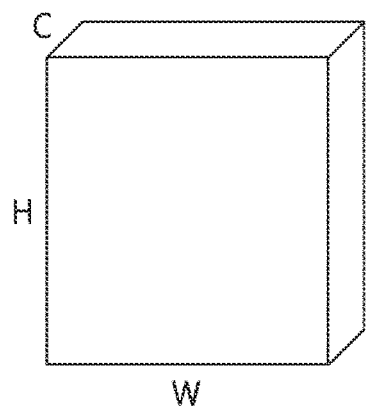
FIG. 19 illustrates a quantization unit based on which quantization is performed according to an example.

FIG. 19 illustrates a quantization unit based on which quantization is performed according to an example.

The quantization unit may have a size of W×H×C. W may be an integer equal to or greater than 1. H may be an integer equal to or greater than 1. C may be an integer equal to or greater than 1.

Figure 20:
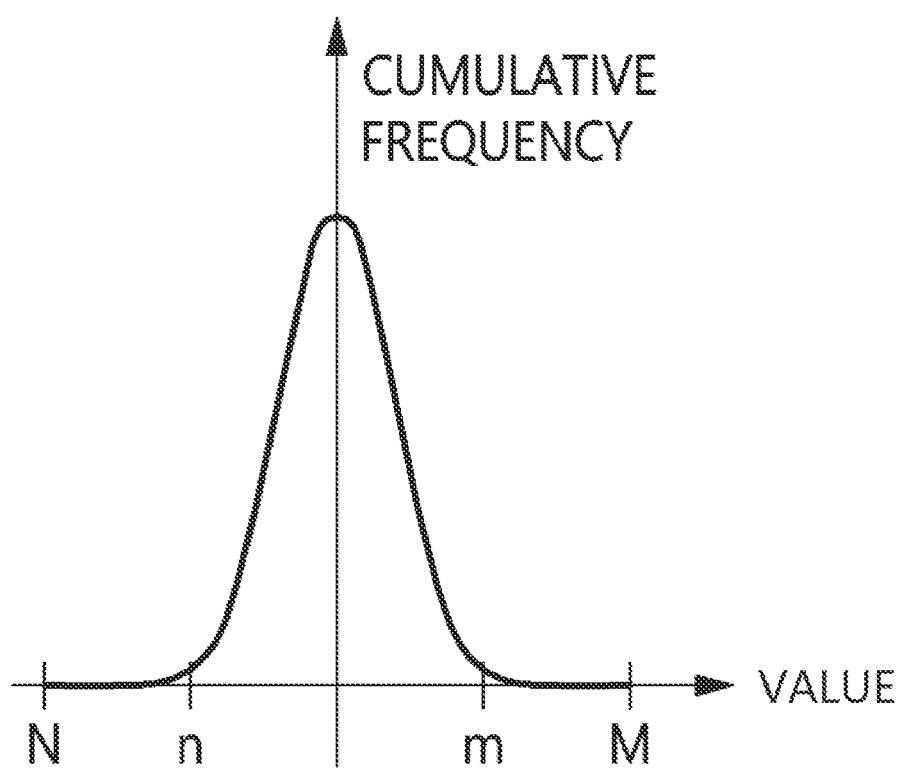
FIG. 20 illustrates the distribution of values within a quantization unit according to an example.

FIG. 20 illustrates the distribution of values within a quantization unit according to an example.

In FIG. 20, the distribution of values within the quantization unit of FIG. 19 is illustrated using a graph.

When the values within the quantization unit have a distribution of [N, M], different quantization methods may be respectively selected for [N, n), [n, m], and (m, M]. N may be a specific real number. M may be a specific real number. n may be a specific real number greater than N. m may be a specific real number less than M. m may be greater than n.

As described above, a quantization method for a specific range may be selected depending on the range or distribution of the values within the quantization unit.

The quantization information may include quantization unit information and quantization method information.

The quantization unit information may indicate a quantization unit.

The quantization method information may indicate the quantization method selected for a specific range of values within the quantization unit. The specific range and the quantization method information corresponding thereto may comprise multiple ranges and multiple pieces of quantization method information, respectively.

For example, the quantization unit information and the quantization method information may be represented as a single index. Alternatively, respective indices may be used for the quantization unit information and the quantization method information.

The quantization method selection module 1740 may generate quantization information. The feature information encoder 150 performs encoding on the quantization information, thereby generating encoded quantization information.

The information about the feature map may include the encoded quantization information.

At step 1850, the quantization module 1750 may perform quantization on the quantization unit.

The quantization may be fixed quantization or non-fixed quantization.

Fixed Quantization

Fixed quantization may be performed on one or more quantization units.

Fixed quantization may be performed based on a quantization level. For the quantization unit on which fixed quantization is performed, specific values, among values within the quantization unit, may be segmented at a uniform interval based on L quantization levels. The specific values may be values that are equal to or greater than the minimum value and equal to or less than the maximum value.

When the quantization level is not defined, a specific value may be used as the initial value of the quantization level. Then, a quantization level that enables a quantization error to be minimized may be derived, and quantization may be performed using the derived quantization level.

The quantization error may be acquired using any of methods, such as Mean Squared Error (MSE), rate performance optimization, and the like.

Deriving a quantization level may be repeated less than a specific number of times, and may be repeated until the quantization error becomes less than a specific value. Through such repetition, the quantization level may be set.

Through the above-described procedure, the quantization units on which fixed quantization is performed may be separately quantized using different quantization levels.

Fixed quantization information may include information indicating the quantization level used in the fixed quantization procedure and information indicating a quantization parameter and a fixed quantization function.

For example, the quantization level may be $2^{N-1}$. N may be a specific integer greater than 1.

The information indicating the quantization level used in the fixed quantization procedure may be N. That is, the quantization level may be represented by signaling N. In the embodiment to be described below, the quantization level may be signaled and represented using N.

The quantization module 1750 may generate fixed quantization information. The feature information encoder 150 performs encoding on the fixed quantization information, thereby generating encoded fixed quantization information.

The information about the feature map may include the encoded fixed quantization information.

Non-Fixed Quantization

For non-fixed quantization, a K-means clustering method, a Lloyd-Max method, or the like may be used.

Non-fixed quantization may be performed on one or more quantization units.

When non-fixed quantization is performed on a quantization unit, the number of quantization levels assigned to a range of values equal to or greater than a specific threshold value, among the full range of values within the quantization unit, may be greater than the number of quantization levels assigned to a range of values less than the specific threshold value.

The specific threshold value may be predefined. Alternatively, the specific threshold value may be set through repeated derivation of the quantization level.

When information input for quantization is a feature map, the greater the value in the feature map, the greater effect the value has on the performance of the machine-learning task of a neural network. Therefore, non-fixed quantization, in which a greater number of quantization levels is assigned to the values equal to or greater than the threshold value in the quantization unit, may be performed.

For example, k may be an integer equal to or greater than 1, and the quantization level may be $2^{K-1}$. n may be a specific real number. m may be a specific real number. p may be a threshold value, which is a specific positive real number.

When values in the quantization unit fall within the range [n, m], the number of quantization levels assigned to a specific range A may be greater than the number of quantization levels assigned to the remainder of the range.

Here, the absolute values of the values falling within the specific range A may be greater than p. That is, the specific range A may be a range of values, the absolute values of which are greater than p, among the values within the quantization unit.

The remaining range may be the range that remains after excluding the specific range A from the full range of the values within the quantization unit.

The different numbers of quantization levels are respectively assigned to the specific range A and the remaining range, whereby non-fixed quantization may be performed.

In this case, the full range may be segmented into the specific range A and the remaining range. The quantization level for the remaining range may be set to $2^{K-U-1}$, and the quantization level for the specific range A may be set to $2^U$. U may be an integer greater than K/2.

The range information for non-fixed quantization may be information for specifying the ranges of non-fixed quantization. In the range information, each range may be specified using K and U. For example, the range information may include K–U and U for the respective ranges.

When the quantization level is not defined in non-fixed quantization, a specific value may be used as the initial value of the quantization level. Then, a quantization level that enables a quantization error to be minimized may be derived, and a value mapped to each section may be derived depending on the quantization level. Through such derivation, non-fixed quantization may be performed.

Using any of methods such as MSE, rate performance optimization, and the like, the distance between quantization levels that enables the quantization error between a value before quantization and a value after quantization to be minimized may be derived, and quantization may be performed for the value mapped to each section depending on the derived quantization levels. Such derivation and quantization procedures may be repeated less than a specific number of times, and may be repeated until the quantization error reaches a value less than a specific value.

Non-fixed quantization information may include one or more quantization levels used for the above-described fixed quantization and non-fixed quantization.

The non-fixed quantization information may include a quantization parameter.

The non-fixed quantization information may include information about mapping between a value before quantization and a value after quantization. The information about the mapping may include an index for a mapping table and information about the mapping table. The mapping table may be generated in the encoding procedure, or may be a predefined table.

The non-fixed quantization information may include a non-fixed quantization function.

Also, the non-fixed quantization information may include the above-described range information.

The quantization module 1750 may generate non-fixed quantization information. The feature information encoder 150 performs encoding on the non-fixed quantization information, thereby generating encoded non-fixed quantization information.

The information about the feature map may include the encoded non-fixed quantization information.

Information related to quantization, such as the non-fixed quantization information, may be generated, used, and signaled for each quantization unit.

According to an embodiment, the domain transformer 520 may perform PCA on the information input thereto, and principal component information extracted by performing PCA may be used as the input to the quantizer 530.

For example, the principal component information extracted by performing PCA may be 1) a basis, 2) a coefficient, 3) a pair comprising an eigen vector and an eigen value (that is, "(eigen vector, eigen value)"), and/or 4) a mean.

Depending on the PCA performed by the domain transformer 520, one or more pieces of principal component information may be extracted from the information input to the domain transformer 520.

With regard to the one or more extracted pieces of principal component information, whether quantization is performed, the quantization method that is applied, and the quantization unit may be determined for the unit of principal component information.

Depending on the information indicating whether quantization is performed, the quantization method that is applied, and the quantization unit, quantization may be performed on the principal component information.

The quantization information may include the information indicating whether quantization is performed, the quantization method that is applied, and the quantization unit.

In the quantization procedure, additional information may be used. With regard to the additional information, quantizer module execution information, which indicates whether each of the modules of the quantizer 530 operates for each piece of principal component information, may be generated as specific high-level information and/or specific low-level information.

The quantization module 1750 may generate quantizer module execution information. The feature information encoder 150 performs encoding on the quantizer module execution information, thereby generating encoded quantizer module execution information.

The information about the feature map may include the encoded quantizer module execution information.

In an embodiment, a quantization method may be determined depending on the distribution of values in the information input to the quantizer 530.

When the information input to the quantizer 530 is a basis, a coefficient, and/or a mean generated by PCA applied in the domain transformer 520, the basis, the coefficient, and the mean may be set as respective quantization units. Also, the subgroups of the basis, the coefficient, and the mean may be set as quantization units.

When the quantization units are set, the procedure to be described below may be performed on each of the quantization units.

When the distribution of values within a quantization unit falls within the range [n, m], quantization in which the quantization level for real numbers within the quantization unit is set to an integer having a value of $2^{K-1}$ may be performed.

n may be a real number. m may be a real number.

An escape quantization method may be used for the above-described quantization.

The escape quantization method may be a method in which 1) fixed quantization and/or non-fixed quantization using integer values equal to or greater than 0 and equal to or less than $2^{K-1}$ is performed on the range C and in which 2) quantization using a specially configured table is performed on the range B.

The range B may be a range of values that fall within the range [n, m] but have absolute values greater than p.

The range C may be a range of values that fall out of the range B in the full range of the values in the quantization unit.

As described above, quantization may be separately performed on the range B and the range C in the escape quantization method.

Embodiments of the escape quantization method will be described below.

1) When n is a negative value and when m is a positive value, the range B may be [n, −p] and (p, m].

For the range [−p, p], fixed quantization and/or non-fixed quantization to integers may be performed such that specific sections within the range [−p, p] are mapped to specific integer values.

Here, the quantization level of quantization may be $2^{K-1}$. The specific integer values may be equal to or greater than 0 and equal to or less than $2^{K-1}$.

For the values falling within the range [n, −p) and the range (p, m], quantization may be performed as described below.

2) Values falling within the range [n, −p) may be quantized to a value of t, and values falling within the range (p, m] may be quantized to a value of u.

Here, t may be a quantized value for one end section of the range [−p, p] on which quantization has been performed. In other words, t may be generated through quantization of a value within the range [−p, x]. x may be a real number.

Also, u may be a quantized value for the other end section of the range [−p, p] on which quantization has been performed. In other words, u may be generated through quantization of a value within the range [y, p]. y may be a real number.

When quantization is performed on the values falling within the range [n, −p) and the values falling within the range (p, m], quantization range information may be used. As the quantization range information, information indicating that the quantized value is generated by performing quantization on the value falling out of the range [−p, p] may be used. The quantization range information may be an index and/or a flag.

The quantization module 1750 may generate quantization range information. The feature information encoder 150 performs encoding on the quantization range information, thereby generating encoded quantization range information.

The information about the feature map may include the encoded quantization range information.

3) When dequantization is performed on the quantized value, k is used for the real number to which the quantized value is mapped, whereby final dequantization may be performed. The final dequantization may be performed by adding k to the real number value to which the quantized value is mapped or by subtracting k from the real number value to which the quantized value is mapped. In order to perform such final dequantization, a table specifying final dequantization may be configured. k may be a predefined real number, or may be a real number set in the quantization procedure.

The dequantization information may include information about the table. Also, when k is a value set in the quantization procedure, the dequantization information may include k.

The quantization module 1750 may generate dequantization information. The feature information encoder 150 performs encoding on the dequantization information, thereby generating encoded dequantization information.

The information about the feature map may include the encoded dequantization information.

4) The above-described table may be configured as described below.

The range [n, −p) may be segmented into s sections. For the real number t acquired by performing dequantization for the range [n, −p), an optimal multiple for each of the s sections may be derived. The optimal multiple may be a multiple that enables the minimum error to be achieved when it is added to t or subtracted from t, among the multiples of the real number k.

The table may include 1) the number of sections, 2) the value of k, 3) the value of the optimal multiple for each of the sections, and 4) addition/subtraction information for each of the sections. The addition/subtraction information may indicate whether the operation performed on t and the optimal multiple is addition or subtraction.

Here, the error may be a result derived after inverse domain transformation and machine-learning processing using a neural network, which are performed after dequantization.

The procedure of deriving such an optimal multiple is 1) repeated a specific number of times or 2) repeated until the error value becomes equal to or less than a reference, whereby components constituting the table may be acquired. Also, using the acquired components, the table for the range [n, −p) may be configured.

Using a method that is the same as or similar to the above-described method for configuring the table for the range [n, −p), a table for the range (p, m] may be configured.

The above-described information about quantization (e.g., information about whether quantization is performed, the method of performing quantization, the quantization unit, and the like) may be specified as an index or a flag, or may be specified as an index for a predefined mapping table.

Reference is again to be made to FIG. 6.

At step 640, the rearranger 540 may rearrange the feature information. The feature information may be the quantized feature information on which the above-described quantization is performed, or may be the feature information on which quantization is not performed.

The rearranger 540 performs rearrangement on the feature information input thereto, thereby generating one or more pieces of rearranged feature information.

When the information input to the rearranger 540 has a 3D form, the rearranger 540 may rearrange the information input thereto in a 2D form, and may output the information having a 2D form.

When the sampled feature information to which sub-sampling by the sub-sampler 510 is applied is input to the rearranger 540, the rearranger 540 may output rearranged sampled feature information, as described below with reference to FIG. 21.

Figure 21:
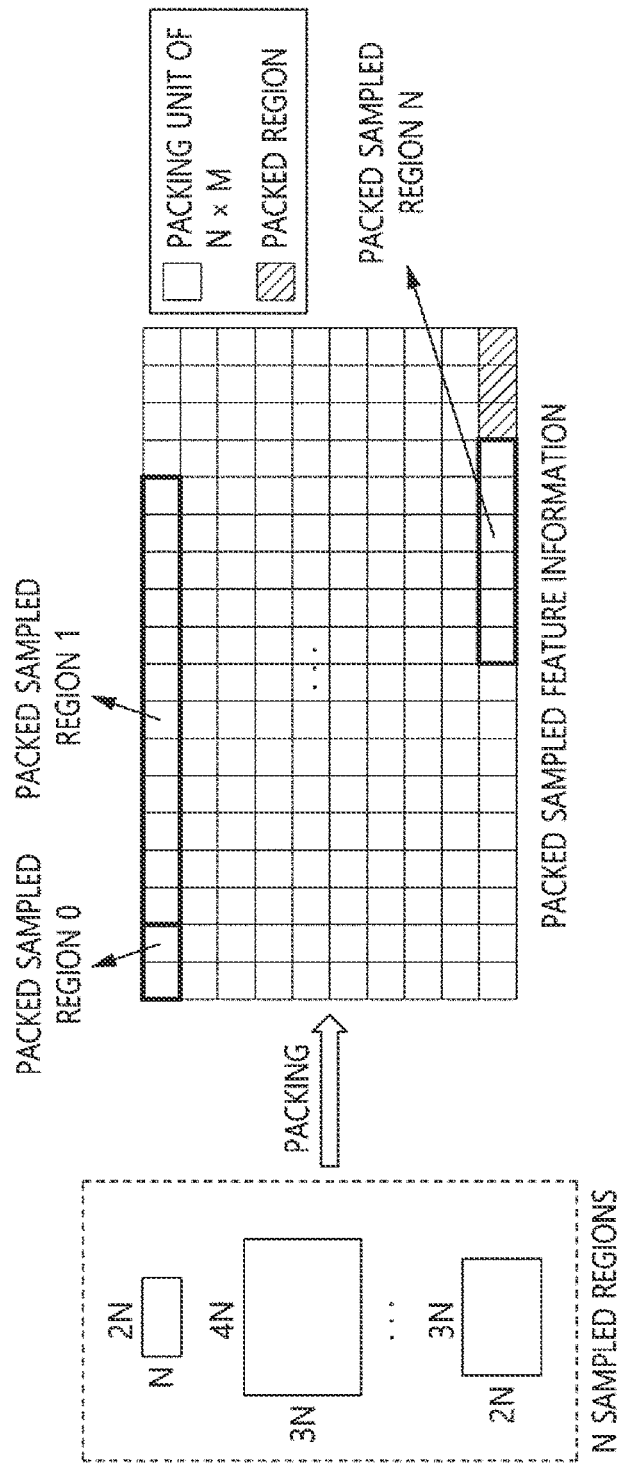
FIG. 21 illustrates the process of packing a sampled region of feature information according to an embodiment.

FIG. 21 illustrates the process of packing the sampled region of feature information according to an embodiment.

As illustrated in FIG. 21, when information input for rearrangement has a 3D form, the rearranger 540 may rearrange the input information in a 2D form and output the information that is rearranged in a 2D form.

When information input for rearrangement has a 3D form and is packed in a 2D form, the information input for rearrangement may be packed into one or more 2D forms.

The information input for rearrangement may be N sampled regions. The sampled region may be a channel or a partial region of the channel.

The rearranger 540 may split the sampled region into rearrangement units having a size of N×M. N may be an integer equal to or greater than 1. M may be an integer equal to or greater than 1.

The rearranger 540 scans the one or more rearrangement units within the sampled region according to a specific scan order, thereby arranging the same in a single horizontal line. For example, the specific scan order may be the order in which a raster scan is performed.

The rearranger 540 performs rearrangement according to a specific order, thereby generating rearranged feature information. The rearranged feature information may be rearranged sampled feature information. The specific order may be an ascending order or a descending order.

The preprocessed feature information may be the rearranged feature information. Alternatively, the preprocessed feature information may include the rearranged feature information.

In an embodiment, when the information input to the rearranger 540 is 3D information and when the feature map indicated by the information input to the rearranger 540 has a size of W×H×C, the feature map may be split along the axis corresponding to C. That is, the feature map may be split into C pieces of information, each having a size of H×W×1. Here, H may be an integer equal to or greater than 1. W may be an integer equal to or greater than 1. C may be an integer equal to or greater than 1.

After the split, the rearranger 540 may perform rearrangement on the C pieces of information, each having a size of H×W×1. Rearrangement may be tiling into 2D information according to the order in which a raster scan is performed.

The raster scan may be performed according to the sequence of the indices of C for the axis corresponding to C.

In an embodiment, information of multiple feature maps, rather than a single feature map, may be input to the rearranger 540. When information of multiple feature maps is input to the rearranger 540, rearrangement described above may be performed on each of the multiple feature maps.

In this case, rearrangement information for each of the feature maps may include information indicating whether rearrangement is performed on each of the feature maps. The information indicating whether rearrangement is performed may be an index or a flag.

The rearranger 540 may generate rearrangement information. The feature information encoder 150 performs encoding on the rearrangement information, thereby generating encoded rearrangement information.

The information about the feature map may include the encoded rearrangement information.

The (encoded) rearrangement information may be generated and transmitted as information pertaining to high-level syntax.

When rearrangement into a single 2D plane is performed by concatenating multiple feature maps, inverse rearrangement information for performing inverse rearrangement is required in a decoding procedure.

The inverse rearrangement information may include 1) the value of C of each of the multiple feature maps and 2) the location at which rearrangement of each of the feature maps ends (in the 2D plane).

The rearranger 540 may generate inverse rearrangement information. The feature information encoder 150 performs encoding on the inverse rearrangement information, thereby generating encoded inverse rearrangement information.

The information about the feature map may include the encoded inverse rearrangement information.

In an embodiment, one or multiple pieces of 3D feature map data input to the rearranger 540 may represent one or more feature maps, and the one or more feature maps may be split along a single axis. Information segments may be generated by the split.

When such a split is performed, values in the information segment may have certain characteristics. For example, the characteristics may include a mean, a standard deviation, cross-correlation, and the like.

Clustering may be applied to pieces of information having similarity with respect to one or more characteristics. Also, sorting depending on the characteristics may be applied to the pieces of information. After methods such as clustering, sorting, and the like are performed, rearrangement using tiling may be performed on the information segments.

When rearrangement using tiling is performed, tiling usage information may be used. The tiling usage information may indicate whether rearrangement using tiling is performed. The tiling usage information may be an index or a flag.

The rearranger 540 may generate tiling usage information. The feature information encoder 150 performs encoding on the tiling usage information, thereby generating encoded tiling usage information.

The information about the feature map may include the encoded tiling usage information.

The tiling usage information may be generated and transmitted at a high level.

Tiling order information may include an index for the tiling order and a table for the tiling order. The tiling order information may be used for decoding of information generated by tiling.

The rearranger 540 may generate tiling order information. The feature information encoder 150 performs encoding on the tiling order information, thereby generating encoded tiling order information.

The information about the feature map may include the encoded tiling order information.

When rearrangement by the rearranger 540 is performed, the rearrangement information may include 1) information indicating whether rearrangement is performed. Also, the rearrangement information may include 2) the width of each of the sampled regions, 3) the height of each of the sampled regions, 4) the number of sampled regions, 5) the width of a packing unit, 6) the height of the packing unit, 7) the scan order of the packing units within the sampled region, 8) the size of a 3D form, and the like.

The feature information encoder 150 performs encoding on the rearrangement information, thereby generating encoded rearrangement information. The information about the feature map may include the encoded rearrangement information.

The procedure of encoding the feature information may be performed after the procedure performed by the feature information preprocessor 140. In the procedure of encoding the feature information, specific high-level information and/or specific low-level information may be generated. The (encoded) rearrangement information may be encoded and signaled as additional high-level information and/or additional low-level information that is different from the specific high-level information and/or the specific low-level information. Alternatively, the (encoded) rearrangement information may be signaled from the encoding apparatus 100 to the decoding apparatus 2200 in the same manner as the information about the feature map.

Reference is again to be made to FIG. 2.

At step 250, the feature information encoder 150 may receive the information generated by the feature information preprocessor 140, such as the preprocessed feature information. Also, the feature information encoder 150 may receive the information generated by the feature information extractor 130. The feature information encoder 150 performs encoding on the received information, thereby generating encoded information.

Also, the feature information encoder 150 may receive feature information (to which preprocessing is not applied) and perform encoding on the feature information, thereby generating encoded feature information.

The information about the feature map may include the encoded information generated by the feature information encoder 150. Alternatively, the feature map bitstream may include the encoded information.

Encoding of the information by the feature information encoder 150 may be optional. The information about the feature map may include the information generated by the feature information extractor 130 and/or the feature information preprocessor 140.

In an embodiment, the feature information encoder 150 may use the same encoding method as the encoding method used by the image encoder 120 when it encodes the above-described information.

In an embodiment, the feature information encoder 150 may use a neural network when it encodes the above-described information.

In an embodiment, the feature information encoder 150 may use an image encoder when it encodes the above-described information. The image encoder may perform one or more of 1) segmentation of feature information, 2) prediction, 3) transformation, 4) quantization, 5) entropy encoding, 6) dequantization, 7) inverse transformation, 8) filtering, and 9) storage of a reconstructed feature map. The image encoder may generate a feature map bitstream including the encoding result.

When data input to the feature information encoder 150 has a 3D form, the 3D data may be segmented into geometry information and feature coefficient information. The feature coefficient information may be color information.

The feature information encoder 150 performs encoding on the geometry information, thereby generating encoded geometry information. The feature map may include the encoded geometry information.

The feature information encoder 150 performs encoding on the feature coefficient information, thereby generating encoded feature coefficient information. The feature map may include the encoded feature coefficient information.

The geometry information may be one of 1) (x, y) of an orthogonal coordinate system in 2D space, 2) (r, θ) of a cylindrical coordinate system in 2D space, 3) (x, y, z) of an orthogonal coordinate system in 3D space, 4) (r, θ, z) of a cylindrical coordinate system in 3D space, and 5) (r, θ, φ) of a spherical coordinate system in 3D space.

The feature-information-encoding method may be the method used in the encoding procedure performed by the feature information encoder 150. For example, the feature-information-encoding method may indicate whether the 3D data is segmented into geometry information and feature coefficient information.

The feature-information-encoding method may be represented as an index. The feature information encoder 150 performs encoding on the index indicating the feature-information-encoding method, thereby generating an encoded index. The information about the feature map may include the encoded index.

Figure 22:
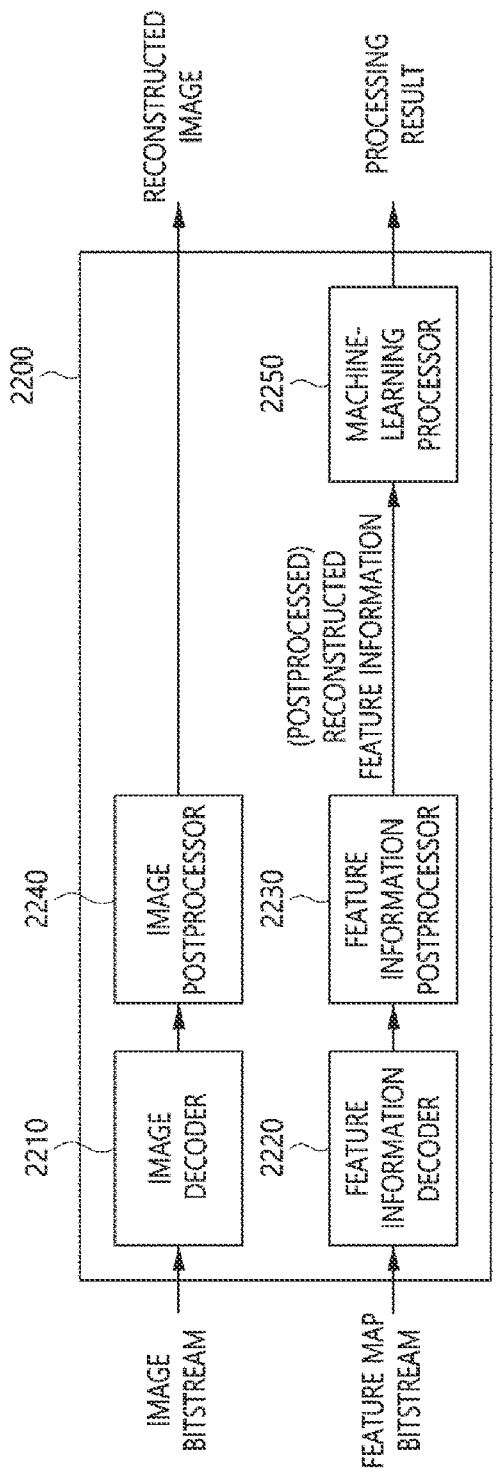
FIG. 22 is a structural diagram of a decoding apparatus according to an embodiment.

FIG. 22 is a structural diagram of a decoding apparatus according to an embodiment.

The decoding apparatus 2200 may perform decoding on an image and feature information, and may have a pipelined structure for processing a neural network.

The decoding apparatus 2200 may include an image decoder 2210, a feature information decoder 2220, a feature information postprocessor 2230, an image postprocessor 2240, and a machine-learning processor 2250.

An image bitstream and a feature map bitstream may be input to the decoding apparatus 2200.

The decoding apparatus 2200 may output a reconstructed image and a processing result. The processing result may be the final result extracted from the neural network of the machine-learning processor 2250.

The functions, operations, and the like of the image decoder 2210, the feature information decoder 2220, the feature information postprocessor 2230, the image postprocessor 2240, and the machine-learning processor 2250 will be described in more detail below.

Figure 23:
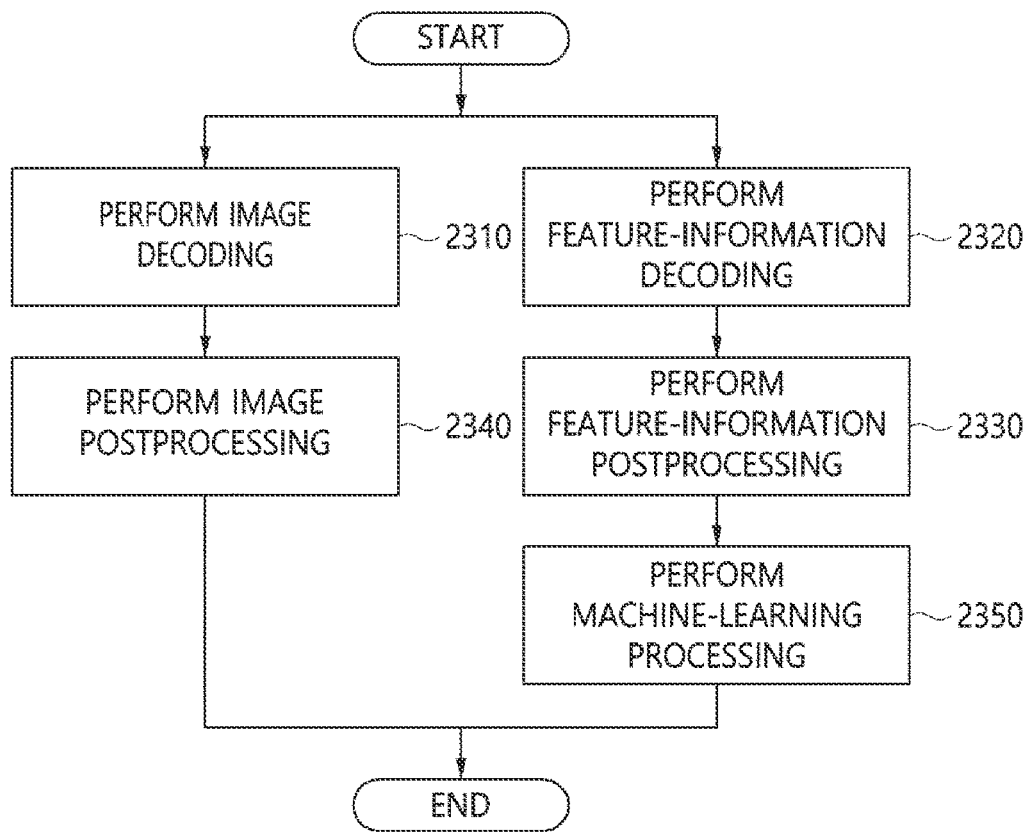
FIG. 23 is a flowchart of a method for decoding an image and feature information according to an embodiment.

FIG. 23 is a flowchart of a method for decoding an image and feature information according to an embodiment.

At step 2310, the image decoder 2210 may receive an image bitstream.

The image bitstream may include encoded image information.

The image bitstream may include information indicating the type of preprocessing performed by the image preprocessor 110.

The decoding apparatus 2200 may perform postprocessing corresponding to the preprocessing. That is, the information indicating the type of preprocessing performed by the image preprocessor 110 may be information indicating the type of postprocessing to be performed by the image postprocessor 2240. The information indicating the type of postprocessing may specify the types of postprocessing to be performed by the image postprocessor 2240.

The image decoder 2210 performs decoding on the encoded image information of the image bitstream, thereby generating a reconstructed image.

The description of the image encoder 120 made in connection with the reconstructed image and decoding may also be applied to the image decoder 2210.

The image decoder 2210 may output the reconstructed image.

At step 2320, the feature information decoder 2220 may receive a feature map bitstream.

The feature map bitstream may include information about a feature map.

The feature information decoder 2220 performs decoding on the information of the feature map bitstream or the feature map, thereby generating reconstructed feature information.

The feature information decoder 2220 may perform decoding that corresponds to encoding described in connection with the feature information encoder 150.

The feature information decoder 2220 performs decoding on the encoded information generated by the feature information encoder 150, thereby acquiring the original information generated in the encoding apparatus 100.

The pieces of information received and/or decoded by the feature information decoder 2220 may be transmitted as information pertaining to High-Level Syntax (HLS). Here, the upper level of the HLS may be a sequence level or a picture level.

The feature information decoder 2220 parses the information of the feature map bitstream or the feature map, thereby acquiring the information generated in the encoding apparatus 100. The generated information may be provided to the feature information postprocessor 2230.

At step 2330, the feature information postprocessor 2230 performs postprocessing on the reconstructed feature information, thereby generating postprocessed reconstructed feature information.

In an embodiment, the postprocessing may include one or more of inverse rearrangement, dequantization, inverse domain transformation, and inverse sampling.

The postprocessing at step 2330 may be selectively performed. Depending on the postprocessing that is selectively performed, the postprocessed reconstructed feature information to be described later may be considered the reconstructed feature information.

The feature information postprocessor 2230 may perform operations and functions that work in the reverse manner from the operations and functions described in connection with the feature information preprocessor 140.

At step 2340, the image postprocessor 2240 performs postprocessing on the reconstructed image, thereby generating a postprocessed reconstructed image.

The postprocessing at step 2340 may be optional. When postprocessing is not performed, the postprocessed reconstructed image described in connection with the embodiments may be replaced with the reconstructed image.

The image bitstream may include information indicating postprocessing. The image postprocessor 2240 performs postprocessing on the reconstructed image using the information indicating postprocessing, thereby generating a postprocessed reconstructed image.

In an embodiment, the postprocessing may include one or more of inverse transformation of a color format and inverse sampling.

At step 2350, the machine-learning processor 2250 may receive the (postprocessed) reconstructed feature information, and may obtain a processing result by performing a machine-learning task for the (postprocessed) reconstructed feature information using one or more neural networks.

The machine-learning task by the machine-learning processor 2250 may indicate the course from a specific point in the entire structure of the neural network (e.g., layers) to the final result. As described above, the feature information of the reconstructed image may be extracted from an intermediate layer. The specific point may be a point after the intermediate layer.

Hereinafter, the steps described above with reference to FIG. 23 and the components of the decoding apparatus 2200 described above with reference to FIG. 22 will be described in more detail.

At step 2320, the feature information decoder 2220 may extract an encoded index from the feature map bitstream or the information about the feature map. The encoded index may indicate the feature-information-encoding method used by the encoding apparatus 100.

The feature information decoder 2220 performs decoding on the encoded index, thereby generating an index. The index may indicate the feature-information-encoding method used by the encoding apparatus 100.

The feature information decoder 2220 performs decoding on the information of the feature map bitstream or the feature map using the decoding method corresponding to the feature-information-encoding method indicated by the index, thereby generating reconstructed feature information.

The feature map bitstream may be a bitstream generated using an image encoder. Here, the image encoder may perform one or more of 1) segmentation of feature information, 2) prediction, 3) transformation, 4) quantization, 5) entropy encoding, 6) dequantization, 7) inverse transformation, 8) filtering, and 9) storage of a reconstructed feature map.

When the feature map bitstream is a bitstream including information generated using the image encoder, the feature information decoder 2220 may acquire prediction information through 1) entropy decoding, 2) dequantization, 3) inverse transformation, and 4) prediction of information of the bitstream, and may generate reconstructed feature information using the prediction information.

Then, filtering may be applied to the reconstructed feature information, and the reconstructed feature information to which filtering is applied may be stored in memory or the like. The reconstructed feature information stored in the memory or the like may be used again for prediction of another target, and may be output for prediction or the like.

The information about the feature map may include encoded geometry information and encoded feature coefficient information. The feature information decoder 2220 performs decoding on the encoded geometry information, thereby generating geometry information. The feature information decoder 2220 performs decoding on the encoded feature coefficient information, thereby generating feature coefficient information.

Using the geometry information and the feature coefficient information, 3D data may be formed.

Information, such as the feature-information-encoding method and the like, may indicate whether 3D data is segmented into geometry information and feature coefficient information.

When 3D data is segmented into geometry information and feature coefficient information, the encoding procedure by the feature information encoder 150 may be performed separately on each of the geometry information and the feature coefficient information, which are generated through segmentation. In this case, the feature information decoder 2220 separately performs decoding on each of the encoded geometry information and the encoded feature coefficient information, thereby generating reconstructed feature information. Also, the feature information decoder 2220 may store and output the reconstructed feature information.

At step 2340, the feature information of the reconstructed image may be extracted from the reconstructed image using the index provided from the feature information decoder 2220.

As described above, the processing by the feature information extractor 130 may be omitted from the encoding apparatus 100.

The information about the feature map may include encoded omission information. The encoded omission information may indicate whether or not the processing procedure by the feature information extractor 130 is omitted. That is, the omission information may indicate whether to extract the feature information of the reconstructed image or whether to omit extraction of the feature information of the reconstructed image.

The feature information decoder 2220 performs decoding on the encoded omission information, thereby generating the omission information.

The omission information may indicate whether to extract the feature information of the reconstructed image. For example, only when the omission information indicates extraction of the feature information of the reconstructed image may the feature information decoder 2220 extract the feature information of the reconstructed image from the reconstructed image. When the omission information indicates that the feature information of the reconstructed image is not to be extracted, the feature information decoder 2220 may not extract the feature information of the reconstructed image therefrom, and the postprocessed reconstructed feature information may be used as the reconstructed feature information.

When the first feature information was used to generate the input to the feature information encoder 150 of the encoding apparatus 100 (that is, when the (preprocessed) feature information, rather than the second feature information, was used as the input to the feature information encoder 150), the decoding apparatus 2200 also has to use the feature information output from the feature information decoder 2220.

The information about the feature map may include encoded feature extraction information. The feature information decoder 2220 performs decoding on the encoded feature extraction information, thereby generating feature extraction information.

The feature extraction information may include 1) neural network information and 2) layer location information.

The neural network information may indicate the neural network used to extract the reconstructed feature information. The neural network information may be an index indicating the neural network used to extract the feature information of the reconstructed image, among multiple neural networks.

The layer location information may indicate the layer from which the reconstructed feature information is to be extracted, among the multiple layers of the neural network. The layer location information may be an index indicating the layer from which the feature information of the reconstructed image is to be extracted, among the multiple layers.

The feature information of the reconstructed image may be extracted from the layer indicated by the layer location information, among the layers of the neural network indicated by the neural network information.

Using the feature information of the reconstructed image and the postprocessed reconstructed feature information output from the feature information postprocessor 2230, reconstructed feature information may be generated.

At step 2320, the feature information decoder 2220 performs decoding on the feature map, thereby generating reconstructed feature information.

The reconstructed feature information may correspond to the preprocessed feature information in the encoding apparatus 100. The reconstructed feature information may include a reconstructed transform coefficient and/or a reconstructed transform basis vector.

At step 2330, the feature information postprocessor 2230 may perform one or more of inverse (domain) rearrangement, dequantization, inverse domain transformation, and inverse sampling on the reconstructed feature information, the reconstructed transform coefficient, and/or the reconstructed transform basis vector.

The information about the feature map may include encoded postprocessing information. The encoded postprocessing information may be the encoded preprocessing information generated by the encoding apparatus 100.

At step 2320, the feature information decoder 2220 performs decoding on the encoded postprocessing information, thereby generating postprocessing information. The postprocessing information may correspond to the preprocessing information in the encoding apparatus 100.

The postprocessing information may indicate the processing tasks to be performed on the reconstructed feature information, the reconstructed transform coefficient, and/or the reconstructed transform basis vector, among inverse rearrangement, dequantization, inverse domain transformation, and inverse sampling.

For example, the postprocessing information may include inverse rearrangement information. The inverse rearrangement information may indicate whether inverse rearrangement is applied to the reconstructed feature information, and the like. The inverse rearrangement information in the postprocessing information may correspond to the rearrangement information in the preprocessing information of the encoding apparatus 100.

For example, the postprocessing information may include dequantization information. The dequantization information may indicate whether dequantization is applied to the reconstructed feature information, and the like. The dequantization information in the postprocessing information may correspond to the quantization information in the preprocessing information of the encoding apparatus 100.

For example, the postprocessing information may include inverse domain transformation information. The inverse domain transformation information may indicate whether inverse domain transformation is applied to the reconstructed feature information, and the like. The inverse domain transformation information in the postprocessing information may correspond to the domain transformation information in the preprocessing information of the encoding apparatus 100.

For example, the postprocessing information may include inverse sampling information. The inverse sampling information may indicate whether inverse sampling is applied to the reconstructed feature information, and the like. The inverse sampling information in the postprocessing information may correspond to the sub-sampling information in the preprocessing information of the encoding apparatus 100.

The order in which inverse (domain) rearrangement, dequantization, inverse domain transformation, and inverse sampling are performed may be changed.

The postprocessing information may be transmitted to the feature information postprocessor 2230.

Figure 24:
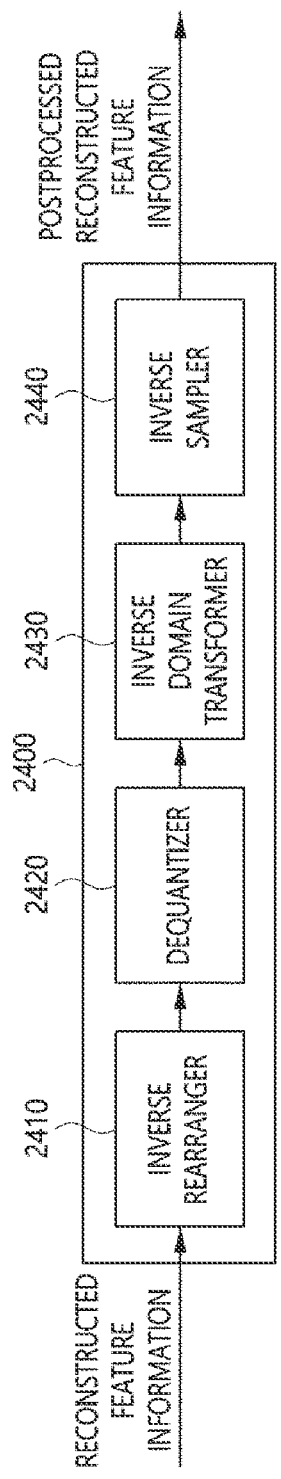
FIG. 24 illustrates the structure of a feature information postprocessor according to an embodiment.

FIG. 24 illustrates the structure of a feature information postprocessor according to an embodiment.

The feature information postprocessor 2230 may include one or more of an inverse rearranger 2410, a dequantizer 2420, an inverse domain transformer 2430, and an inverse sampler 2440.

The reconstructed feature information may be input to the inverse rearranger 2410.

The inverse sampler 2440 may generate postprocessed reconstructed feature information.

The inverse rearranger 2410 may perform operations and functions that work in the reverse manner from the operations and functions described in connection with the rearranger 540.

The dequantizer 2420 may perform operations and functions that work in the reverse manner from the operations and functions described in connection with the quantizer 530.

The inverse domain transformer 2430 may perform operations and functions that work in the reverse manner from the operations and functions described in connection with the domain transformer 520.

The inverse sampler 2440 may perform operations and functions that work in the reverse manner from the operations and functions described in connection with the sub-sampler 510.

Figure 25:
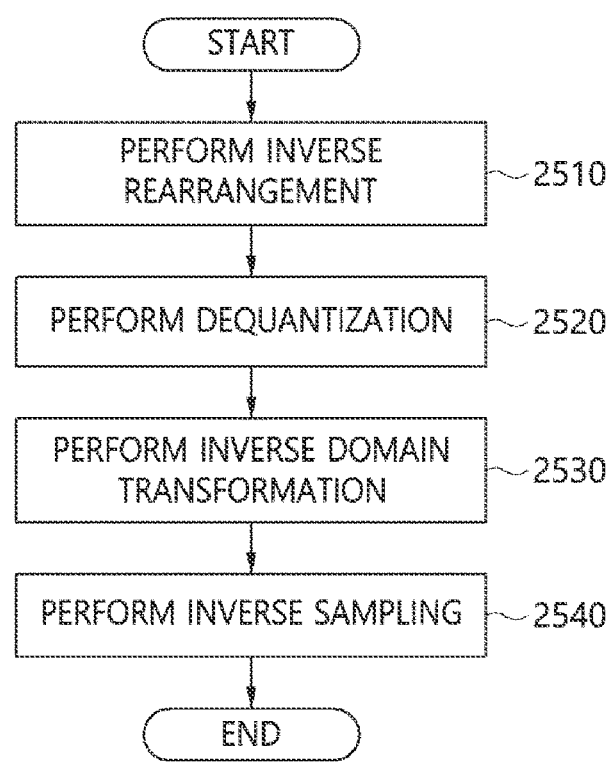
FIG. 25 is a flowchart of a method for postprocessing reconstructed feature information according to an embodiment.

FIG. 25 is a flowchart of a method for postprocessing reconstructed feature information according to an embodiment.

Steps 2330, described above with reference to FIG. 23, may include steps 2510, 2520, 2530 and 2540.

The order of steps 2510, 2520, 2530 and 2540 may be changed. Also, some of steps 2510, 2520, 2530 and 2540 may be skipped.

The information output from the feature information decoder 2220 may be reconstructed feature information.

At step 2510, the inverse rearranger 2410 may perform inverse rearrangement on the information transmitted from the feature information decoder 2220.

The information transmitted from the feature information decoder 2220 may be rearranged feature information.

The inverse rearranger 2410 performs inverse rearrangement on the information transmitted from the feature information decoder 2220 using rearrangement information, thereby generating inversely rearranged information.

Here, the inversely rearranged information may be quantized feature information.

When inverse rearrangement is performed, the inverse rearranger 2410 may reconfigure the rearranged feature information in N dimensions using a rearrangement unit and a scan order. N may be an integer equal to or greater than 1. N may be 3.

The rearrangement unit and the scan order may be acquired from high-level information and/or low-level information. The high-level information and/or the low-level information is parsed, whereby information indicating the rearrangement unit and the scan order (e.g., the rearrangement information) may be acquired.

For example, when the rearranger 540 rearranges a 3D feature map in 2D through a tiling process, the rearranged feature information having a 2D form may be reconfigured in 3D through inverse rearrangement using the rearrangement unit and the scan order.

For inverse rearrangement, the inverse rearranger 2410 may acquire tiling usage information and tiling order information. The tiling usage information may indicate whether rearrangement using tiling is performed.

The tiling order information may include an index for the tiling order and a table for the tiling order. The tiling order information may be used for decoding of information generated by tiling.

The tiling order information may indicate the order of the respective rearrangement units for performing inverse rearrangement on the rearranged feature information.

The inverse rearranger 2410 performs inverse rearrangement using the tiling usage information and the tiling order information, thereby generating inversely rearranged reconstructed feature information. The inversely rearranged reconstructed feature information may correspond to quantized feature information.

Whether to perform inverse rearrangement by the inverse rearranger 2410 may be determined depending on inverse (domain) rearrangement information.

At step 2320 described above, the feature information decoder 2220 performs decoding on the encoded inverse rearrangement information, thereby generating inverse rearrangement information. The inverse rearrangement information may be the rearrangement information in the encoding apparatus 100.

The inverse rearrangement information may include 1) information indicating whether inverse rearrangement is performed. When inverse rearrangement is performed, the inverse rearrangement information may include 2) the width of each of the sampled regions, 3) the height of each of the sampled regions, 4) the number of sampled regions, 5) the width of a depacking unit, 6) the height of the depacking unit, 7) the scan order for the depacking units within the sampled region, 8) the size of a 3D form, and the like.

The encoded inverse rearrangement information may be transmitted as information pertaining to High-Level Syntax (HLS).

At step 2520, the dequantizer 2420 performs dequantization on the inversely rearranged information, thereby generating dequantized information.

The dequantized information may indicate transformed feature information.

For example, the dequantizer 2420 performs dequantization on the quantized feature information, thereby generating transformed feature information.

The dequantizer 2420 may receive the information generated by the quantizer 520 via the feature information decoder 2220, and may generate transformed feature information by performing dequantization on the quantized feature information using the received information.

The dequantization may be fixed dequantization or non-fixed dequantization.

The dequantizer 2420 may acquire information required for dequantization using the high-level information and the low-level information that were used to decode the feature information. Also, the dequantizer 2420 may acquire information required for dequantization using additional high-level information and additional low-level information.

Figure 26:
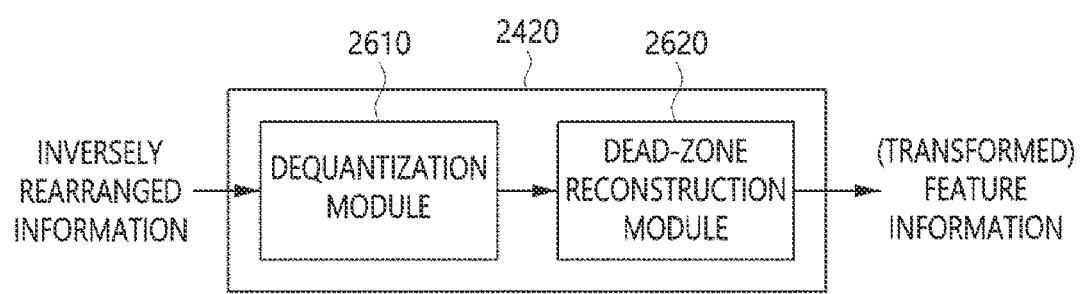
FIG. 26 illustrates the structure of a dequantizer according to an embodiment.

FIG. 26 illustrates the structure of a dequantizer according to an embodiment.

The dequantizer 2420 may include one or more of a dequantization module 2610 and a dead-zone reconstruction module 2620.

The inversely rearranged information may be input to the dequantization module 2610.

The dead-zone reconstruction module 2620 may generate transformed feature information.

The functions, operations, and the like of the dequantization module 2610 and the dead-zone reconstruction module 2620 will be described in more detail below.

Figure 27:
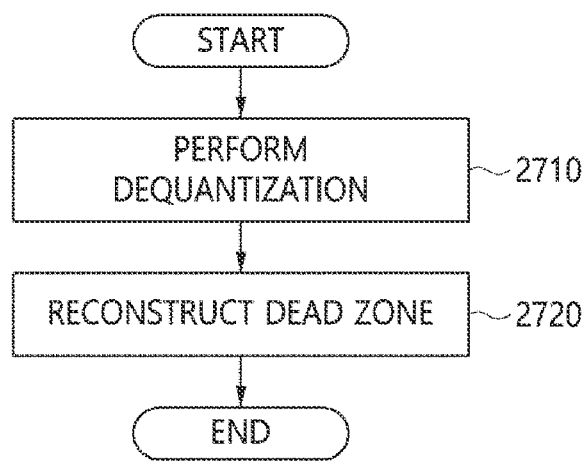
FIG. 27 is a flowchart of a dequantization method according to an embodiment.

FIG. 27 is a flowchart of a dequantization method according to an embodiment.

Step 2520, described above with reference to FIG. 25, may include steps 2710 and 2720.

The order of steps 2710 and 2720 may be changed. Also, some of steps 2710 to 2720 may be skipped.

At step 2710, the dequantization module 2610 performs dequantization on the inversely rearranged information, thereby generating transformed feature information. Here, the transformed feature information may be transformed feature information to which a dead-zone scheme is applied.

The dequantization module 2610 may perform dequantization using the information generated by the quantizer 530 and transmitted from the feature information decoder 2220.

When the transform unit used in the inverse domain transformer 2430 is used as the quantization unit, the decoding apparatus 2200 may not receive additional information about the quantization unit from the encoding apparatus 100.

In this case, the transform unit used in the inverse domain transformation procedure may be used as the quantization unit in the dequantization procedure.

The dequantization module 2610 may receive quantization method information applied to each of the transform units from the feature information decoder 2220.

The dequantization may be fixed dequantization or non-fixed dequantization.

When fixed quantization is used for a transform unit, the dequantization module 2610 may receive the fixed quantization information applied to the transform unit from the feature information decoder 2220. The dequantization module 2610 may reconstruct dequantized information using the fixed quantization information. The dequantized information may be transformed feature information.

The fixed quantization information may include information indicating the quantization level used in the quantization procedure and information indicating a quantization parameter and a fixed quantization function.

When a non-fixed quantization method is used for a transform unit, the dequantization module 2610 may receive non-fixed quantization information applied to the transform unit from the feature information decoder 2220. The dequantization module 2610 may reconstruct dequantized information using the non-fixed quantization information. The dequantized information may be transformed feature information.

The non-fixed quantization information may include 1) one or more quantization levels, 2) a quantization parameter, 3) information about mapping between a value before quantization and a value after quantization, and 4) a non-fixed quantization function.

The information about the mapping may include an index for a mapping table and information about the mapping table. The mapping table may be generated in the encoding procedure, or may be a predefined table.

When clipping has been performed by the clipping module 1720 in the quantization procedure performed by the quantizer 530 of the encoding apparatus 100, the dequantization module 2610 may receive clipping information from the feature information decoder 2220. The dequantization module 2610 may perform dequantization using the clipping information.

The clipping information may include 1) a clipping range (that is, the maximum value and/or minimum value of the clipping range) and 2) information indicating the quantization method for the clipping range.

When clipping is performed, the dequantization module 2610 may perform dequantization using the maximum value and minimum value of the clipping range.

When clipping using the maximum value and the minimum value that are fixed for one or more quantization units (that is, the maximum value and the minimum value that are common thereto) has been performed, the dequantization module 2610 may perform clipping using a single (common) maximum value and a single (common) minimum value for the one or more quantization units.

When clipping by the clipping module 1720 is not performed in the quantization procedure performed by the quantizer 530 of the encoding apparatus 100, the dequantization module 2610 may acquire the maximum value and minimum value of each quantization unit before quantization using the fixed quantization information, the non-fixed quantization information, or the like. The dequantization module 2610 may perform dequantization on the quantization unit using the maximum value and the minimum value.

In an embodiment, when quantization based on an escape quantization method has been performed in the quantization module 1750 of the encoding apparatus 100, the dequantization module 2610 may perform dequantization based on the escape quantization method.

When the escape quantization method has been used, the dequantization module 2610 may receive information related to the escape quantization method from the feature information decoder 2220. The dequantization module 2610 may perform dequantization using the information related to the escape quantization method.

For example, the information related to the escape quantization method may include quantization range information and dequantization information.

The dequantization module 2610 may perform fixed dequantization or non-fixed dequantization for the integer values of the information input thereto using the acquired information related to the escape quantization method. By performing fixed dequantization or non-fixed dequantization, the integer values may be mapped to real number values.

The dequantization module 2610 may derive the range to which the escape quantization method has been applied using the information related to the escape quantization method (e.g., the quantization range information), and may apply the escape quantization method to values falling within the derived range.

The range to which the escape quantization method is applied may include multiple sections.

The dequantization module 2610 may perform dequantization by adding a multiple of k to a real number value or by subtracting a multiple of k from a real number value for each of the multiple sections using a table.

At step 2720, the dead-zone reconstruction module 2620 may reconstruct the dead zone of the dequantized information.

When a dead-zone scheme has been performed by the dead-zone scheme module 1730 of the encoding apparatus 100, the dead-zone reconstruction module 2620 may receive dead-zone scheme information from the feature information decoder 2220. The dead-zone scheme information may include information indicating whether a dead-zone scheme is performed and information indicating the range on which the dead-zone scheme is performed.

The dead-zone reconstruction module 2620 may identify the region that is mapped to 0 due to application of the dead-zone scheme, among the regions of the quantization unit, using the dead-zone scheme information. In an embodiment, the range of values within the feature map derived by dequantization performed by the dequantization module 2610 may be [n, m]. n may be a real number. m may be a real number.

If a dead-zone scheme by which values falling within a range [p, q] are mapped to 0 has been performed by the dead-zone scheme module 1730 of the encoding apparatus 100, the dead-zone reconstruction module 2620 may perform dead-zone reconstruction corresponding to the dead-zone scheme.

The dead-zone reconstruction module 2620 may subtract p from values falling within the range [n, t] and add q to values falling within the range [t, m] using the dead-zone scheme information. t may be equal to or greater than p and equal to or less than q.

Through such addition and subtraction, the dead-zone reconstruction module 2620 may reconstruct values within the range that were mapped to 0 due to application of the dead-zone scheme.

Reference is again to be made to FIG. 25.

At step 2530, the inverse domain transformer 2430 performs inverse domain transformation on the dequantized information, thereby generating inversely transformed information.

The inversely transformed information may be sub-sampled feature information.

The information about the feature map may include encoded inverse domain transform type information.

At step 2320, the feature information decoder 2220 performs decoding on the encoded inverse domain transform type information, thereby generating inverse domain transform type information. The inverse domain transform type information may correspond to the domain transform type information of the encoding apparatus 100.

The inverse domain transform type information may indicate the type of inverse domain transform to be applied to the dequantized information, among available types of inverse domain transform. For example, the type of inverse domain transform may be 1) 3-dimensional (3D) Discrete Cosine Transform (DCT), 2) 2D-DCT, 3) orthogonal linear transform, or 4) Principal Component Analysis (PCA).

Depending on the inverse domain transform type, the feature information postprocessor 2230 may perform inverse domain transformation on the reconstructed transform coefficient or the reconstructed transform basis vector, and may generate inversely transformed information as the result of inverse domain transformation.

Figure 28:
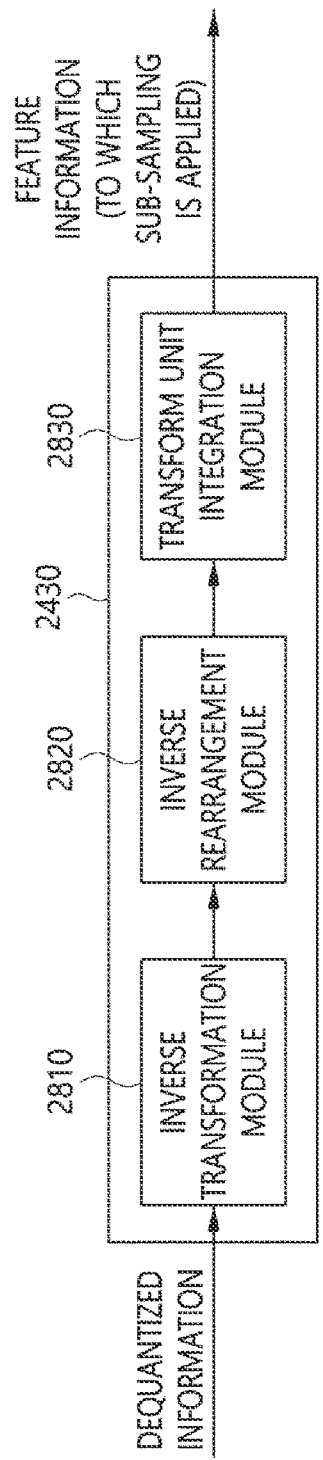
FIG. 28 illustrates the structure of an inverse domain transformer according to an embodiment.

FIG. 28 illustrates the structure of an inverse domain transformer according to an embodiment.

The inverse domain transformer 2430 may include one or more of an inverse transformation module 2810, an inverse rearrangement module 2820, and a transform unit integration module 2830.

The dequantized information may be input to the inverse transformation module 2810.

The transform unit integration module 2830 may generate feature information to which sub-sampling is applied.

The functions, operations, and the like of the inverse transformation module 2810, the inverse rearrangement module 2820, and the transform unit integration module 2830 will be described in more detail below.

Figure 29:
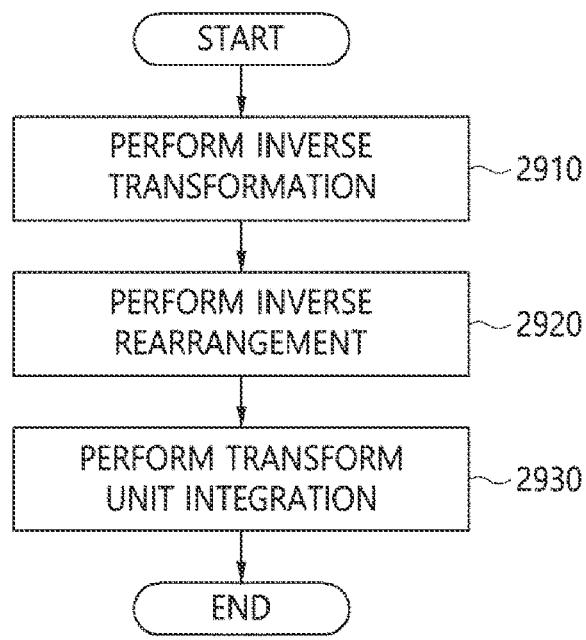
FIG. 29 is a flowchart of an inverse domain transformation method according to an embodiment.

FIG. 29 is a flowchart of an inverse domain transformation method according to an embodiment.

Step 2530, described above with reference to FIG. 25, may include steps 2910, 2920 and 2930.

The order of steps 2910, 2920 and 2930 may be changed. Also, some of steps 2910, 2920 and 2930 may be skipped.

At step 2910, the reconstructed transform coefficient, the reconstructed transform matrix, or the reconstructed matrix index of a transform unit may be input to the inverse transformation unit 2810.

The inverse transformation unit 2810 performs inverse transformation on the input information, thereby generating a reconstructed transform unit. The inverse transformation unit 2810 may output the reconstructed transform unit.

When the inverse transformation module 2810 receives a reconstructed transform coefficient and a reconstructed transform matrix, the inverse transformation module 2810 may generate a reconstructed transform unit by multiplying the reconstructed transform coefficient by the reconstructed transform matrix.

When the inverse transformation module 2810 receives a reconstructed transform coefficient and a reconstructed matrix index, the inverse transformation module 2810 may derive a matrix matching the reconstructed matrix index with reference to a matrix list. The matrix list may be transmitted for and applied to a fixed unit. Alternatively, the matrix list may be transmitted for and applied to a sequence. Alternatively, the matrix list may be transmitted for and applied to a frame.

The inverse transformation module 2810 may generate a reconstructed transform unit by multiplying the matrix derived from the matrix list by the reconstructed transform coefficient.

The inverse transformation module 2810 may inversely transpose the reconstructed transform unit.

The inverse transformation module 2810 may inversely transpose the reconstructed transform unit using transformation information or transposition information transmitted from the feature information decoder 2220.

The transposition information may indicate transposition applied to one or more axes. The inverse transformation module 2810 may select the axes to which inverse transposition is to be applied using the transposition information, and may inversely transpose the selected axes.

At step 2920, the inverse rearrangement module 2820 inversely rearranges the reconstructed transform unit, thereby changing the form of the reconstructed transform unit. The inverse rearrangement module 2820 may generate a reconstructed transform unit having a changed form.

Rearrangement information may include 1) the number of times rearrangement is performed and 2) information about each type of rearrangement when multiple types of rearrangement are performed.

The information about rearrangement may include 1) the size and shape of a transform unit before a split, 2) the shape of the split transform unit, 3) the number of axes along which the transform unit is split, 4) the ratio of the split, 5) the number of directions along which segments of the split transform unit are concatenated, 6) information indicating the direction along which the segments of the split transform unit are concatenated (e.g., the index of the direction), 7) the scan order in which the segments of the split transform unit are scanned, and the like.

The inverse rearrangement module 2820 may perform inverse rearrangement using the rearrangement information transmitted from the feature information decoder 2220.

The inverse rearrangement module 2820 may perform inverse rearrangement the number of times indicated by the rearrangement information.

The inverse rearrangement module 2820 may evenly split the reconstructed transform unit by the size of an inverse rearrangement unit, thereby generating multiple inverse rearrangement units.

The inverse rearrangement module 2820 scans the inverse rearrangement units according to the scan order and performs inverse rearrangement thereon according to an inverse rearrangement order, thereby generating an inversely rearranged reconstructed transform unit.

When inverse rearrangement is performed, the width, the height, and the channel length of the inversely rearranged reconstructed transform unit may satisfy the following conditions.

(width of reconstructed transform unit)<=(width of inversely rearranged reconstructed transform unit (after inverse rearrangement is performed))<(width of reconstructed transform unit+width of inverse rearrangement unit)

(height of reconstructed transform unit)<=(height of inversely rearranged reconstructed transform unit (after inverse rearrangement is performed))<(height of reconstructed transform unit+height of inverse rearrangement unit)

(channel length of reconstructed transform unit)<=(channel length of inversely rearranged reconstructed transform unit (after inverse rearrangement is performed)) <(channel length of reconstructed transform unit+ channel length of inverse rearrangement unit)

When the width, height, or channel length of the inversely rearranged reconstructed transform unit, generated by performing inverse rearrangement, is greater than the width, height, or channel length of the reconstructed transform unit, the inverse rearrangement module 2820 crops information at a specific location in the inversely rearranged reconstructed transform unit such that the widths, the heights, or the channel lengths of the inversely rearranged reconstructed transform unit and the reconstructed transform unit have the same size, thereby generating a cropped inversely rearranged reconstructed transform unit.

The information about rearrangement may include information indicating a scan order. The information indicating the scan order may be an index for a scan order table.

The inverse rearrangement module 2820 may derive the scan order to be used thereby using the information about rearrangement. The inverse rearrangement module 2820 may derive the scan order mapped to the transmitted index from the scan order table.

The information about rearrangement may include information indicating a rearrangement order. The information indicating the rearrangement order may be an index for a rearrangement order table.

The inverse rearrangement module 2820 may derive the inverse rearrangement order to be used thereby using the information about rearrangement. The inverse rearrangement module 2820 may derive the inverse rearrangement order mapped to the transmitted index from the inverse rearrangement order table.

Figure 30:
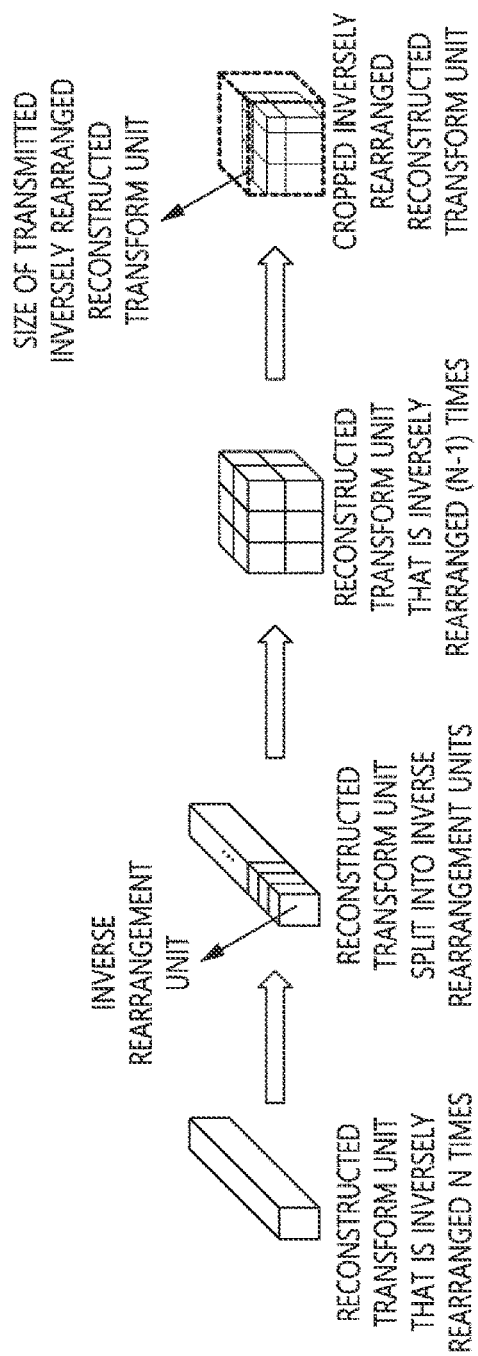
FIG. 30 illustrates an inverse rearrangement procedure according to an example.

FIG. 30 illustrates an inverse rearrangement procedure according to an example.

The inverse rearrangement module 2820 may split the reconstructed transform unit that is inversely rearranged N times into inverse rearrangement units. The inversely rearranged unit has a size of N×M×L. N may be a size with respect to a width axis. M may be a size with respect to a height axis. L may be a size with respect to a channel axis.

The inverse rearrangement module 2820 may scan the inverse rearrangement units in the order of a channel, a width, and a height or in the order of a channel, a height, and a width.

Through the scan, the inverse rearrangement module 2820 may inversely rearrange the inverse rearrangement units according to the priority order of width, height and channel such that they match the form of the inversely rearranged reconstructed transform unit.

At step 2930, the transform unit integration module 2830 consecutively integrates the reconstructed transform units, thereby generating a reconstructed feature map.

The transform unit integration module 2830 consecutively integrates some of the reconstructed transform units, thereby generating a reconstructed feature map.

The transform unit integration module 2830 may output the reconstructed feature map.

The transform unit integration module 2830 may generate a reconstructed feature map using split information transmitted from the feature information decoder 2220.

The split information may include feature map shape information indicating the shape of a feature map. Also, the split information may include feature map split information indicating the method of splitting a feature map.

Also, the split information may include 1) a transform unit index of each transform unit and 2) coordinates of each transform unit in a feature map.

The transform unit integration module 2830 may split the feature map having the shape indicated by the feature map shape information using the method indicated by the feature map split information. The transform unit integration module 2830 may derive the location of each transform unit in the feature map by splitting the feature map.

The transform unit integration module 2830 may attach the transform units to the feature map according to the sequence of the transform unit indices of the transform units. Here, the coordinates of each transform unit in the feature map may indicate the location thereof in the feature map.

Reference is again to be made to FIG. 25.

At step 2540, the inverse sampler 2440 performs inverse sampling on the inversely transformed information, thereby generating postprocessed reconstructed feature information.

When it performs inverse sampling on the inversely transformed information, the feature information postprocessor 2230 may perform inverse sampling in units of channels or in units of feature regions. The inverse sampling may be fixed sampling or non-fixed sampling.

When inverse sampling is performed in units of channels, inverse sampling method information may be used.

The information about the feature map may include encoded inverse sampling method information. At step 2320, the feature information decoder 2220 performs decoding on the encoded inverse sampling method information, thereby generating inverse sampling method information. The inverse sampling method information may correspond to the sub-sampling method information of the encoding apparatus 100.

The inverse sampling method information may indicate the type of inverse sampling that is applied to the inversely transformed information. The inverse sampling method information may be an index indicating the inverse sampling method that is applied to the inversely transformed information, among multiple inverse sampling methods.

When fixed sampling is performed on the inversely transformed information, the index indicating the first channel to which inverse sampling is to be applied and a sampling rate may be used. Here, the first channel to which inverse sampling is to be applied may be the first sub-sampled channel in the encoding apparatus 100.

The information about the feature map may include encoded sampling rate information. At step 2320, the feature information decoder 2220 performs decoding on the encoded sampling rate information, thereby generating sampling rate information.

The feature information postprocessor 2230 may arrange the sub-sampled feature information in units of channels. Here, the arrangement of the sub-sampled feature information may start from the channel indicated by the index. The arrangement in units of channels may be performed by skipping over channels at an interval of the sampling rate. That is, the arrangement of the sub-sampled feature information in channels may start from the channel indicated by the index, and may be performed to skip over channels at the interval of the sampling rate.

The values of the channel that is not to be reconstructed (that is, the channel in which the sub-sampled feature information is not arranged) may be filled with the weighted average of the values of one or more channels adjacent to the channel that is not to be reconstructed.

When non-fixed sampling is performed on the inversely transformed information, the feature information postprocessor 2230 may arrange the sub-sampled feature information in the original channel location using sampling criterion information.

The information about the feature map may include encoded sampling criterion information. At step 2320, the feature information decoder 2220 performs decoding on the encoded sampling criterion information, thereby generating sampling criterion information.

The sampling criterion information may indicate specific criteria for non-fixed sampling. The sampling criterion information may include the number of sampled channels, the range of the sampled channels, and/or the indices of the sampled channels.

The values of the channel that is not reconstructed (that is, the channel in which the sub-sampled feature information is not arranged) may be set to a specific value. For example, the specific value may be 0. Alternatively, the values of the channel that is not reconstructed may be set using the weighted average of the values of one or more channels adjacent to the channel that is not reconstructed.

When inverse sampling is performed in units of feature regions, inverse sampling method information may be used.

The information about the feature map may include encoded inverse sampling method information. At step 2320, the feature information decoder 2220 performs decoding on the encoded inverse sampling method information, thereby generating inverse sampling method information.

The inverse sampling method information may correspond to the sub-sampling method information of the encoding apparatus 100.

The inverse sampling method information may indicate the type of inverse sampling that is applied to the inversely transformed information. The inverse sampling method information may be an index indicating the inverse sampling method that is applied to the inversely transformed information, among multiple inverse sampling methods.

When fixed sampling is performed on the inversely transformed information, the feature information postprocessor 2230 may perform inverse sampling on the inversely transformed information using specific criteria.

The specific criteria may include a sampling phase and a sampling rate.

The information about the feature map may include encoded sampling information. The feature information decoder 2220 performs decoding on the encoded sampling information, thereby generating sampling information. The sampling information may include a sampling rate and a sampling phase.

The feature information postprocessor 2230 may arrange the sub-sampled feature information from the sampling phase while maintaining an interval equal to the sampling rate in a horizontal direction and a vertical direction.

The values of the feature that are not reconstructed (that is, the values to which the sub-sampled feature information is not assigned) may be set to a specific value. For example, the specific value may be 0. Alternatively, the value of the feature that is not reconstructed may be set using the weighted average of the values of one or more features adjacent to the feature.

When non-fixed sampling is performed on the inversely transformed information, the feature information postprocessor 2230 may perform inverse sampling on the inversely transformed information using sub-sampling region information.

The information about the feature map may include encoded sub-sampling region information. The feature information decoder 2220 performs decoding on the encoded sub-sampling region information, thereby generating sub-sampling region information.

The sub-sampling region information may include the number of sub-sampled regions within a channel, the coordinates of the upper-left corner of the sub-sampled region, the width of the sub-sampled region, the height of the sub-sampled region, and the like.

The feature information postprocessor 2230 may arrange the sub-sampled feature information in the location specified by inverse sampling using the sub-sampling region information.

The values of the feature that are not reconstructed (that is, the values to which the sub-sampled feature information is not assigned) may be set to a specific value. For example, the specific value may be 0. Alternatively, the value of the feature that is not reconstructed may be set using the weighted average of the values of one or more features adjacent to the feature.

Figure 31:
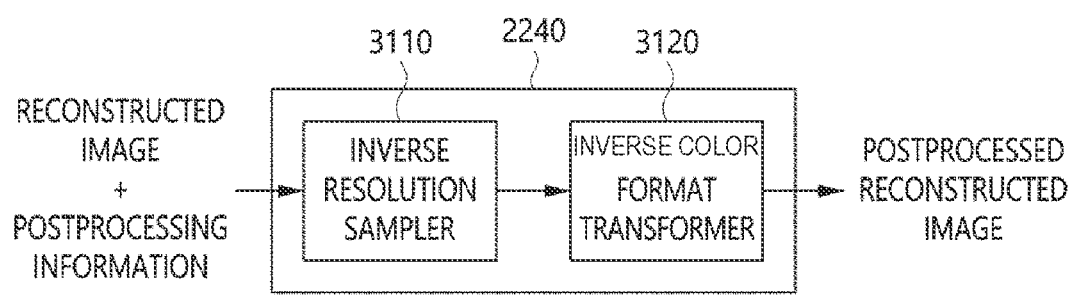
FIG. 31 illustrates the structure of an image postprocessor according to an embodiment.

FIG. 31 illustrates the structure of an image postprocessor according to an embodiment.

The image postprocessor 2240 may include an inverse resolution sampler 3110 and an inverse color format transformer 3120.

A reconstructed image and image-postprocessing information may be input to the inverse resolution sampler 3110.

The inverse resolution sampler 3110 may generate an inversely sampled reconstructed image.

The inverse color format transformer 3120 may generate a postprocessed reconstructed image.

The functions, operations, and the like of the inverse resolution sampler 3110 and the inverse color format transformer 3120 will be described in more detail below.

Figure 32:
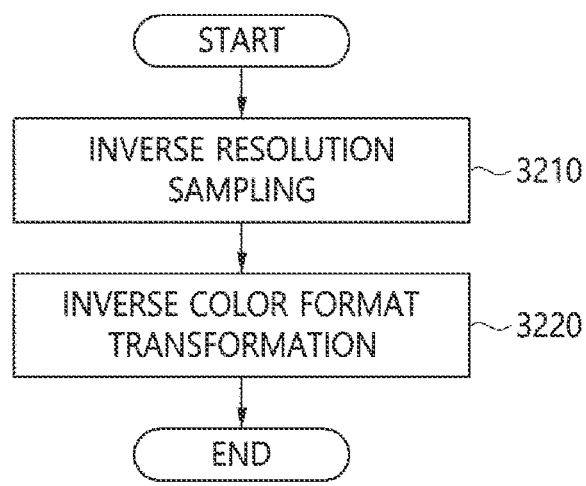
FIG. 32 is a flowchart of a method for postprocessing a reconstructed image according to an embodiment.

FIG. 32 is a flowchart of a method for postprocessing a reconstructed image according to an embodiment.

Step 2340, described above with reference to FIG. 23, may include steps 3210 and 3220. The order of steps 3210 and 3220 may be changed. Also, some of steps 3210 and 3220 may be skipped.

An image bitstream may include encoded image-postprocessing information. The image decoder 2210 performs decoding on the encoded image-postprocessing information, thereby generating image-postprocessing information. The image-postprocessing information may correspond to the image-preprocessing information of the encoding apparatus 100.

The image-postprocessing information may indicate whether each of inverse resolution sampling and inverse transformation of a color format is applied. Also, the image-postprocessing information may indicate the order in which inverse transformation of a color format and inverse resolution sampling are performed.

At step 3210, the inverse resolution sampler 3110 performs inverse sampling on the reconstructed image, thereby generating an inversely sampled reconstructed image.

The inverse resolution sampling at step 3210 may correspond to step 420 described above with reference to FIG. 4.

The inverse resolution sampler 3110 may use inverse resolution sampling information for inverse resolution sampling.

The image bitstream may include encoded inverse resolution sampling information. The image decoder 2210 performs decoding on the encoded inverse resolution sampling information, thereby generating inverse resolution sampling information. The inverse resolution sampling information may correspond to the resolution sub-sampling information of the encoding apparatus 100.

The inverse resolution sampling information may include 1) information (or a flag) indicating whether inverse resolution sampling is performed and/or 2) unit information indicating the unit based on which inverse resolution sampling is performed.

For example, the unit information may indicate whether the unit based on which inverse resolution sampling is performed is the entire image or a frame of the image.

The unit information may represent a sampling rate. For example, the sampling rate may be 50% of the resolution or 75% of the resolution.

The inverse resolution sampler 3110 may perform inverse resolution sampling on the unit of processing according to the sampling rate.

At step 3220, the inverse color format transformer 3120 performs inverse color format transformation on the inversely sampled reconstructed image, thereby generating a postprocessed reconstructed image.

The inverse color format transformer 3120 may perform inverse color format transformation on the inversely sampled reconstructed image using inverse color format transformation information.

The image bitstream may include encoded inverse color format transformation information. The image decoder 2210 performs decoding on the encoded inverse color format transformation information, thereby generating inverse color format transformation information. The inverse color format transformation information may correspond to the color format transformation information of the encoding apparatus 100.

The inverse color format transformation information may include 1) information (or a flag) indicating whether inverse transformation of a color format is performed and/or 2) information representing color formats.

The color formats may include a color format before inverse transformation and a color format after inverse transformation.

The inverse color format transformer 3120 may perform inverse transformation of the color format of a unit corresponding to the entire image or a frame of the image using the inverse color format transformation information.

For example, when the inverse color format transformation information indicates that inverse transformation of the color format is to be performed and that transformation from an RGB color format to a YCbCr color format has been performed in the encoding apparatus 100, the inverse color format transformer 3120 may perform inverse transformation from the YCbCr color format to the RGB color format.

Figure 33:
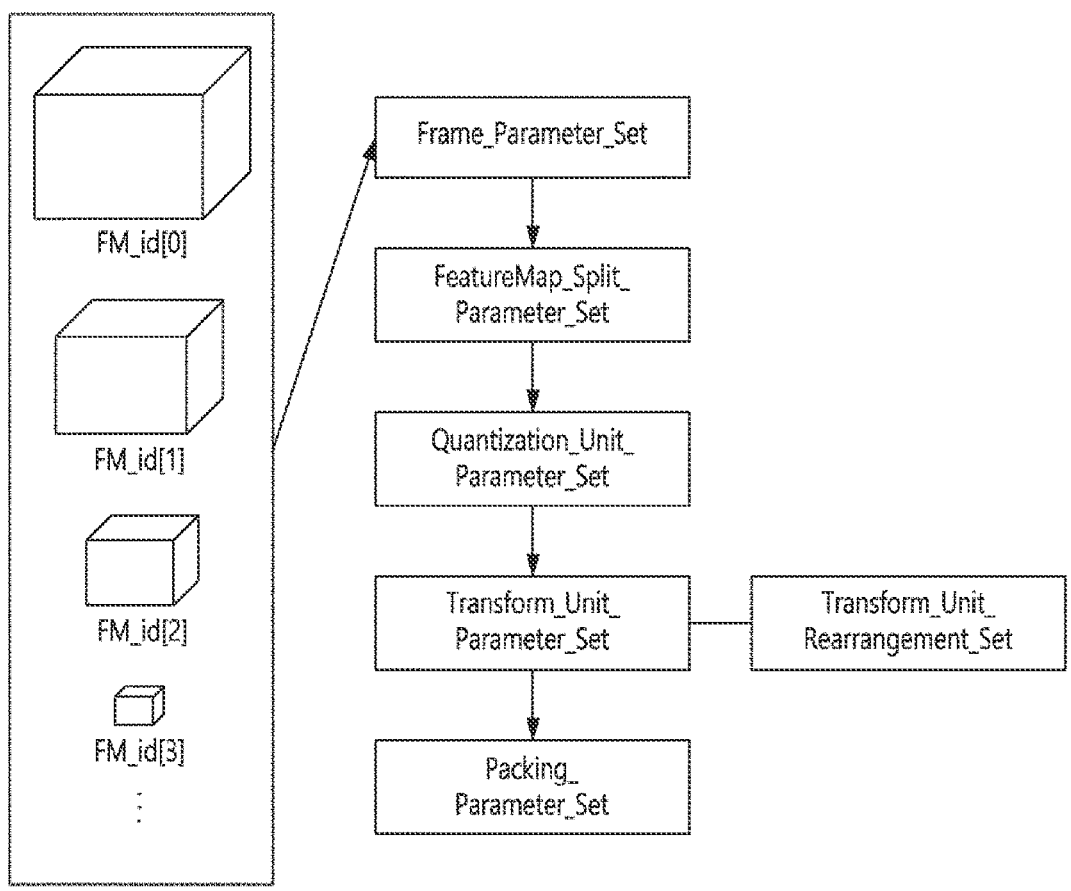
FIG. 33 illustrates the order in which one or more parameter information sets are parsed according to an embodiment.

FIG. 33 illustrates the order in which one or more parameter information sets are parsed according to an embodiment.

The above-described pieces of information used in the encoding and/or decoding procedure(s) may be transmitted, received, and signaled through sequential (or hierarchical) parameter information sets.

When all of the operations of the above-described domain transformer 520 and quantizer 530 of the feature information preprocessor 140 have been performed, the parameter information sets may be parsed as described below.

FIG. 33 shows the order in which one or more parameter information sets are parsed.

The parameter sets illustrated in FIG. 33 may be divided into a greater number of parameter sets, or may be merged into a smaller number of parameter sets.

For example, Frame_Parameter_Set (FPS) may be a parameter set indicating information that is common to one or more feature maps.

For example, Featuremap_Split_Parameter_Set (FSPS) may be a parameter set that is formed of a combination of syntax expressions for one or more input feature maps. The syntax expressions may be parsed for the transform unit split module 1310. The syntax expressions may be information used in the transform unit split module 1310.

For example, Transform_Unit_Parameter_Set (TUPS) may be a parameter set formed of a combination of syntax expressions for transform units generated by a split performed by the transform unit split module 1310. The syntax expressions may be parsed for the transform type selection module 1320 and the rearrangement module 1330. The syntax expressions may be information used in the transform type selection module 1320 and the rearrangement module 1330.

For example, Transform_Unit_Rearrange_Parameter_Set (TURPS) may be a parameter set formed of a combination of syntax expressions that are parsed in order for the rearrangement module 1330 to perform rearrangement on transform units. The transform units may be generated by a split performed by the transform unit split module 1310.

For example, Quantization_Unit_Parameter_Set (QUPS) may be a parameter set formed of a combination of syntax expressions parsed for performing the operation of the quantizer 530.

For example, Packing_Parameter_Set (PPS) may be a parameter set formed of a combination of syntax expressions parsed for performing the operation of the rearrangement module 1330.

The syntax expressions in FIGS. 34 to 39 may be parsed by the domain transformer 520. A combination of one or more of the syntax expressions in FIGS. 34 to 39 may be parsed by the domain transformer 520.

The names of the syntax expressions in FIGS. 34 to 39 are examples, and may be changed. Also, another syntax expression that is additionally parsed may be present, in addition to the syntax expressions in FIGS. 34 to 39.

FIG. 34 illustrates syntax expressions for FPS according to an example.

A combination of one or more of the illustrated syntax expressions for FPS may be parsed.

For example, packing_enabled_flag may indicate whether rearrangement by the rearranger 540 is applied to one or more feature maps generated from a frame.

For example, quantization_enabled_flag may indicate whether quantization by the quantizer 530 is applied to one or more feature maps generated from a frame.

For example, transform_enabled_flag may indicate whether domain transformation by the domain transformer 520 is applied to one or more feature maps generated from a frame.

FIG. 35 illustrates syntax expressions for FSPS according to an example.

FIG. 36 illustrates other syntax expressions for FSPS according to an example.

A combination of one or more of the illustrated syntax expressions for FSPS may be parsed.

For example, the number of input feature maps may be parsed as syntax.

For example, num_FM_minus1 may indicate the number of regions of interest. num_FM_minus1 may be parsed as a value indicating the number of regions of interest.

For example, information about each of the input feature maps may be parsed as syntax.

For example, FM_id[i] may indicate the index of each feature map. FM_id[i] may be an integer equal to or greater than 0 and equal to or less than N−1.

For example, FM_height[i] may indicate the height of each feature map. FM_height[i] may be parsed as information indicating the height of the feature map.

For example, FM_width[i] may indicate the width of each feature map. FM_width[i] may be parsed as information indicating the width of the feature map.

For example, FM_channel[i] may indicate the number of channels in each feature map. FM_channel[i] may be parsed as a value indicating the number of channels in the feature map.

For example, FM_log_channel_minusX[i] may indicate the number of channels in a feature map. FM_log_channel_minusX[i] may be parsed to a value of "log(the number of channels in a feature map)−X". X may be an integer equal to or greater than 0.

For example, split_method_merge may indicate whether to use the same feature map split method for one or more feature maps generated from a single frame. split_method_merge may be parsed to a value of 0 or 1.

The feature map to which domain transformation is applied in the encoding apparatus 100 or the feature map to which domain transformation is not applied in the encoding apparatus 100 may be split into multiple quantization units, and information about the quantization units may be parsed.

For example, information about a split unit of a quantization unit may be parsed as syntax.

For example, log_QU_size_minusX may indicate a common unit for QU. log_QU_size_minusX may be parsed to a value of "log(size information)−X". The size information may be a value indicating the size of the common unit. X may be an integer equal to or greater than 0.

For example, int_QU_width_size_minusY may indicate the width unit of a quantization unit. int_QU_width_size_minusY may be parsed to a value of "int(size information)−Y". The size information may be a value indicating the size of the width unit of QU. Y may be an integer equal to or greater than 0.

For example, int_QU_height_size_minusY may indicate the height unit of a quantization unit. int_QU_height_size_minusY may be parsed to a value of "(int(size information)−Y)". The size information may be a value indicating the size of the height unit of QU. Y may be an integer equal to or greater than 0.

For example, int_QU_channel_size_minusY may indicate the size of a channel unit of a quantization unit. int_QU_channel_size_minusY may be parsed to a value of "(int(size information)−Y)". The size information may be a value indicating the size of the channel unit of QU. Y may be an integer equal to or greater than 0.

For example, log_QU_channel_size_minusY may indicate the size of a channel unit of a quantization unit. log_QU_channel_size_minusY may be parsed to a value of "(log(size information)−Y)". The size information may be a value indicating the size of the channel unit of QU. Y may be an integer equal to or greater than 0.

For example, information about each quantization unit may be parsed as syntax.

For example, the number of QUs before a fixed split with respect to each of a row, a column, and a channel may be parsed as syntax.

For example, QU_num_exp_rows_minus1 may indicate the number of rows of split quantization units before a fixed split is performed. QU_num_exp_rows_minus1 may be parsed to a value of "(exp(size information)−1)". The size information may be a value indicating the number of rows.

For example, QU_num_exp_columns_minus1 may indicate the number of columns of split quantization units before a fixed split is performed. QU_num_exp_columns_minus1 may be parsed to a value of "(exp(size information)−1)". The size information may be a value indicating the number of columns.

For example, QU_num_exp_depths_minus1 may indicate the number of depths of split quantization units before a fixed split is performed. For example, QU_num_exp_depths_minus1 may be parsed to a value of "(exp(size information)−1)". The size information may be a value indicating the number of depths.

For example, the size information pertaining to a QU that is split with respect to each of a row, a column, and a channel may be parsed as syntax.

When information about a split unit of a quantization unit is parsed, size information may be parsed to a value that is acquired by dividing a specific size of a quantization unit by a split unit corresponding to the specific size.

For example, QU_width_minus1[i] may be information indicating the size of the width of a quantization unit.

For example, QU_height_minus1[i] may be information indicating the size of the height of a quantization unit.

For example, QU_channel_minus1[i] may be information indicating the size of the channel of a quantization unit.

For example, TUQU_equal_unit_flag may be information indicating whether the size of a unit used for a quantization procedure is set equal to the size of a unit used for a domain transformation procedure. TUQU_equal_unit_flag may be parsed to a value of 0 or 1.

Using TUQU_equal_unit_flag, a transform unit may be used in the domain transformation procedure, without additional parsing of information indicating the size of the transform unit.

When the same size is not used for a quantization unit and a transform unit, information generated by performing dequantization may be split into multiple transform units, and information about the transform units generated by the split may be parsed.

For example, TUQU_scale_flag may indicate whether only a scale difference is present between the quantization unit used in the quantization procedure and the transform unit used in the domain transformation procedure. Alternatively, TUQU_scale_flag may indicate whether multiplication of a scale is used for a transform unit. TUQU_scale_flag may be parsed to a value of 0 or 1.

When only a scale difference is present between a quantization unit and a transform unit, the transform unit may be derived by multiplying the quantization unit by the scale.

When parsing with respect to a transform unit is performed using the scale difference based on TUQU_scale_flag, TUQU_scale_rate may be information indicating the rate between the scales (or the difference between the degrees of scales).

The rate indicated by TUQU_scale_rate is multiplied by information about the quantization unit, whereby information about a transform unit may be derived. When the same size is not used for the quantization unit and the transform unit and when there is no relationship with regard to the scale difference between the quantization unit and the transform unit, information generated by performing dequantization may be split into multiple transform units, and information about the transform units generated by the split may be parsed.

For example, information about a split unit of a transform unit may be parsed as syntax. For example, log_TU_size_minusX may indicate a common unit for transform units. log_TU_size_minusX may be parsed to a value of "(log(size information)-X)". The size information may be a value indicating the size of the common unit. X may be an integer equal to or greater than 0.

For example, log_TU_width_size_minusY may indicate a width unit for a transform unit. log_TU_width_size_minusY may be parsed to a value of "(int(size information)-Y)". The size information may be a value indicating the size of the width unit. Y may be an integer equal to or greater than 0.

For example, log_TU_height_size_minusY may indicate a height unit for a transform unit. log_TU_height_size_minusY may be parsed to a value of "(int(size information)-Y)". The size information may be a value indicating the size of the height unit. Y may be an integer equal to or greater than 0.

For example, int_TU_channel_size_minusY may indicate a channel unit for a transform unit. int_TU_channel_size_minusY may be parsed to a value of "(int(size information)-Y)". The size information may be a value indicating the size of the channel unit. Y may be an integer equal to or greater than 0.

For example, log_TU_channel_size_minusY may indicate a channel unit for a transform unit. log_TU_channel_size_minusY may be parsed to a value of "(log(size information)-Y)". The size information may be a value indicating the size of the channel unit. Y may be an integer equal to or greater than 0. For example, size information of each transform unit may be parsed as syntax.

For example, the number of transform units before a fixed split with respect to each of a row, a column, and a channel may be parsed as syntax.

For example, TU_num_exp_rows_minus1 may indicate the number of rows of split transform units before a fixed split is performed. TU_num_exp_rows_minus1 may be parsed to a value of "(exp(size information)-1)". The size information may be a value indicating the number of rows.

For example, TU_num_exp_columns_minus1 may indicate the number of columns of split transform units before a fixed split is performed. TU_num_exp_columns_minus1 may be parsed to a value of "(exp(size information)-1)". The size information may be a value indicating the number of columns.

For example, TU_num_exp_depths_minus1 may indicate the number of depths of split transform units before a fixed split is performed. For example, TU_num_exp_depths_minus1 may be parsed to a value of "(exp(size information)-1)". The size information may be a value indicating the number of depths.

For example, size information indicating the size of a transform unit that is split with respect to a row, a column, a channel, and the like may be parsed as syntax.

When information about a split unit for a transform unit is parsed, the size information may be parsed to a value acquired by dividing a specific size for the transform unit by a split unit corresponding to the specific size.

For example, TU_width_minus1[i] may be information indicating the width size of a split unit.

For example, TU_height_minus1[i] may be information indicating the height size of a split unit.

For example, TU_channel_minus1[i] may be information indicating the channel size of a split unit.

For example, FM_split_mode_flag may indicate a method by which a unit generated by performing one or more splits on a single feature map is split into one or more transform units. Here, the transform unit may be a unit for performing domain transformation.

For example, base_FM_split_size_id may indicate the feature map, the size of which is used as the base of the transform unit, among one or more feature maps generated from a single frame.

For example, scale_TU_flag may indicate whether a method in which a k multiple of the size indicated by base_FM_split_size_id[i] is used as the size of a transform unit is used. k may be a positive integer. scale_TU_flag may be parsed to a value of 0 or 1.

For example, when scale_TU_flag is 1, scale_TU_rate may be information indicating which multiple of the size of a quantization unit is used as the size of a transform unit.

scale_TU_rate may be an index for a multiple-mapping table. The index for the multiple-mapping table is signaled, whereby which multiple of the size indicated by base_FM_split_size_id[i] is used as the size of a transform unit may be parsed. The encoding apparatus 100 and the decoding apparatus 2200 may have the same multiple-mapping table.

FIG. 37 illustrates syntax expressions for a transform unit according to an example.

A combination of one or more of the illustrated syntax expressions for a transform unit may be parsed in TUS.

For example, num_rearrange may indicate the number of times rearrangement is performed on a transform unit.

num_rearrange may be parsed as the number of times rearrangement is performed on the transform unit.

For example, TURPS_id may indicate a rearrangement method. TURPS_id may indicate the identifier of TURPS. TURPS may include information related to a rearrangement method.

For example, convert_axis may be information indicating whether transposition is performed with respect to the axes of the unit of inverse domain transformation when inverse domain transformation is performed.

For example, transform_type may be information indicating the transform type selected from among various transform types such as 1) PCA, 2) DCT-2, 3) DST-7, and 4) a specific transform table suitable for the disposition of a feature map. When N transform types are available, transform_type may have an integer value equal to or greater than 0 and equal to or less than N−1. N may be an integer indicating the number of transform types.

The encoding apparatus 100 and the decoding apparatus 2200 may have the same specific transform table.

A specific inverse transform table corresponding to the specific transform table may be present. The encoding apparatus 100 and the decoding apparatus 2200 may have the same specific inverse transform table.

FIG. 38 illustrates syntax expressions for a quantization unit according to an example.

A combination of one or more of the illustrated syntax expressions for a quantization unit may be parsed in Quantization_Unit_Syntax.

For example, clipping_flag may be information indicating whether clipping is performed on a quantization unit.

For example, quantization_type may indicate a quantization method used for a quantization unit, among quantization methods, such as a linear method, a nonlinear method, and the like.

For example, deadzone_flag may be information indicating whether a dead-zone scheme is performed on a quantization unit.

For example, when the value of clipping_flag is 1, information about a clipping range may be parsed using clipping_mode. When the value of clipping_mode is 1, a fixed clipping maximum value and a fixed clipping minimum value may be parsed.

For example, when quantization_type indicates linear quantization, qu_log 2_level_minus1, which is information indicating the degree of quantization, may be parsed.

For example, when the value of deadzone_flag is 1, deadzone_mode, which is information indicating whether a specific mode of a dead-zone scheme is performed, may be parsed. The specific mode may be a mode in which 1) the maximum value and the minimum value of a range to which a dead-zone scheme is applied are used, 2) two regions are redefined as a single region after the dead-zone scheme is performed, and 3) a subsequent procedure is performed on the redefined region.

For example, when the value of deadzone_mode is 1, 1) deadzone_max may be parsed as the maximum value to which a dead-zone scheme is applied, 2) deadzone_min may be parsed as the minimum value to which the dead-zone scheme is applied, and 3) deadzone_connect may be parsed. deadzone_connect may indicate that, after the dead-zone scheme is performed, two regions are redefined as a single region, and a quantization procedure is performed thereon.

For example, when the value of escape_flag is 1, unit_value, which indicates a specific real number unit, may be parsed. Using unit_value, escape mode quantization may be performed.

For example, when quantization_type indicates nonlinear quantization, qu_log 2_level_minus1, which is information indicating the degree of quantization, may be parsed.

FIG. 39 illustrates syntax expressions for TURPS according to an example.

A combination of one or more of the illustrated syntax expressions may be parsed in TURPS.

For example, TU_split_mode may indicate the split method for rearrangement of a transform unit. TU_split_mode may be parsed as the value of a split mode index for a transform unit.

For example, a transform unit may be split into multiple rearrangement units. Size information pertaining to the rearrangement unit may be parsed.

For example, base_TU_split_size_id may indicate the ID of an additional transform unit generated from the frame in which the current transform unit is included. base_TU_split_size_id may indicate "TU_id".

For example, use_scale_on_base_TU_split_size_flag may indicate whether scale_on_base_TU_split_size is parsed. use_scale_on_base_TU_split_size_flag may be parsed to a value of 0 or 1.

For example, scale_on_base_TU_split_size may indicate the scale of the transform unit of base_TU_split_size scale_on_base_TU_split_size may be parsed as a value of "base_TU_scale".

For example, TU may be split into multiple rearrangement units. Size information pertaining to the rearrangement unit may be parsed.

For example, rearrange_unit_width[i] may indicate the width of a rearrangement unit. rearrange_unit_width[i] may be parsed as a value of "the width of a rearrangement unit".

For example, rearrange_unit_height[i] may indicate the height of a rearrangement unit. rearrange_unit_height[i] may be parsed as a value of "the height of a rearrangement unit".

For example, rearrange_unit_channel[i] may indicate the channel of a rearrangement unit. rearrange_unit_channel[i] may be parsed as a value of "the channel of a rearrangement unit".

For example, rearrange_unit_scan_order[i] may indicate the order in which rearrangement units generated by splitting a transform unit are scanned. rearrange_unit_scan_order[i] may be parsed as a value of a "scan order index".

For example, rearrange_unit_attach_order[i] may indicate the order of locations to which the scanned rearrangement units are sequentially assigned. rearrange_unit_attach_order[i] may be parsed as a value of "the index for the order of the assigned locations".

For example, rearranged_TU_width[i] may indicate the width of a rearranged transform unit. rearranged_TU_width[i] may be parsed as a value of "the width of the rearranged transform unit".

For example, rearranged_TU_height[i] may indicate the height of a rearranged transform unit. rearranged_TU_height[i] may be parsed as a value of "the height of the rearranged transform unit".

For example, rearranged_TU_channel[i] may indicate the channel of a rearranged transform unit. rearranged_TU_channel[i] may be parsed as a value of "the channel of the rearranged transform unit".

FIG. 40 illustrates syntax expressions for a frame parameter set according to an example.

FIG. 41 illustrates other syntax expressions for FSPS according to an example.

FIG. 42 illustrates other syntax expressions for FSPS according to an example.

FIG. 43 illustrates syntax expressions for a transform unit according to an example.

FIG. 44 illustrates other syntax expressions for TURPS according to an example.

FIG. 45 illustrates syntax expressions for a quantization unit according to an example.

Figure 46:
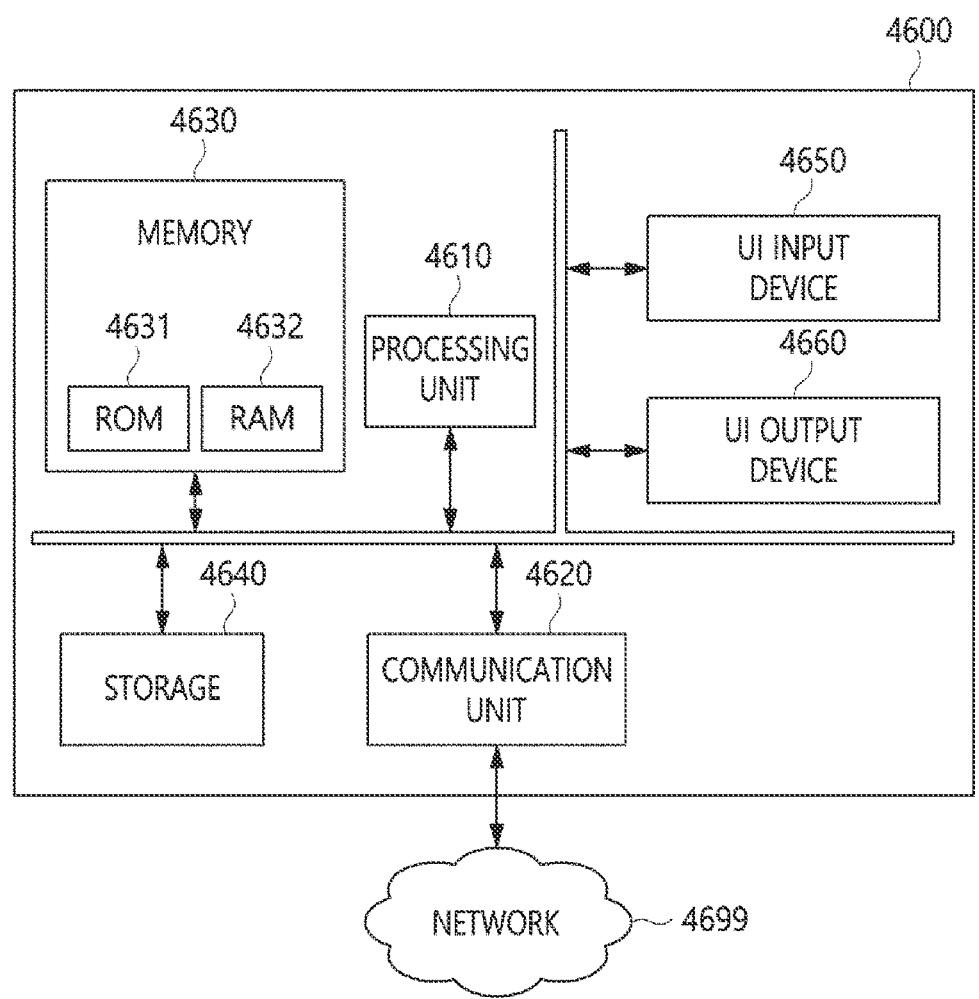
FIG. 46 illustrates an electronic device for implementing an encoding apparatus according to an embodiment.

FIG. 46 illustrates an electronic device for implementing an encoding apparatus according to an embodiment.

The encoding apparatus 100 may be implemented as the electronic device 4600 illustrated in FIG. 46. The electronic device 4600 may be a general-purpose computer system that operates as the encoding apparatus 100.

As illustrated in FIG. 46, the electronic device 4600 may include at least some of a processing unit 4610, a communication unit 4620, memory 4630, storage 4640, and a bus 4690. The components of the electronic device 4600, such as the processing unit 4610, the communication unit 4620, the memory 4630, the storage 4640, and the like, may communicate with each other via the bus 4690.

The processing unit 4610 may be a semiconductor device for executing processing instructions stored in the memory 4630 or the storage 4640. For example, the processing unit 4610 may be at least one hardware processor.

The processing unit 4610 may process tasks required for the operation of the electronic device 4600. The processing unit 4610 may execute code pertaining to the operations or steps of the processing unit 4610 described in the embodiments.

The processing unit 4610 may include an image preprocessor 110, an image encoder 120, a feature information extractor 130, a feature information preprocessor 140, and a feature information encoder 150.

The communication unit 4620 may be connected to a network 4699. The communication unit 4620 may receive data or information required for the operation of the electronic device 4600, and may transmit data or information required for the operation of the electronic device 4600. The communication unit 4620 may transmit data to other devices and receive data from other devices via the network 4699. For example, the communication unit 4620 may be a network chip or a port.

The communication unit 4620 may transmit an image bitstream and a feature map bitstream to a decoding apparatus 2200. The communication unit 4620 may receive feedback information from the decoding apparatus 2200.

The memory 4630 and the storage 4640 may be any of various types of volatile or nonvolatile storage media. For example, the memory 4630 may include at least one of ROM 4631 and RAM 4632. The storage 4640 may include internal storage media, such as RAM, flash memory, a hard disk, and the like, and detachable storage media, such a memory card and the like.

The function or operation of the electronic device 4600 may be performed when the processing unit 4610 executes at least one program module. The memory 4630 and/or the storage 4640 may store at least one program module. The at least one program module may be configured to be executed by the processing unit 4610.

At least part of the above-described encoding apparatus 100 may be at least one program module.

Program modules in the form of an operating system, an application module, a library, and other program modules may be included in the electronic device 4600, and may be physically stored in various known storage devices. Also, at least some of the program modules may be stored in a remote storage device that is capable of communicating with the electronic device 4600. Meanwhile, the program modules may include a routine, a subroutine, a program, an object, a component, a data structure, and the like for performing a specific operation or task or implementing a specific abstract data type according to an embodiment, but the program modules are not limited thereto.

The electronic device 4600 may further include a user interface (UI) input device 4650 and a UI output device 4660. The UI input device 4650 may receive user input required for the operation of the electronic device 4600. The UI output device 4660 may output information or data based on the operation of the electronic device 4600.

Figure 47:
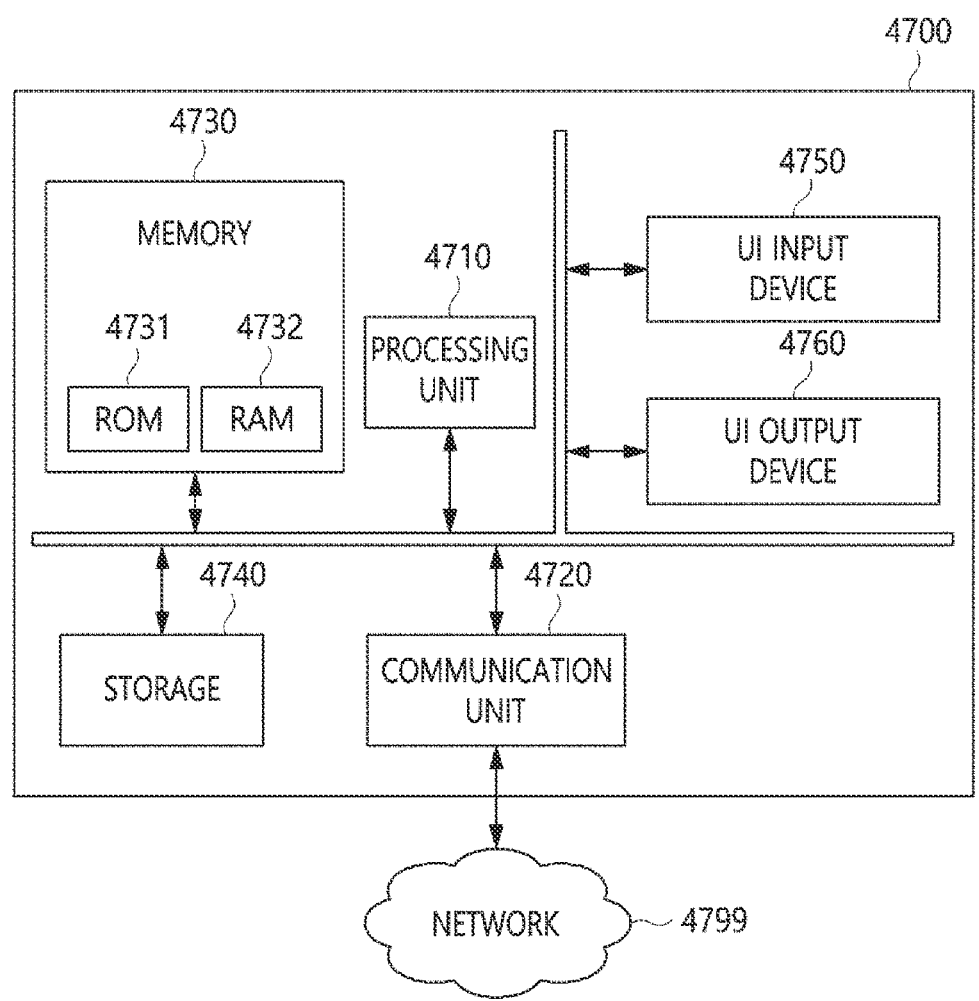
FIG. 47 illustrates an electronic device for implementing a decoding apparatus according to an embodiment.

FIG. 47 illustrates an electronic device for implementing a decoding apparatus according to an embodiment.

The decoding apparatus 2200 may be implemented as the electronic device 4700 illustrated in FIG. 47. The electronic device 4700 may be a general-purpose computer system that operates as the decoding apparatus 2200.

As illustrated in FIG. 47, the electronic device 4700 may include at least some of a processing unit 4710, a communication unit 4720, memory 4730, storage 4740, and a bus 4790. The components of the electronic device 4700, such as the processing unit 4710, the communication unit 4720, the memory 4730, the storage 4740, and the like, may communicate with each other via the bus 4790.

The processing unit 4710 may be a semiconductor device for executing processing instructions stored in the memory 4730 or the storage 4740. For example, the processing unit 4710 may be at least one hardware processor.

The processing unit 4710 may process tasks required for the operation of the electronic device 4700. The processing unit 4710 may execute code pertaining to the operations or steps of the processing unit 4710 described in the embodiments.

The processing unit 4710 may include an image decoder 2210, a feature information decoder 2220, a feature information postprocessor 2230, an image postprocessor 2240, and a machine-learning processor 2250.

The communication unit 4720 may be connected to a network 4799. The communication unit 4720 may receive data or information required for the operation of the electronic device 4700, and may transmit data or information required for the operation of the electronic device 4700. The communication unit 4720 may transmit data to other devices and receive data from other devices via the network 4799. For example, the communication unit 4720 may be a network chip or a port.

The communication unit 4720 may receive an image bitstream and a feature map bitstream from an encoding apparatus 100. The communication unit 4720 may transmit feedback information to the encoding apparatus 100.

The memory 4730 and the storage 4740 may be any of various types of volatile or nonvolatile storage media. For example, the memory 4730 may include at least one of ROM 4731 and RAM 4732. The storage 4740 may include internal storage media, such as RAM, flash memory, a hard disk, and the like, and detachable storage media, such a memory card and the like.

The function or operation of the electronic device 4700 may be performed when the processing unit 4710 executes at least one program module. The memory 4730 and/or the storage 4740 may store at least one program module. The at least one program module may be configured to be executed by the processing unit 4710.

At least part of the above-described decoding apparatus 2200 may be at least one program module.

Program modules in the form of an operating system, an application module, a library, and other program modules may be included in the electronic device 4700, and may be physically stored in various known storage devices. Also, at least some of the program modules may be stored in a remote storage device that is capable of communicating with the electronic device 4700. Meanwhile, the program modules may include a routine, a subroutine, a program, an object, a component, a data structure, and the like for performing a specific operation or task or implementing a specific abstract data type according to an embodiment, but the program modules are not limited thereto.

The electronic device 4700 may further include a user interface (UI) input device 4750 and a UI output device 4760. The UI input device 4750 may receive user input required for the operation of the electronic device 4700. The UI output device 4760 may output information or data based on the operation of the electronic device 4700.

Figure 48:
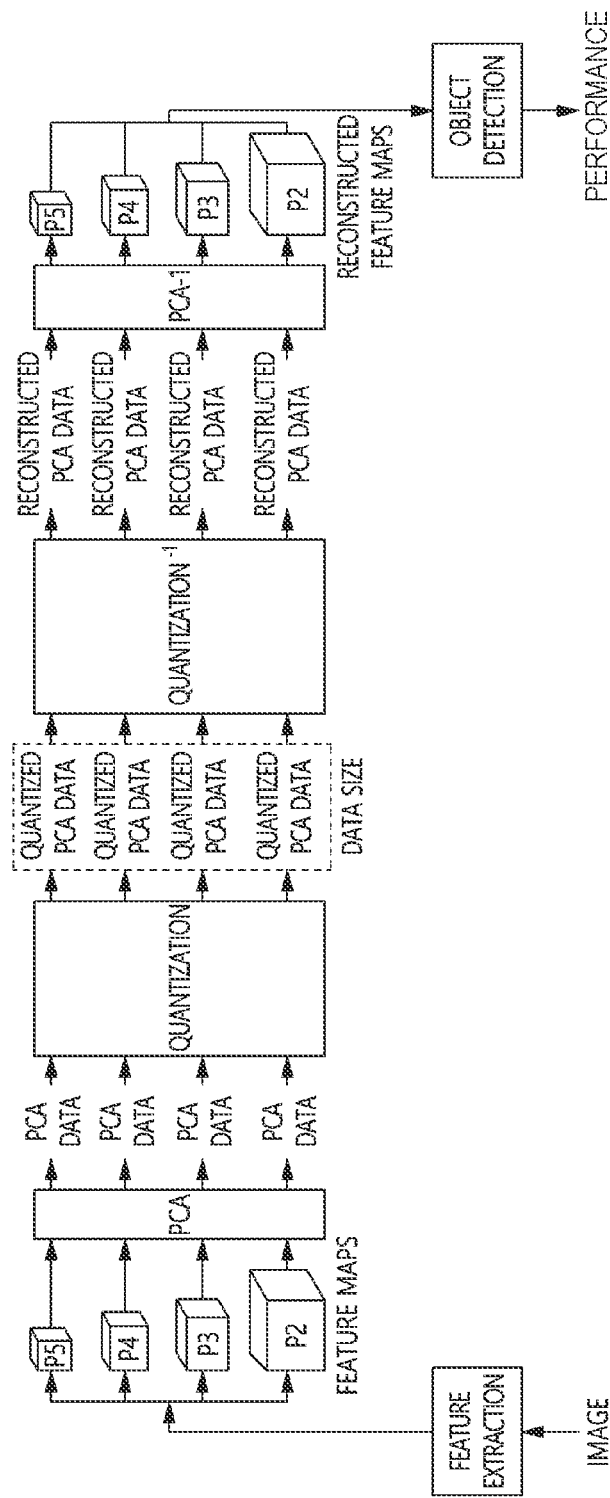
FIG. 48 illustrates a pipeline for performance measurement.

FIG. 48 illustrates a pipeline for performance measurement.

An experiment pipeline is shown in FIG. 48. Reduction on feature data may be performed using PCA and linear quantization.

A method of the embodiment may be applied to intermediate feature map from a specific network.

Figure 49:
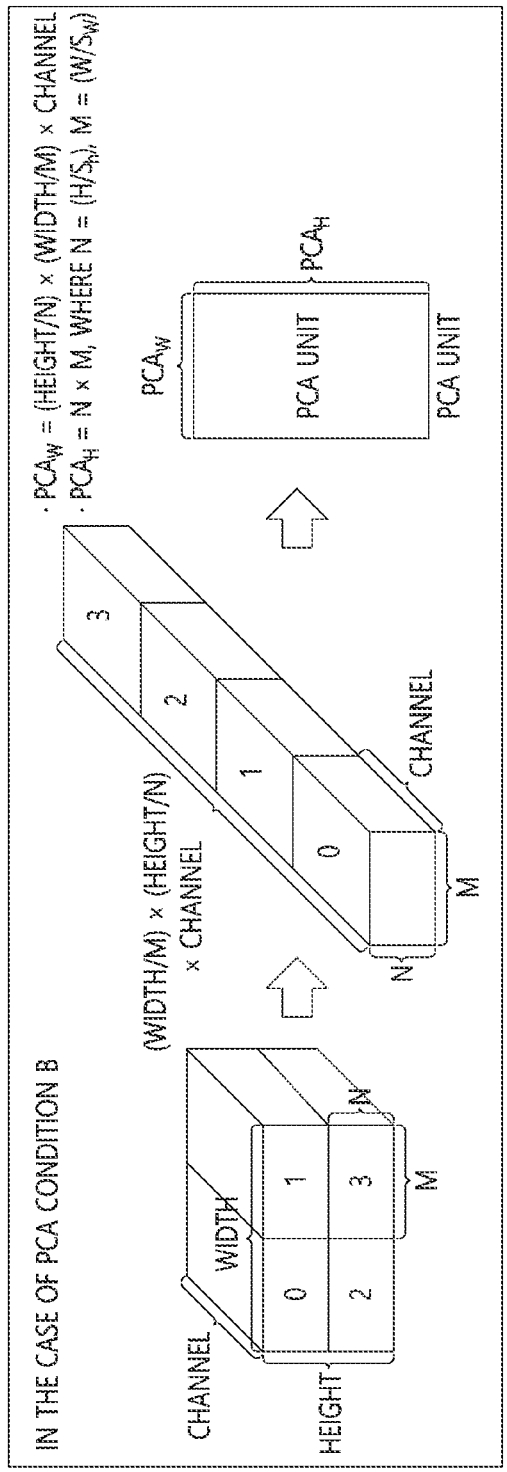
FIG. 49 illustrates a rearrangement of a feature map.

FIG. 49 illustrates a rearrangement of a feature map.

PCA may be performed for each of the feature maps P2 to P5. PCA may be performed after reordering by dividing the feature maps to improve the energy compaction performance of PCA. The method of rearranging the feature map is shown in FIG. 49.

At first, a scale factor (Sh, Sw) which divides a feature map into Sh*Sw sub-feature maps may be defined.

Then the overall feature map volume of shape (H, W, C) may be divided into smaller blocks of Sh*Sw sub-feature maps, each of shape (H/Sh W/Sw, C)

For examples, as depicted in FIG. 49, a feature map may be divided into four sub-feature maps along the width and height axis.

After the partitioning is performed, sub-feature maps may be scanned in raster scan order and rearranged along the other channel axis.

The rearranged feature map may be flattened to 2-d matrix, called PCA unit.

Four configurations on dividing, PCA condition A to D, may be used. PCA condition 'A' may not divide feature map. PCA condition 'B' may divide the range of each axis in half. PCA condition 'C' may divide the feature map into P5 size. PCA condition 'D' may divide the feature map into half size of P5. FIG. 49 is an example in case of PCA condition 'B'.

The following equations may be applied to PCA conditions A and D.

$$PCA \text{ condition } A: N = \text{Height}, M = \text{Width} \quad \text{[Equation 1]}$$
$$PCA \text{ unit size: (Height*Width)*Channel}$$

$$PCA \text{ condition } B: N = \text{Height}/2, M = \text{Width}/2 \quad \text{[Equation 2]}$$
$$PCA \text{ unit size: ((Height}/2)*(\text{Width}/2))*(2*2*\text{Channel})$$

$$PCA \text{ condition } C: N = 34, M = 25, \text{ same as } P5 \text{ size} \quad \text{[Equation 3]}$$
$$PCA \text{ unit size: }(34*25)*$$
$$((\text{Height}/34)*(\text{Width}/25)*\text{Channel})$$

$$PCA \text{ condition } D: N = 17, M = 25 \quad \text{[Equation 4]}$$
$$PCA \text{ unit size: }(17*25)*$$
$$((\text{Height}/17)*(\text{Width}/25)*\text{Channel})$$

Figure 50:
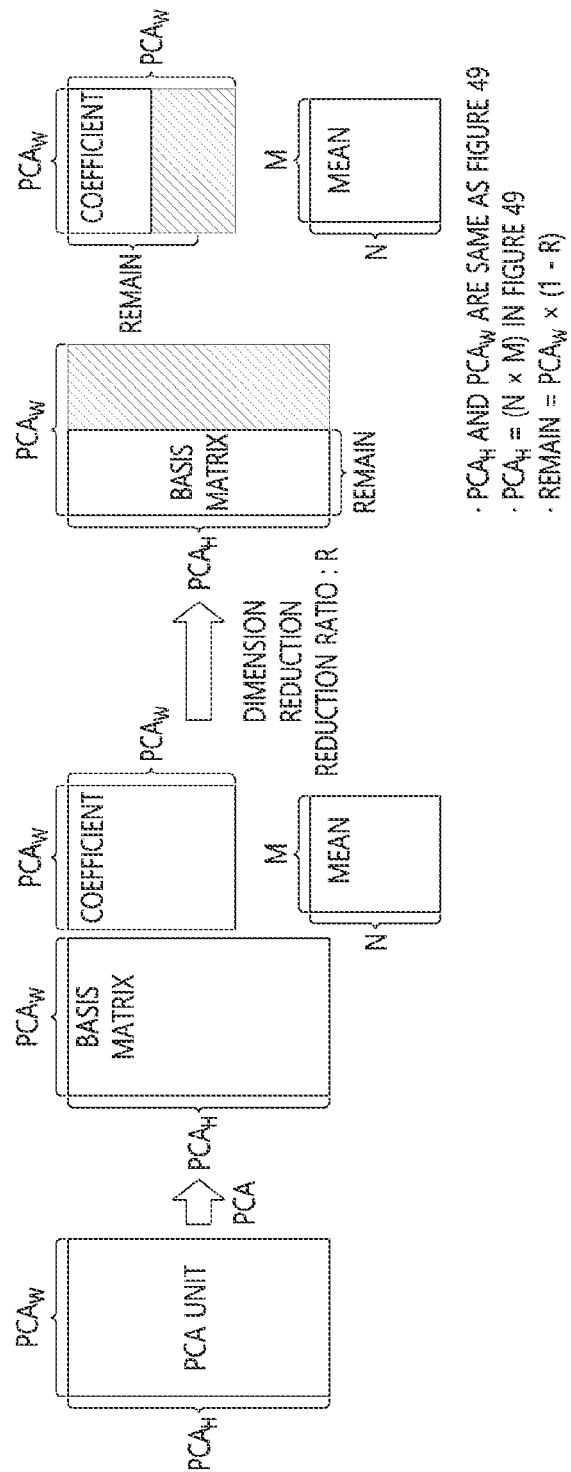
FIG. 50 illustrates a dimension reduction on basis matrix and coefficient.

FIG. 50 illustrates a dimension reduction on basis matrix and coefficient.

Each PCA unit may apply to PCA. After PCA is performed, dimension reduction on basis matrix and coefficient is additionally performed with same ratio. As a result of applying PCA and dimension reduction, the total size of data generated may be reduced.

The above-described embodiments may be performed using a method that is the same as or corresponds to the methods used in the encoding apparatus 100 and the decoding apparatus 2200. Also, a combination of one or more of the above-described embodiments may be used for encoding and/or decoding of an image.

The order in which the above-described embodiments are applied in the encoding apparatus 100 may be different from that in the decoding apparatus 2200. Alternatively, the order in which the above-described embodiments are applied in the encoding apparatus 100 and that in the decoding apparatus 2200 may be (at least partially) the same as each other.

The above-described embodiments may be performed separately on each of a luma signal and a chroma signal. The above-described embodiments may be equally performed on the luma signal and the chroma signal.

In the above-described embodiments, it may be construed that, when specified processing is applied to a specified target, specified conditions may be required. Also, it may be construed that, when a description is made such that the specified processing is performed under a specified decision, whether the specified conditions are satisfied may be determined based on a specified coding parameter and that, alternatively, when a description is made such that a specified decision is made based on a specified coding parameter, the specified coding parameter may be replaced with an additional coding parameter. In other words, it may be considered that a coding parameter that influences the specified condition or the specified decision is merely exemplary, and it may be understood that, in addition to the specified coding parameter, a combination of one or more other coding parameters may function as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as program instructions that can be executed by various computer means and may be recorded on a computer-readable storage medium. The computer-readable storage medium may include program instructions, data files, and data structures, either solely or in combination. Program instructions recorded on the computer-readable storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an apparatus, method, system, and recording medium for performing domain transformation and quantization on feature map information and image information.

There are provided an apparatus, method, system, and recording medium for rearranging the results of domain transformation and quantization performed on feature map information and image information so as to have a form advantageous to an encoding procedure.

There are provided an apparatus, method, system, and recording medium for generating a bitstream by encoding the result of rearrangement and for storing and transmitting the bitstream.

There are provided an apparatus, method, system, and recording medium for receiving a bitstream, decoding the received bitstream, and performing inverse transformation, dequantization, and inverse rearrangement using the information transmitted through the bitstream.

There are provided an apparatus, method, system, and recording medium for using the results of inverse transformation, dequantization, and inverse rearrangement for a machine-learning task of a neural network.

As described above, although the present disclosure has been described based on specific details such as detailed components and a limited number of embodiments and drawings, the embodiments are merely provided for easy understanding of the entire disclosure, the present disclosure is not limited thereto, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An encoding method, comprising:
    extracting feature information from an original image;
    generating preprocessed feature information by performing preprocessing on the feature information; and
    generating a feature map by performing encoding on the preprocessed feature information, wherein
    the preprocessing performed on the feature information includes domain transformation,
    a type of the domain transformation comprises Principal Component Analysis (PCA),
    the feature information is partitioned into a plurality of sub-feature information along one or more first channel axes in the domain transformation,
    a dimension of each of the plurality of sub-feature information is less than a dimension of the feature information,
    the plurality of sub-feature information are scanned according to raster scan order and rearranged along a second channel axis to generate rearranged feature information,
    the rearranged feature information is flattened to a plurality of PCA units, and
    the PCA is applied to each of the plurality of PCA units.

2. The encoding method of claim 1, further comprising:
    generating a preprocessed image by performing preprocessing on the original image,
    wherein the feature information is extracted from the original image or the preprocessed image.

3. The encoding method of claim 2, wherein:
    the original image or the preprocessed image is input to a neural network,
    the neural network includes a single layer or multiple layers, and
    the feature information is a final result extracted from the neural network or a result from an intermediate layer of the neural network.

4. The encoding method of claim 2, wherein:
    the preprocessing performed on the original image includes one or more of color format transformation and sub-sampling.

5. The encoding method of claim 1, wherein:
    the preprocessing performed on the feature information includes one or more of sub-sampling, quantization, and domain rearrangement.

6. The encoding method of claim 5, wherein:
    fixed sampling or non-fixed sampling is performed on the feature information.

7. The encoding method of claim 5, wherein:
    the type of the domain transformation comprises orthogonal linear transform.

8. The encoding method of claim 5, wherein:
    the quantization is fixed quantization or non-fixed quantization.

9. The encoding method of claim 1, wherein:
    the feature information is partitioned into four sub-feature information along a width axis and a height axis in the domain transformation.

10. The encoding method of claim 1, wherein:
    the PCA unit is a two-dimensional matrix.

11. The encoding method of claim 1, wherein;
    the feature information is partitioned into the plurality of sub-feature information based on a PCA condition,
    the PCA condition is selected from a plurality of PCA conditions, and
    the plurality of PCA conditions comprise a first PCA condition indicating the feature information is not partitioned, a second PCA condition indicating that each axis for the feature information is partitioned in half, a third PCA condition indicating that the feature information is partitioned into a specific size, and a four PCA condition indicating that the feature information is partitioned into half size of the specific size.

12. A decoding method, comprising:

generating reconstructed feature information by performing decoding on information about a feature map in a feature map bitstream; and generating postprocessed reconstructed feature information by performing postprocessing on the reconstructed feature information, wherein the postprocessing performed on the reconstructed feature information includes inverse domain transformation, a type of the inverse domain transformation comprises an inverse process of Principal Component Analysis (PCA), a plurality of sub-reconstructed feature information are integrated into the reconstructed feature information along one or more first channel axes in the inverse domain transformation, a dimension of each of the plurality of sub-reconstructed feature information is less than a dimension of the reconstructed feature information, rearranged feature information is information generated by scanning a plurality of sub-feature information according to raster scan order and rearranging along a second channel axis, a plurality of PCA units are information generated by flattening the rearranged feature information, and the PCA is a process which is applied to each of the plurality of PCA units.

13. The decoding method of claim 12, further comprising:

deriving a processing result by performing a machine-learning task for the postprocessed reconstructed feature information using one or more neural networks.

14. The decoding method of claim 12, further comprising:

generating a reconstructed image by performing decoding on encoded image information of an image bitstream; and generating a postprocessed reconstructed image by performing postprocessing on the reconstructed image.

15. The decoding method of claim 14, wherein:

the postprocessing performed on the reconstructed image includes one or more of inverse color format transformation and inverse sampling.

16. The decoding method of claim 12, wherein:

the postprocessing performed on the reconstructed feature information includes one or more of inverse rearrangement, dequantization, and inverse sampling.

17. The decoding method of claim 16, wherein:

the rearranged feature information having a 2D form is reconfigured in a 3D form through the inverse rearrangement.

18. The decoding method of claim 16, wherein:

the dequantization is fixed dequantization or non-fixed dequantization.

19. The decoding method of claim 16, wherein:

the type of the inverse domain transformation comprises orthogonal linear transform.

20. The decoding method of claim 16, wherein:

fixed sampling or non-fixed sampling is performed on inversely transformed information generated by the domain inverse transformation.

* * * * *